US009382353B2

(12) United States Patent
Gotoh et al.

(10) Patent No.: US 9,382,353 B2
(45) Date of Patent: Jul. 5, 2016

(54) POLYMERIZABLE COMPOUND HAVING THIOESTER GROUP, POLYMERIZABLE COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yasuyuki Gotoh, Tokyo (JP); Masakazu Yano, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/243,601

(22) Filed: Apr. 2, 2014

(65) Prior Publication Data

US 2014/0306157 A1 Oct. 16, 2014

(30) Foreign Application Priority Data

Apr. 11, 2013 (JP) ................................ 2013-083160

(51) Int. Cl.

| | |
|---|---|
| ***G02F 1/1333*** | (2006.01) |
| ***C08F 28/02*** | (2006.01) |
| ***C09K 19/20*** | (2006.01) |
| ***C09K 19/32*** | (2006.01) |
| *C09K 19/04* | (2006.01) |
| *C09K 19/12* | (2006.01) |
| *C09K 19/30* | (2006.01) |
| *C09K 19/34* | (2006.01) |
| *C09K 19/16* | (2006.01) |

(52) U.S. Cl.

CPC ................ *C08F 28/02* (2013.01); *C09K 19/20* (2013.01); *C09K 19/32* (2013.01); *C09K 2019/0448* (2013.01); *C09K 2019/0466* (2013.01); *C09K 2019/122* (2013.01); *C09K 2019/123* (2013.01); *C09K 2019/161* (2013.01); *C09K 2019/3004* (2013.01); *C09K 2019/3016* (2013.01); *C09K 2019/3027* (2013.01); *C09K 2019/3425* (2013.01)

(58) Field of Classification Search

CPC ....... C08F 28/02; G02F 1/1333; C09K 19/20; C09K 19/32; C09K 2019/0448; C09K 2019/0466; C09K 2019/122; C09K 2019/123; C09K 2019/3004; C09K 2019/3016; C09K 2019/3027; C09K 2019/3425; C09K 2019/161; C09K 2019/163

USPC .............. 252/299.01, 299.6, 299.61, 299.63; 428/1.1; 349/182, 183; 558/251; 526/243, 284, 289

See application file for complete search history.

(56) References Cited

FOREIGN PATENT DOCUMENTS

| | | | | | |
|---|---|---|---|---|---|
| JP | 02229808 A | | 9/1990 | | |
| JP | 0782376 A | | 3/1995 | | |
| JP | 08157320 A | | 6/1996 | | |
| JP | 2002-97223 | * | 4/2002 | ............. | C08F 20/38 |
| JP | 2002128827 A | * | 5/2002 | ............. | C08F 20/38 |

* cited by examiner

*Primary Examiner* — Geraldina Visconti
(74) *Attorney, Agent, or Firm* — Hogan Lovells US LLP

(57) ABSTRACT

Subject

It is to provide a polymerizable compound having a high polymerization reactivity, a high conversion yield and a high solubility in a liquid crystal composition, a polymerizable composition including the compound, a liquid crystal composite prepared from the composition and a liquid crystal display device containing this composite.

Means for Solving the Subject

A compound represented by formula (1).

(1)

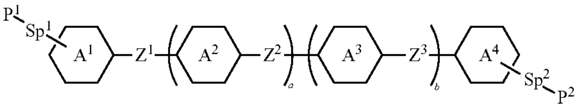

In this formula, for example, $P^1$ and $P^2$ are —SCO—CH═CH$_2$; $Sp^1$ and $Sp^2$ are a single bond; ring $A^1$, ring $A^2$, ring $A^3$ and ring $A^4$ are 1,4-phenylene; $Z^1$, $Z^2$ and $Z^3$ are a single bond; and a is 1, and b and c is 0.

20 Claims, No Drawings

POLYMERIZABLE COMPOUND HAVING THIOESTER GROUP, POLYMERIZABLE COMPOSITION AND LIQUID CRYSTAL DISPLAY DEVICE

TECHNICAL FIELD

The invention relates to a polymerizable compound, a polymerizable composition including this polymerizable compound and a liquid crystal composition, a liquid crystal composite prepared from this polymerizable composition and a liquid crystal display device.

TECHNICAL BACKGROUND

A liquid crystal display device utilizes optical anisotropy, dielectric anisotropy and so forth possessed by liquid crystal molecules in a liquid crystal composition. A classification based on an operating mode for the liquid crystal molecules includes a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a fringe field switching (FFS) mode and a vertical alignment (VA) mode.

A liquid crystal display device having a mode where a polymer and a liquid crystal composition are united are known. This is, for example, a polymer sustained alignment (PSA) mode or a polymer stabilized (PS) mode. In a liquid crystal display device having this mode, a liquid crystal composition to which a polymerizable compound is added is injected into a display device. A polymer is formed in the liquid crystal composition by the irradiation with ultraviolet light and by the polymerization of the polymerizable compound, while a voltage is applied between electrodes. According to this method, a liquid crystal display device is obtained in which the response time is decreased and the image burn-in is improved.

This method can be applied to a variety of operating modes of a liquid crystal display device, and modes such as PS-TN, PS-IPS, PS-FFS, PSA-VA and PSA-OCB are known. A polymerizable compound used for these kinds of modes seems to have a high ability to orient liquid crystal molecules. It is not said, however, that its solubility in a liquid crystal composition is high. An improvement of the solubility in a liquid crystal composition has been tried until now, and there is a tendency that as the solubility increases, the polymerization reactivity is decreased. Thus, the development of a polymerizable compound having a suitable balance between the solubility and the polymerization reactivity has been expected.

PRIOR ART

Patent Document

Patent document No. 1: JP H08-157320 A.

Patent document No. 2: JP H07-082376 A

Patent document No. 3: JP H02-229808 A. .

OUTLINE OF THE INVENTION

Subject to be Solved by the Invention

The first subject of the invention is to provide a polymerizable compound having a high polymerization reactivity, a high conversion yield and a high solubility in a liquid crystal composition. The second subject is to provide a liquid crystal composite that satisfies at least one of physical properties such as a high maximum temperature of a nematic phase, a low minimum temperature of a nematic phase, a small viscosity, a suitable optical anisotropy, a large dielectric anisotropy, a suitable elastic constant, a large specific resistance and a suitable pretilt. The subject is to provide a liquid crystal composite having a suitable balance between at least two of the physical properties. The third subject is to provide a liquid crystal display device having a wide temperature range in which the device can be used, a short response time, a large voltage holding ratio, a low threshold voltage, a large contrast ratio and a long service life.

Means for Solving the Subject

The invention concerns a compound represented by formula (1), a polymerizable composition including this compound and a liquid crystal composition, a liquid crystal composite prepared from this polymerizable composition and a liquid crystal display device containing this liquid crystal composite.

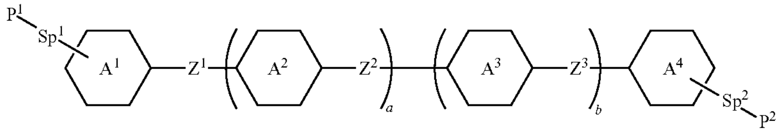

(1)

In formula (1), $P^1$ is —OCO-($M^1$)C═CH($M^2$) or —SCO-($M^1$)C═CH($M^2$), and $P^2$ is —SCO-($M^3$)C═CH($M^4$), where $M^1$, $M^2$, $M^3$ and $M^4$ are independently hydrogen, fluorine, methyl or trifluoromethyl;

$Sp^1$ and $Sp^2$ are independently a single bond, —$CF_2$O—, —O$CF_2$—, —CHF—, —$CF_2$—, —CH═CH—, —CF═CH—, —CH═CF—, —CF═CF—, —C≡C— or alkylene having 3 to 10 carbons, and in this alkylene at least one —$CH_2$— may be replaced by —O—, —COO—, —OCO— or —OCOO—, and at least one —$CH_2$—$CH_2$— may be replaced by —CH═CH— or —C≡C—, and in these groups at least one hydrogen may be replaced by fluorine or chlorine;

ring $A^1$, ring $A^2$, ring $A^3$ and ring $A^4$ are independently a divalent group derived from benzene, naphthalene, pyrimidine or pyridine, and in these divalent groups at least one hydrogen may be replaced by halogen, alkyl having 1 to 12 carbons, alkyl having 1 to 12 carbons in which at least one hydrogen has been replaced by halogen or -$Sp^3$-$P^3$, where the definition of $P^3$ is the same as that of $P^1$ or $P^2$ and the definition of $Sp^3$ is the same as that of $Sp^1$ or $Sp^2$, and ring $A^2$ and ring $A^3$ may be independently 1,4-cyclohexylene, 1,4-cyclohexenylene, tetrahydropyran-2,5-diyl or 1,3-dioxane-2,5-diyl;

$Z^1$, $Z^2$ and $Z^3$ are independently a single bond or alkylene having 1 to 10 carbons, and in this alkylene at least one —$CH_2$— may be replaced by —O—, —CO—, —COO— or —OCO—, and at least one —$CH_2$—$CH_2$— may be replaced by —CH═CH—, —$C(CH_3)$═CH—, —CH═$C(CH_3)$—, —$C(CH_3)$═$C(CH_3)$— or —C≡C—, and in these groups at least one hydrogen may be replaced by fluorine or chlorine; and a and b are independently 0 or 1.

Effect of the Invention

The first advantage of the invention is that the polymerizable compound has a high polymerization reactivity, a high conversion yield and a high solubility in a liquid crystal composition. The second advantage is that the liquid crystal composite satisfies at least one of physical properties such as a high maximum temperature of a nematic phase, a low minimum temperature of a nematic phase, a small viscosity, a suitable optical anisotropy, a large dielectric anisotropy, a suitable elastic constant, a large specific resistance and a suitable pretilt. The advantage is that the liquid crystal composite has a suitable balance between at least two of the physical properties. The third advantage is that the liquid crystal display device has a wide temperature range in which the device can be used, a short response time, a large voltage holding ratio, a low threshold voltage, a large contrast ratio and a long service life.

EMBODIMENT TO CARRY OUT THE INVENTION

Usage of the terms in this specification is as follows. A liquid crystal compound is a generic term for a non-polymerizable compound that has a liquid crystal phase such as a nematic phase or a smectic phase, and also for a non-polymerizable compound that has no liquid crystal phases, but is mixed for the purpose of adjusting the physical properties of a liquid crystal composition, such as the maximum temperature, the minimum temperature, the viscosity and the dielectric anisotropy. This compound has, for example, a six-membered ring such as 1,4-cyclohexylene and 1,4-phenylene, and the molecular structure is rod-like. A liquid crystal composition is a mixture of liquid crystal compounds. A polymerizable compound is a compound that is added to a composition for the purpose of forming a polymer. A polymerizable composition is a mixture of a polymerizable compound, a liquid crystal composition, an additive and so forth. A liquid crystal composite is a composite formed by the polymerization of this polymerizable composition. A liquid crystal display device is a generic term for a liquid crystal display panel and a liquid crystal display module. The maximum temperature of a nematic phase is the transition temperature between a nematic phase and an isotropic phase in a liquid crystal composition, a polymerizable composition or a liquid crystal composite, and may be abbreviated to the maximum temperature. The minimum temperature of a nematic phase may be abbreviated to the minimum temperature. Polymerization reactivity refers to the rate at which a reactant tends to undergo polymerization. A conversion yield is the ratio by weight of a reactant consumed by a chemical reaction to the reactant.

A liquid crystal composition is prepared by mixing liquid crystal compounds. The ratio (the content) of the liquid crystal compound is expressed as a percentage by weight (% by weight) based on the weight of this liquid crystal composition. An additive such as an optically active compound, an antioxidant, an ultraviolet light absorber, a light stabilizer, a thermal stabilizer, a defoaming agent, a polymerization initiator and a polymerization inhibitor is added to this composition as required. The ratio (the added amount) of the additive is expressed as a percentage by weight (% by weight) based on the weight of the liquid crystal composition in the same manner as the ratio of the liquid crystal compound. Weight parts per million (ppm) is sometimes used. The ratio of a polymerization initiator or a polymerization inhibitor is expressed exceptionally on the basis of the weight of the polymerizable compound.

A compound represented by formula (1) may be abbreviated to compound (1). This abbreviation applies to a compound represented by formula (2) or the like. Compound (1) means one compound or at least two compounds represented by formula (1). In ring $A^1$ (or ring $A^4$) of compound (1), an oblique line crossing a hexagonal shape means that the bonding position of a $P^1$-$Sp^1$ group (or a $P^2$-$Sp^2$ group) on a six-membered ring (including a condensed ring) can be arbitrarily selected. In formulas (1) to (15), the symbol $A^1$, $B^1$, $C^1$ or the like surrounded by a hexagonal shape corresponds to ring $A^1$, ring $B^1$, ring $C^1$ or the like, respectively. The symbol $R^{13}$ is used for a plurality of formulas such as formula (6) and formula (7). In these compounds, two terminal groups represented by arbitrary two $R^{13}$ may be the same or different. Two $C^1$ are present in one formula when i is 2 in formula (5). In this compound, two rings represented by two $C^1$ may be the same or different. The same rule applies to $C^1$ where i is greater than 2. The same rule applies to other symbols.

The expression "at least one 'A' may be replaced by 'B'" means that the position of one 'A' is arbitrary when the number of 'A' is one, and that the positions of 'A' can also be selected without restriction when the number of 'A' is two or more. The expression "at least one A may be replaced by B, C or D" includes cases where at least one A has been replaced by B, and at least one A has been replaced by C, and at least one A has been replaced by D, and also cases where a plurality of A have been replaced by at least two of B, C and D. For example, "alkyl in which at least one —$CH_2$— (or —$CH_2CH_2$—) may be replaced by —O— (or —CH═CH—)" includes alkyl, alkenyl, alkoxy, alkoxyalkyl, alkoxyalkenyl and alkenyloxyalkyl. Incidentally, it is undesirable that two successive —$CH_2$— should be replaced by —O— to give —O—O—. It is also undesirable that —$CH_2$— of a methyl moiety (—$CH_2$—H) in alkyl and so forth should be replaced by —O— to give —O—H.

2-Fluoro-1,4-phenylene means the following two divalent groups. Fluorine may be facing left (L) or facing right (R) in a chemical formula. The same rule applies to a divalent group derived from an asymmetric ring, such as tetrahydropyran-2,5-diyl.

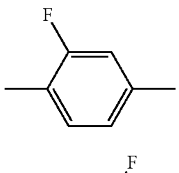

(L)

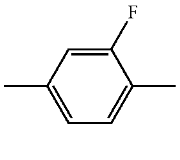

(R)

The invention includes the contents described in the following items.

Item 1. A compound represented by formula (1):

(1)

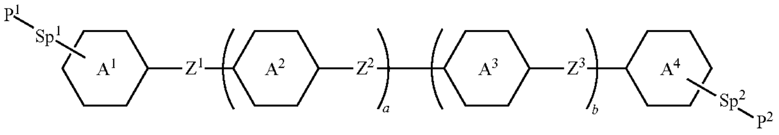

in formula (1), $P^1$ is —OCO-($M^1$)C═CH($M^2$) or —SCO-($M^1$)C═CH($M^2$), and $P^2$ is —SCO-($M^3$)C═CH($M^4$), where $M^1$, $M^2$, $M^3$ and $M^4$ are independently hydrogen, fluorine, methyl or trifluoromethyl;

$Sp^1$ and $Sp^2$ are independently a single bond, —$CF_2$O—, —$OCF_2$—, —CHF—, —$CF_2$—, —CH═CH—, —CF═CH—, —CH═CF—, —CF═CF—, —C≡C— or alkylene having 3 to 10 carbons, and in this alkylene at least one —$CH_2$— may be replaced by —O—, —COO—, —OCO— or —OCOO—, and at least one —$CH_2$—$CH_2$— may be replaced by —CH═CH— or —C≡C—, and in these groups at least one hydrogen may be replaced by fluorine or chlorine;

ring $A^1$, ring $A^2$, ring $A^3$ and ring $A^4$ are independently a divalent group derived from benzene, naphthalene, pyrimidine or pyridine, and in these divalent groups at least one hydrogen may be replaced by halogen, alkyl having 1 to 12 carbons, alkyl having 1 to 12 carbons in which at least one hydrogen has been replaced by halogen or -$Sp^3$-$P^3$, where the definition of $P^3$ is the same as that of $P^1$ or $P^2$ and the definition of $Sp^3$ is the same as that of $Sp^1$ or $Sp^2$, and ring $A^2$ and ring $A^3$ may be independently 1,4-cyclohexylene, 1,4-cyclohexenylene, tetrahydropyran-2,5-diyl or 1,3-dioxane-2,5-diyl;

$Z^1$, $Z^2$ and $Z^3$ are independently a single bond or alkylene having 1 to 10 carbons, and in this alkylene at least one —$CH_2$— may be replaced by —O—, —CO—, —COO— or —OCO—, and at least one —$CH_2$—$CH_2$— may be replaced by —CH═CH—, —C($CH_3$)═CH—, —CH═C($CH_3$)—, —C($CH_3$)═C($CH_3$)— or —C≡C—, and in these groups at least one hydrogen may be replaced by fluorine or chlorine; and a and b are independently 0 or 1.

Item 2. The compound according to item 1, wherein in formula (1) according to item 1, $P^1$ is —OCO-($M^1$)C═CH($M^2$) or —SCO-($M^1$)C═CH($M^2$), and $P^2$ is —SCO-($M^3$)C═CH($M^4$), where $M^1$, $M^2$, $M^3$ and $M^4$ are independently hydrogen, fluorine, methyl or trifluoromethyl;

$Sp^1$ and $Sp^2$ are independently a single bond, —CH═CH—, —C≡C— or alkylene having 3 to 10 carbons, and in this alkylene at least one —$CH_2$— may be replaced by —O—, one —$CH_2$— may be replaced by —COO— or —OCO—, and one —$CH_2$—$CH_2$— may be replaced by —CH═CH— or —C≡C;

ring $A^1$, ring $A^2$, ring $A^3$ and ring $A^4$ are independently 1,4-phenylene, 1,3-phenylene, 1,2-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, pyrimidine-2,5-diyl or pyridine-2,5-diyl, and in these rings at least one hydrogen may be replaced by halogen, alkyl having 1 to 6 carbons or alkyl having 1 to 6 carbons in which at least one hydrogen has been replaced by halogen, and ring $A^2$ and ring $A^3$ may be independently 1,4-cyclohexylene, 1,4-cyclohexenylene, tetrahydropyran-2,5-diyl or 1,3-dioxane-2,5-diyl;

$Z^1$, $Z^2$ and $Z^3$ are independently a single bond or alkylene having 1 to 6 carbons, and in this alkylene one —$CH_2$— may be replaced by —O—, —CO—, —COO— or —OCO—, and one —$CH_2$—$CH_2$— may be replaced by —CH═CH— or —C≡C—; and a and b are independently 0 or 1.

Item 3. The compound according to item 1 or 2, wherein the compound is represented by any one of formula (1-1) to formula (1-6):

(1-1)

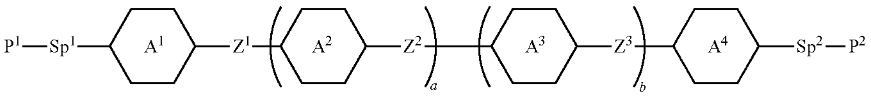

(1-2)

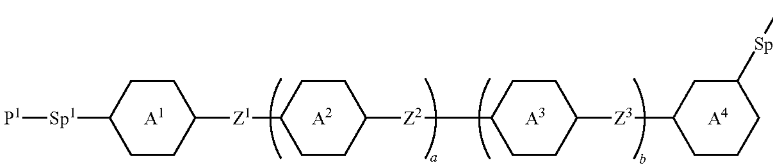

(1-3)

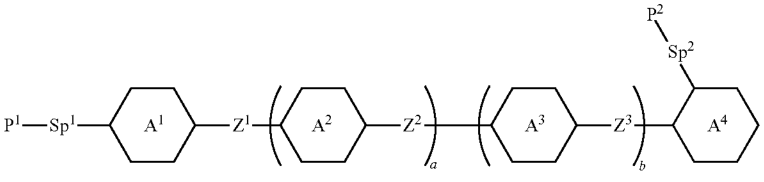

-continued (1-4)

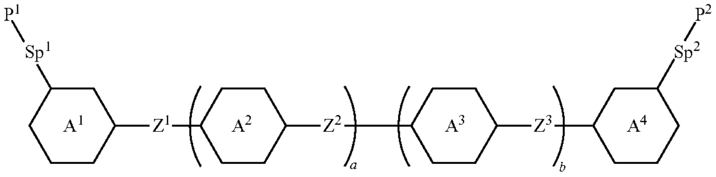

(1-5)

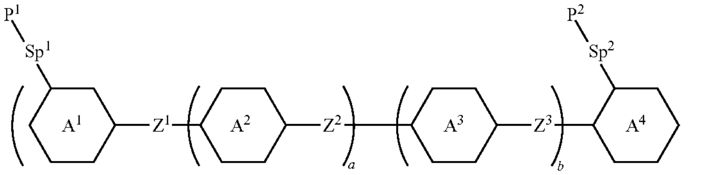

(1-6)

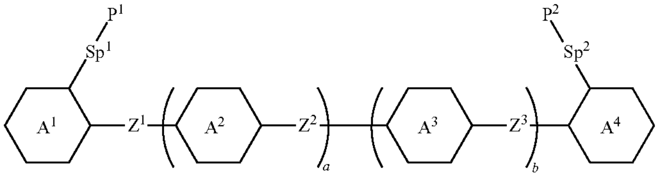

in formula (1-1) to formula (1-6), $P^1$ is —SCO-($M^1$)C═CH($M^2$), and $P^2$ is —SCO-($M^3$)C═CH($M^4$), where $M^1$, $M^2$, $M^3$ and $M^4$ are independently hydrogen, fluorine or methyl;

$Sp^1$ and $Sp^2$ are independently a single bond, —CH═CH—, —C≡C— or alkylene having 3 to 10 carbons, and in this alkylene one or two —$CH_2$— may be replaced by —O—, —COO—, —OCO— or —OCOO—, one —$CH_2$—$CH_2$— may be replaced by —CH═CH— or —C≡C—, and at least one hydrogen may be replaced by fluorine;

ring $A^1$ and ring $A^4$ are independently 1,4-phenylene, 1,3-phenylene or 1,2-phenylene, and ring $A^2$ and ring $A^3$ are independently 1,4-phenylene, and in these phenylene at least one hydrogen may be replaced by fluorine, alkyl having 1 to 3 carbons or alkyl having 1 to 3 carbons in which at least one hydrogen has been replaced by fluorine;

$Z^1$, $Z^2$ and $Z^3$ are independently a single bond or alkylene having 1 to 10 carbons, and in this alkylene one —$CH_2$— may be replaced by —O—, —CO—, —OCO— or —OCO— and one —$CH_2$—$CH_2$— may be replaced by —CH═CH— or —C≡C—, and in these groups at least one hydrogen may be replaced by fluorine or chlorine; and a and b are independently 0 or 1.

Item 4. The compound according to item 3, wherein in formula (1-1) to formula (1-6) according to item 3, $P^1$ and $P^2$ are independently —SCO—HC═$CH_2$ or —SCO—($CH_3$)C═$CH_2$.

Item 5. The compound according to item 1, wherein the compound is represented by formula (1-1-1) or formula (1-1-2):

(1-1-1)

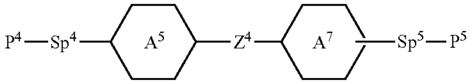

-continued (1-1-2)

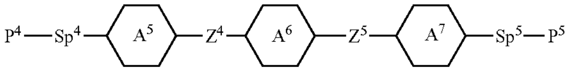

in formula (1-1-1) and formula (1-1-2), $P^4$ is —SCO-($M^5$)C═$CH_2$, and $P^5$ is —SCO-($M^6$)C═$CH_2$, where $M^5$ and $M^6$ are independently hydrogen, fluorine or methyl;

$Sp^4$ and $Sp^5$ are independently a single bond, —CH═CH—, —C≡C—, alkylene having 3 to 6 carbons, alkylene having 3 to 6 carbons in which one or two —$CH_2$— has been replaced by —O—, —CH═CH—O—, —O—CH═CH—, —$CH_2$CH═CH—O—, —O—CH═CH$CH_2$—, —CH═CH—$CH_2$—O—, —O—$CH_2$CH═CH—, —$CH_2CH_2$CH═CH—O—, —O—$CH_2CH_2$CH═CH—, —$CH_2$CH═CH$CH_2$—O—, —O—$CH_2$CH═CH$CH_2$—, —CH═CH$CH_2CH_2$—O— or —O—CH═CH$CH_2CH_2$—;

ring $A^5$ and ring $A^7$ are independently 1,4-phenylene, 2-fluoro-1,4-phenylene, 2-methyl-1,4-phenylene, 2-trifluoromethyl-1,4-phenylene, naphthalene-1,4-diyl, naphthalene-1,5-diyl or naphthalene-2,6-diyl, and ring $A^6$ is 1,4-phenylene, 2-difluoro-1,4-phenylene, 2-methyl-1,4-phenylene, 2-trifluoromethyl-1,4-phenylene, naphthalene-1,4-diyl, naphthalene-1,5-diyl, naphthalene-2,6-diyl, 1,4-cyclohexylene or tetrahydropyran-2,5-diyl; and $Z^4$ and $Z^5$ are independently a single bond, —CO—, —COO—, —OCO—, —CH═CH—, —C≡C—, —$CH_2CH_2$O—, —O$CH_2CH_2$—, —CH═CHO—, —OCH═CH—, —CO—CH═CH—, —CH═CH—CO—, —CH═CH—$CH_2$O—, —O$CH_2$—CH═CH—, —CH═CH—O$CH_2$— or —$CH_2$O—CH═CH—.

Item 6. The compound according to item 5, wherein in formulas (1-1-1) and (1-1-2) according to item 5, $P^4$ and $P^5$ are independently —SCO—HC═$CH_2$ or —SCO—($CH_3$)C═CH;

$Sp^4$ and $Sp^5$ are independently a single bond, —CH═CH—, —CH═CH—O—, —O—CH═CH—, —$CH_2CH_2$CH═CH—O— or —O—$CH_2CH_2$CH═CH—;

ring $A^5$ and ring $A^7$ are independently 1,4-phenylene, 2-fluoro-1,4-phenylene, 2-methyl-1,4-phenylene, naphthalene-1,5-diyl or naphthalene-2,6-diyl, and ring $A^6$ is 1,4-cyclohexylene, 1,4-phenylene, 2-fluoro-1,4-phenylene, 2-methyl-1,4-phenylene, naphthalene-1,5-diyl, naphthalene-2,6-diyl or tetrahydropyran-2,5-diyl; and $Z^4$ and $Z^5$ are independently a single bond, —CH═CH—O— or —O—CH═CH—.

Item 7. The compound according to item 1, wherein the compound is represented by formula (1-1-1-1) or formula (1-1-2-1):

(1-1-1-1)

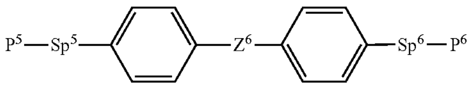

(1-1-2-1)

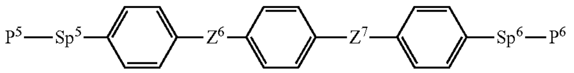

in formula (1-1-1-1) and formula (1-1-2-1), $P^5$ and $P^6$ are independently —SCO—HC═$CH_2$ or —SCO—$(CH_3)C$═$CH_2$;

$Sp^5$ and $Sp^6$ are independently a single bond, alkylene having 1 to 4 carbons, —CH═CH—O—, —O—CH═CH—, —$CH_2$CH═CH—O—, —O—CH═CH$CH_2$—, —CH═CH—$CH_2$—O— or —O—$CH_2$CH═CH—; and $Z^6$ and $Z^7$ are independently a single bond, —COO—, —OCO—, —CH═CH— or —C≡C—.

Item 8. The compound according to item 7, wherein in formula (1-1-1-1) and formula (1-1-2-1) according to item 7, $P^5$ and $P^6$ are independently —SCO—HC═$CH_2$ or —SCO—$(CH_3)C$═$CH_2$; $Sp^5$ and $Sp^6$ are a single bond; and $Z^6$ and $Z^7$ are a single bond.

Item 9. A polymerizable composition including at least one of the compounds according to any one of items 1 to 8.

Item 10. The polymerizable composition according to item 9, further including at least one compound selected from the group of compounds represented by formulas (2) to (4):

(2)

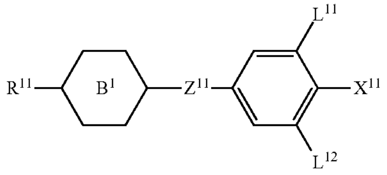

(3)

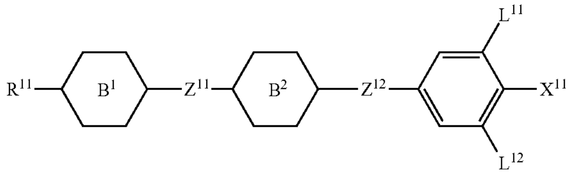

(4)

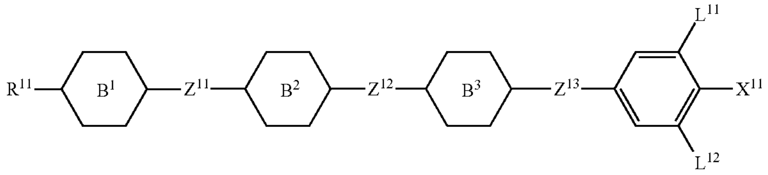

in formula (2) to formula (4), $R^{11}$ is alkyl having 1 to 10 carbons or alkenyl having 2 to 10 carbons, and in this alkyl and alkenyl at least one —$CH_2$— may be replaced by —O—, and at least one hydrogen may be replaced by fluorine;

$X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$;

ring $B^1$, ring $B^2$ and ring $B^3$ are independently 1,4-cyclohexylene, 1,4-phenylene in which at least one hydrogen may be replaced by fluorine, tetrahydropyran-2,5-diyl, 1,3-dioxane-2,5-diyl or pyrimidine-2,5-diyl;

$Z^{11}$, $Z^{12}$ and $Z^{13}$ are independently a single bond, —$CH_2CH_2$—, —CH═CH—, —C≡C—, —COO—, —$CF_2O$—, —$OCF_2$—, —$CH_2O$— or —$(CH_2)_4$—; and $L^{11}$ and $L^{12}$ are independently hydrogen or fluorine.

Item 11. The polymerizable composition according to item 9 or 10, further including at least one compound selected from the group of compounds represented by formula (5):

(5)

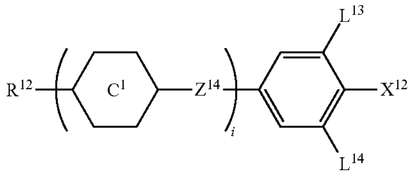

in formula (5), $R^{12}$ is alkyl having 1 to 10 carbons or alkenyl having 2 to 10 carbons, and in this alkyl and alkenyl at least one —$CH_2$— may be replaced by —O—, and at least one hydrogen may be replaced by fluorine;

$X^{12}$ is —C≡N or —C≡C—C≡N;

ring $C^1$ is 1,4-cyclohexylene, 1,4-phenylene in which at least one hydrogen may be replaced by fluorine, tetrahydropyran-2,5-diyl, 1,3-dioxane-2,5-diyl or pyrimidine-2,5-diyl;

$Z^{14}$ is ingle bond, —$CH_2CH_2$—, —C≡C—, —COO—, —$CF_2O$—, —$OCF_2$— or —$CH_2O$—;

$L^{13}$ and $L^{14}$ are independently hydrogen or fluorine; and i is 1, 2, 3 or 4.

Item 12. The polymerizable composition according to item 9, further including at least one compound selected from the group of compounds represented by formula (6) to formula (12):

ring $D^1$, ring $D^2$, ring $D^3$ and ring $D^4$ are independently 1,4-cyclohexylene, 1,4-cyclohexenylene, 1,4-phenylene in which at least one hydrogen may be replaced by fluorine, tetrahydropyran-2,5-diyl or decahydronaphthalene-2,6-diyl;

ring $D^5$ and ring $D^6$ are independently 1,4-cyclohexylene, 1,4-cyclohexenylene, 1,4-phenylene, tetrahydropyran-2,5-diyl or decahydronaphthalene-2,6-diyl;

$Z^{15}$, $Z^{16}$, $Z^{17}$ and $Z^{18}$ are independently a single bond, —$CH_2CH_2$—, —COO—, —$CH_2O$—, —$OCF_2$— or —$OCF_2CH_2CH_2$—;

(6)

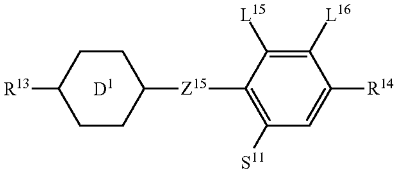

(7)

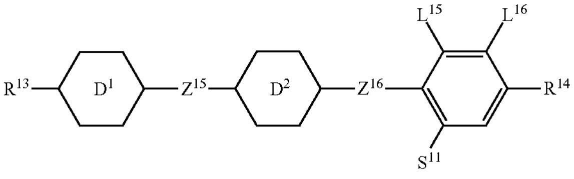

(8)

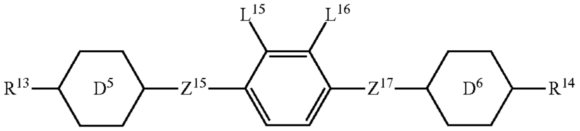

(9)

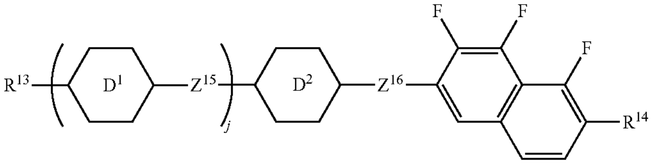

(10)

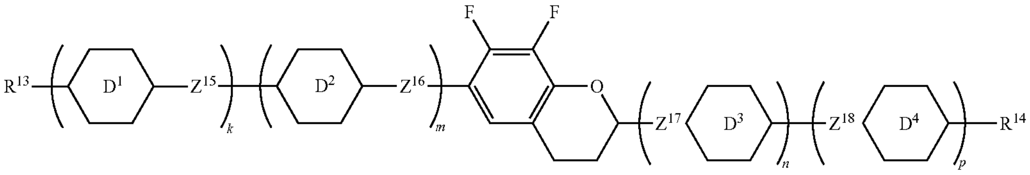

(11)

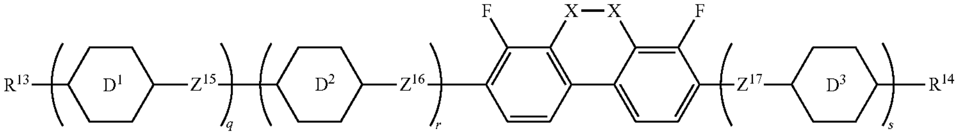

(12)

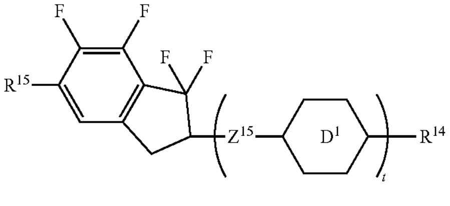

in formula (6) to formula (12), $R^{13}$ and $R^{14}$ are independently alkyl having 1 to 10 carbons or alkenyl having 2 to 10 carbons, and in this alkyl and alkenyl at least one —$CH_2$— may be replaced by —O—, and at least one hydrogen may be replaced by fluorine;

$R^{15}$ is hydrogen, fluorine, alkyl having 1 to 10 carbons or alkenyl having 2 to 10 carbons, and in this alkyl and alkenyl at least one —$CH_2$— may be replaced by —O—, and at least one hydrogen may be replaced by fluorine;

$L^{15}$ and $L^{16}$ are independently fluorine or chlorine;

$S^{11}$ is hydrogen or methyl;

X is —CHF— or —$CF_2$—; and j, k, m, n, p, q, r and s are independently 0 or 1, the sum of k, m, n and p is 1 or 2, the sum of q, r and s is 0, 1, 2 or 3, and t is 1, 2 or 3.

Item 13. The polymerizable composition according to any one of items 9 to 12, further including at least one compound selected from the group of compounds represented by formula (13) to formula (15):

(13)

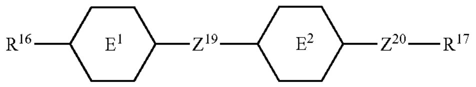

(14)

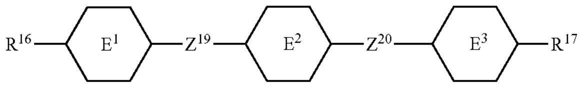

(15)

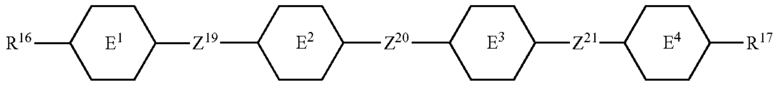

in formula (13) to formula (15), $R^{16}$ and $R^{17}$ are independently alkyl having 1 to 10 carbons or alkenyl having 2 to 10 carbons, and in this alkyl or alkenyl at least one —$CH_2$— may be replaced by —O—, and at least one hydrogen may be replaced by fluorine;

ring $E^1$, ring $E^2$, ring $E^3$ and ring $E^4$ are independently 1,4-cyclohexylene, 1,4-phenylene, 2-fluoro-1,4-phenylene, 2,5-difluoro-1,4-phenylene or pyrimidine-2,5-diyl; and $Z^{19}$, $Z^{20}$ and $Z^{21}$ are independently a single bond, —$CH_2CH_2$—, —CH═CH—, —C≡C— or —COO—.

Item 14. A liquid crystal composite formed by the polymerization of the polymerizable composition according to any one of items 9 to 13.

Item 15. An optically anisotropic material formed by the polymerization of the polymerizable composition according to any one of items 9 to 13.

Item 16. A liquid crystal display device containing the polymerizable composition according to any one of items 9 to 13 or the liquid crystal composite according to item 14.

Item 17. Use of one selected from the group of the compound according to any one of items 1 to 8, the polymerizable composition according to any one of items 9 to 13, and the liquid crystal composite according to item 14, in a liquid crystal display device.

The invention also includes the following items. (a) The polymerizable composition described above, further including at least one of additives such as an optically active compound, an antioxidant, an ultraviolet light absorber, a light stabilizer, a thermal stabilizer, a defoaming agent, a polymerization initiator and a polymerization inhibitor. (b) The polymerizable composition described above, further including at least one polymerization initiator. (c) The polymerizable composition described above, further including a polymerizable compound that is different from a compound represented by formula (1). (d) Use of compound (1) in a polymerizable composition suitable for a liquid crystal display device having a PSA mode. (e) Use of compound (1) in a liquid crystal display device having a PSA mode. (f) Use of at least one compound selected from the group of compounds represented by formulas (1-1) to (1-6), formulas (1-1-1) and (1-1-2) or formulas (1-1-1-1) and (1-1-2-1), in a liquid crystal display device having a PSA mode. (g) Use of a polymerizable composition including at least one of the compounds described above, in a liquid crystal display device having a PSA mode. (h) Use of a liquid crystal composite formed by the polymerization of the polymerizable composition described above, in a liquid crystal display device having a PSA mode. (i) Use of the compound described above, the polymerizable composition described above or the liquid crystal composite described above, in a liquid crystal display device having a mode of PS-TN, PS-IPS, PS-FFS, PSA-VA or PSA-OCB.

The invention also includes the following items. (j) Use of composition including a compound represented by formula (1) and at least one compound selected from the group of compounds represented by formulas (2), (3) and (4), in a liquid crystal display device having a PSA mode. (k) Use of composition including a compound represented by formula (1) and at least one compound selected from the group of compounds represented by formula (5), in a liquid crystal display device having a PSA mode. (l) Use of composition including a compound represented by formula (1) and at least one compound selected from the group of compounds represented by formulas (6), (7), (8), (9), (10), (11) and (12), in a liquid crystal display device having a PSA mode. (m) Use of composition including a compound represented by formula (1) and at least one compound selected from the group of compounds represented by formulas (13), (14) and (15), in a liquid crystal display device having a PSA mode.

Compound (1) will be explained first, then the synthetic method, the polymerizable composition, the liquid crystal composite and the liquid crystal display device will be explained in that order.

1. Compound (1)

The polymer of a thioester is excellent in an optical characteristic, a thermal characteristic and a mechanical characteristic, and is good in its productivity since the reactivity of the thioester is high, and has a high refractive index (see JP 2002-128826 A). Compound (1) is characterized by a polymerizable thioester suitable for such a polymer. Compound (1) is optimum for achieving a high polymerization reactivity, a high conversion yield and a high solubility in a liquid crystal composition, since it has an acryloylthio group or a methacryloylthio group in its terminal. The polymerizability of compound (1) can be adjusted by the replacement of one of the terminal groups with an acryloyloxy group or a methacryloyloxy group. Compound (1) has a high solubility in a liquid crystal composition, since it has a rod-like molecular structure which is similar a liquid crystal compound.

Desirable examples of the polymerizable group P, the linking group Sp, the ring A and the bonding group Z in compound (1) will be shown below. These examples can be applied to the sub-formulas of compound (1).

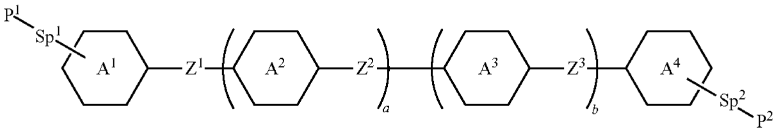
(1)

In formula (1), $P^1$ is —OCO-($M^1$)C═CH($M^2$) or —SCO-($M^1$)C═CH($M^2$), and $P^2$ is —SCO-($M^3$)C═CH($M^4$), where $M^1$, $M^2$, $M^3$ and $M^4$ are independently hydrogen, fluorine, methyl or trifluoromethyl. The configuration of —C═C— may be an E-isomer or a Z-isomer. Desirable $M^1$, $M^2$, $M^3$ or $M^4$ is hydrogen, fluorine or methyl. More desirable $M^1$, $M^2$, $M^3$ or $M^4$ is hydrogen or methyl. Desirable $P^1$ or $P^2$ is —SCO—HC═$CH_2$ or —SCO—($CH_3$)C═$CH_2$. More desirable $P^1$ or $P^2$ is —SCO—HC═$CH_2$. More desirable $P^1$ or $P^2$ is —SCO—($CH_3$)C═$CH_2$.

In formula (1), $Sp^1$ and $Sp^2$ are independently a single bond, —$CF_2$O—, —O$CF_2$—, —CHF—, —$CF_2$—, —CH═CH—, —CF═CH—, —CH═CF—, —CF═CF—, —C≡C— or alkylene having 3 to 10 carbons, and in this alkylene at least one —$CH_2$— may be replaced by —O—, —COO—, —OCO— or —OCOO—, and at least one —$CH_2$—$CH_2$— may be replaced by —CH═CH— or —C≡C—, and in these groups at least one hydrogen may be replaced by fluorine or chlorine. Desirable $Sp^1$ or $Sp^2$ is a single bond, —CH═CH—, —C≡C— or alkylene having 3 to 10 carbons, and in this alkylene one or two —$CH_2$— may be replaced by —O—, —COO—, —OCO— or —OCOO—, one —$CH_2$—$CH_2$— may be replaced by —CH═CH— or —C≡C—, and at least one hydrogen may be replaced by fluorine. More desirable $Sp^1$ or $Sp^2$ is a single bond, —$CH_2CH_2$O—, —O$CH_2CH_2$—, —CH═CHO— or —OCH═CH—. The most desirable $Sp^1$ or $Sp^2$ is a single bond. In these linking groups, the configuration of —CH═CH— may be a cis form or a trans form.

In formula (1), ring $A^1$, ring $A^2$, ring $A^3$ and ring $A^4$ are independently a divalent group derived from benzene, naphthalene, pyrimidine or pyridine, and in these divalent groups at least one hydrogen may be replaced by halogen, alkyl having 1 to 12 carbons, alkyl having 1 to 12 carbons in which at least one hydrogen has been replaced by halogen or -$Sp^3$-$P^3$, where the definition of $P^3$ is the same as that of $P^1$ or $P^2$ and the definition of $Sp^3$ is that same as that of $Sp^1$ or $Sp^2$, and ring $A^2$ and ring $A^3$ may be independently 1,4-cyclohexylene, 1,4-cyclohexenylene, tetrahydropyran-2,5-diyl or 1,3-dioxane-2,5-diyl.

Desirable ring $A^1$, ring $A^2$, ring $A^3$ or ring $A^4$ is 1,4-phenylene, 1,3-phenylene, 1,2-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, pyrimidine-2,5-diyl, pyrimidine-2,4-diyl, pyrimidine-4,6-diyl, pyridine-2,5-diyl, pyridine-2,4-diyl or pyridine-2,6-diyl, and in these rings at least one hydrogen may be replaced by halogen, alkyl having 1 to 6 carbons or alkyl having 1 to 6 carbons in which at least one hydrogen has been replaced by halogen, and ring $A^2$ or ring $A^3$ may be 1,4-cyclohexylene, 1,4-cyclohexenylene, tetrahydropyran-2,5-diyl or 1,3-dioxane-2,5-diyl. Desirable examples of at least one hydrogen has been replaced by halogen are —$CH_2$F, —$CHF_2$, —$CF_3$, —$CClF_2$, —$CH_2CF_3$, —$CF_2CF_3$ and —$CH_2H_2CF_3$.

More desirable ring $A^1$ or ring $A^4$ is 1,4-phenylene, 1,3-phenylene, 1,2-phenylene, 2,3-difluoro-1,4-phenylene, 2,5-difluoro-1,4-phenylene, 2,6-difluoro-1,4-phenylene, 2-chloro-3-fluoro-1,4-phenylene, naphthalene-1,4-diyl, naphthalene-1,5-diyl, naphthalene-2,6-diyl, pyrimidine-2,5-diyl and pyridine-2,5-diyl. More desirable ring $A^2$ or ring $A^3$ is 1,4-phenylene, 2,3-difluoro-1,4-phenylene, 2,5-difluoro-1,4-phenylene, 2,6-difluoro-1,4-phenylene, 2-chloro-3-fluoro-1,4-phenylene, naphthalene-1,4-diyl, naphthalene-1,5-diyl, naphthalene-2,6-diyl, pyrimidine-2,5-diyl, pyridine-2,5-diyl, 1,4-cyclohexylene, tetrahydropyran-2,5-diyl or 1,3-dioxane-2,5-diyl. Especially desirable ring $A^1$, ring $A^2$, ring $A^3$ or ring $A^4$ is 1,4-phenylene, 2-fluoro-1,4-phenylene, 2-methyl-1,4-phenylene or 2-trifluoromethyl-1,4-phenylene. The most desirable ring $A^1$, ring $A^2$, ring $A^3$ or ring $A^4$ is 1,4-phenylene.

In formula (1), $Z^1$, $Z^2$ and $Z^3$ are independently a single bond or alkylene having 1 to 10 carbons, and in this alkylene at least one —$CH_2$— may be replaced by —O—, —CO—, —COO— or —OCO—, and at least one —$CH_2$—$CH_2$— may be replaced by —CH═CH—, —C($CH_3$)═CH—, —CH═C($CH_3$)—, —C($CH_3$)═C($CH_3$)— or —C≡C—, and in these groups at least one hydrogen may be replaced by fluorine or chlorine.

Desirable $Z^1$, $Z^2$ or $Z^3$ is a single bond, —COO—, —OCO—, —CO—, —CH═CH—, —C($CH_3$)═C($CH_3$)—, —CH═CH—COO—, —OCO—CH═CH—, —C($CH_3$)═CH—COO—, —OCO—C($CH_3$)═CH—, —CH═C($CH_3$)—COO—, —OCO—CH═C($CH_3$)—, —C($CH_3$)═C($CH_3$)—COO—, —CO—CH═CH—, —CH═CH—CO—, —CH═CH—$CH_2$O—, —O$CH_2$—CH═CH—, —CH═CH—O$CH_2$—, —$CH_2$O—CH═CH— or —C≡C—. More desirable $Z^1$, $Z^2$ or $Z^3$ is a single bond, —COO—, —OCO—, —CH═CH— or —C≡C—. The most desirable $Z^1$, $Z^2$ or $Z^3$ is a single bond. When these bonding groups have —CH═CH—, the configuration may be a cis form or a trans form. Desirable configuration is the trans form.

In formula (1), a and b are independently 0 or 1. A desirable sum of a and b is 0 or 1. A more desirable sum of a and b is 0.

A polymerizable compound having objective physical properties can be obtained by suitably selecting a combination of the polymerizable group ($P^1$ and $P^2$), the side chain group ($P^1$-$Sp^1$ and $P^2$-$Sp^2$), the ring ($A^1$ to $A^4$) and the bonding group ($Z^1$ to $Z^3$) by reference to the desirable examples described above. Incidentally, it is undesirable that the element of $Sp^1$ bonded to $P^1$ should be oxygen in the side chain group. This is because a divalent group such as —COS—O— or —COO—O— is formed. Desirable examples of the compound are compounds (1-1) to (1-6). Desirable examples of the compound are also compound (1-1-1) and compound (1-1-2). More desirable examples of the compound is compound (1-1-1-1) and compound (1-1-2-1). Compound (1) may contain isotopes such as $^2$H (deuterium) and $^{13}$C in a larger amount than the amount of the natural abundance, since there are no major differences in the physical properties of the compound.

2. Synthetic Methods

The method for synthesizing compound (1) will be explained. Compound (1) can be prepared by a suitable combination of methods in synthetic organic chemistry. The method of introducing objective terminal groups, rings and bonding groups into starting materials are described in books such as Houben-Wyle, Methoden der Organische Chemie (Georg-Thieme Verlag, Stuttgart), Organic Syntheses (John Wily & Sons, Inc.), Organic Reactions (John Wily & Sons Inc.), Comprehensive Organic Synthesis (Pergamon Press) and Shin Jikken Kagaku Kouza (New Experimental Chemistry Course, in English; Maruzen Co., Ltd., Japan).

2-1. Formation of the Bonding Group Z

Examples of the method for forming the bonding groups $Z^1$ to $Z^3$ in compound (1) are shown in the following schemes. In these schemes, $MSG^1$ (or $MSG^2$) is a monovalent organic group having at least one ring. Monovalent organic groups represented by a plurality of $MSG^1$ (or $MSG^2$) may be the same or different. Compounds (1A) to (1I) correspond to compound (1). In the formation of an ester, the method for synthesizing a compound having —COO— was shown here. It is possible to synthesize a compound having —OCO— by this synthetic method. The same applies to other asymmetric bonding groups.

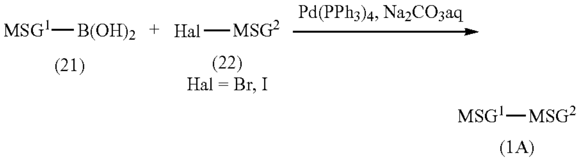

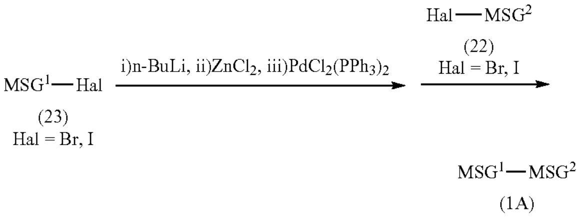

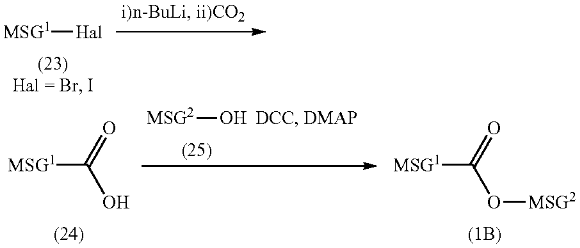

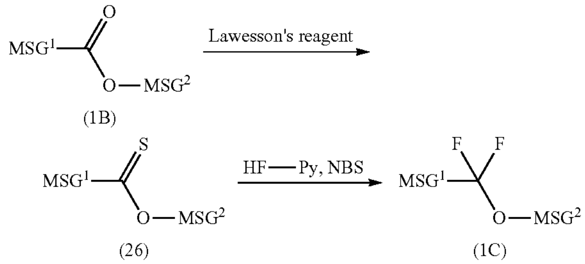

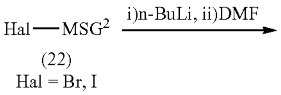

-continued

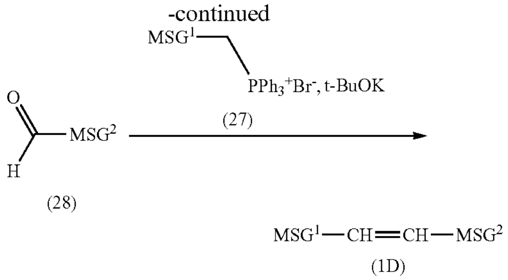

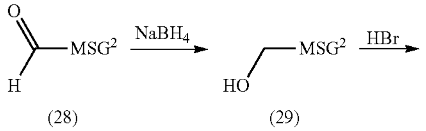

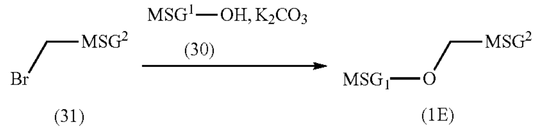

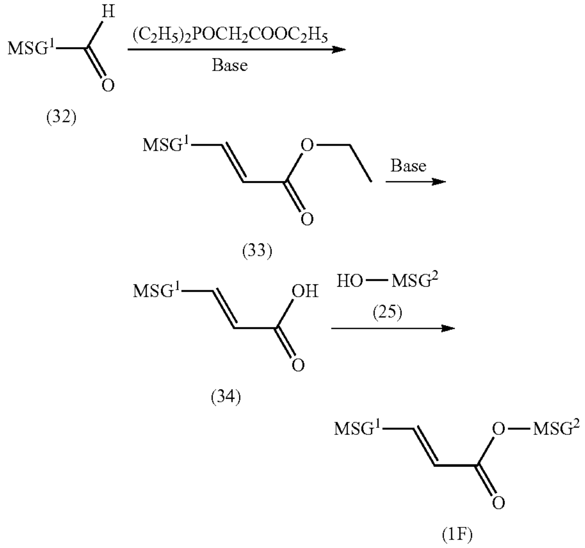

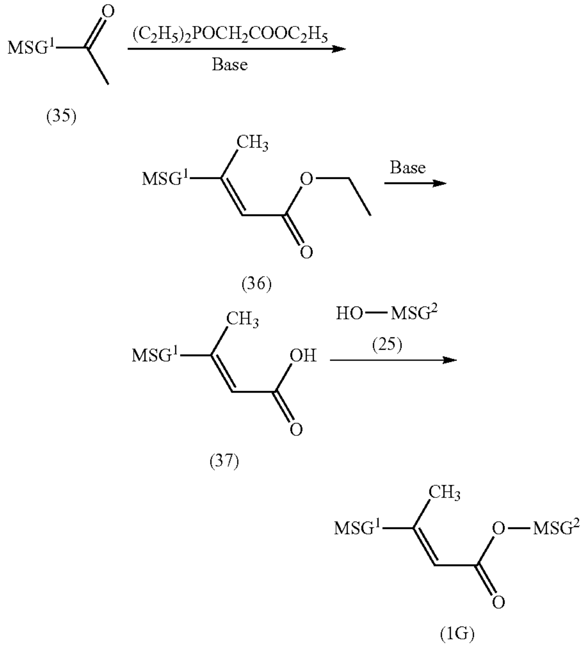

-continued

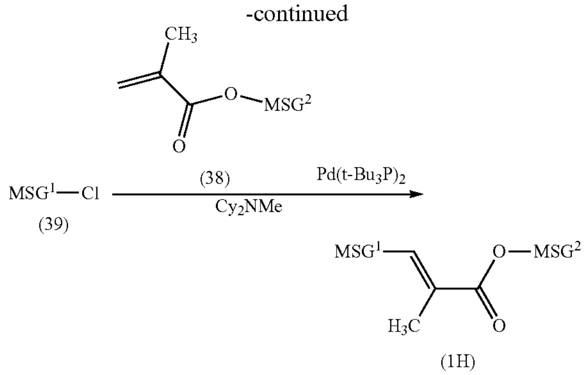

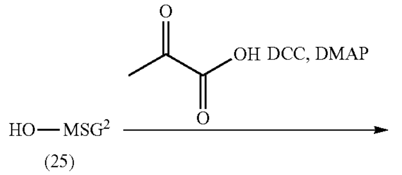

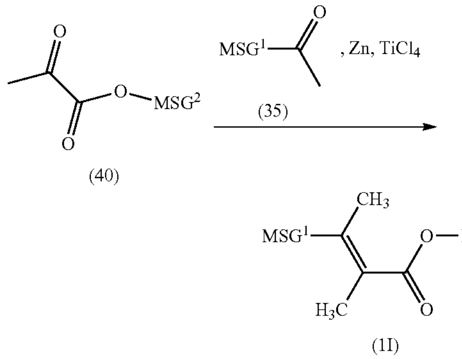

(1) Formation of a Single Bond

Compound (1A) is prepared by the reaction of the arylboronic acid (21) with compound (22) prepared by known methods in the presence of a catalyst such as tetrakis(triphenylphosphine)palladium in an aqueous solution of a carbonate. This compound (1A) can also be prepared by the reaction of compound (23) prepared by known methods with n-butyllithium, and further with zinc chloride, and then by the reaction with compound (22) in the presence of a catalyst such as dichlorobis(triphenylphosphine)palladium.

(2) Formation of —COO—

The carboxylic acid (24) is prepared by the reaction of compound (23) with n-butyllithium and then with carbon dioxide. The dehydration condensation of compound (24) and the phenol (25) prepared by known methods, in the presence of DDC (1,3-dicyclohexylcarbodiimide) and DMAP (N,N-dimethyl-4-aminopyridine) gives compound (1B).

(3) Formation of —$CF_2O$—

The treatment of compound (1B) with a thionating agent such as Lawesson's reagent gives compound (26). Compound (26) is fluorinated with a hydrogen fluoride-pyridine complex and NBS (N-bromosuccinimide) to give compound (1C). See M. Kuroboshi et al., Chem. Lett., 1992, 827. Compound (1C) is also prepared by the fluorination of compound (26) with (diethylamino)sulfur trifluoride (DAST). See W. H. Bunnelle et al., J. Org. Chem. 1990, 55, 768. This bonding group can also be formed according to the method described in Peer. Kirsch et al., Angew. Chem. Int. Ed. 2001, 40, 1480.

(4) Formation of —CH═CH—

Compound (22) is treated with n-butyllithium, and then reacted with a formamide such as N,N-dimethylformamide (DMF) to give the aldehyde (28). The phosphonium salt (27) prepared by known methods is treated with a base such as potassium tert-butoxide, and the resulting phosphorus ylide is allowed to react with the aldehyde (28) to give compound (1D). Since the cis-isomer is formed depending on the reaction conditions, the cis-isomer is isomerized to the trans-isomer by known methods as requested.

(5) Formation of —$CH_2O$—

Compound (28) is reduced with a reducing agent such as sodium borohydride to give compound (29). Compound (29) is halogenated with hydrobromic acid or the like, giving compound (31). Compound (31) is allowed to react with compound (30) in the presence of potassium carbonate or the like, giving compound (1E).

(6) Formation of —CH═CH—OCO—

A phosphorus ylide is prepared by the treatment of ethyl diethylphosphonoacetate with a base such as sodium hydride. The phosphorus ylide is allowed to react with the aldehyde (32) to give the ester (33). The ester (33) is then hydrolyzed in the presence of a base such as sodium hydroxide to give the carboxylic acid (34). Compound (1F) is prepared by the dehydration condensation of this compound and compound (25).

(7) Formation of —$C(CH_3)$═CH—OCO—

A phosphorus ylide is prepared by the treatment of ethyl diethylphosphonoacetate with a base such as sodium hydride. The phosphorus ylide is allowed to react with the methyl ketone (35) to give the ester (36). The ester is then hydrolyzed in the presence of a base such as sodium hydroxide to give the carboxylic acid (37). Compound (1G) is prepared by the dehydration condensation of this compound and compound (25).

(8) Formation of —CH═$C(CH_3)$—OCO—

Compound (1H) is prepared by the reaction of compound (38) prepared by known methods with compound (39) prepared by known methods in the presence of a base such as N,N-dicyclohexylmethylamine ($Cy_2NMe$) and a catalyst such as bis(tri-tert-butylphosphine)palladium.

(9) Formation of —$C(CH_3)$═$C(CH_3)$—OCO—

The dehydration condensation of compound (25) and pyruvic acid gives compound (40). Compound (1I) is prepared by the reaction of compound (40) with compound (35) in the presence of zinc and titanium tetrachloride.

2-2. Formation of the Linking Group Sp

The compound where the polymerizable group is —OCO-($M^1$)C═CH($M^2$) will be explained first in items (1) to (5). The compound where the polymerizable group is —SCO-($M^1$)C═CH($M^2$) will be referred in item (6).

(1) A Single Bond

Examples of the method for forming compound (1) where the linking group Sp is a single bond are shown in the scheme described below. In these schemes, $MSG^1$ is a monovalent organic group having at least one ring. Compounds (1J) to (1M) correspond to compound (1).

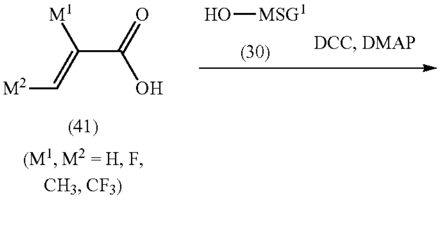

-continued

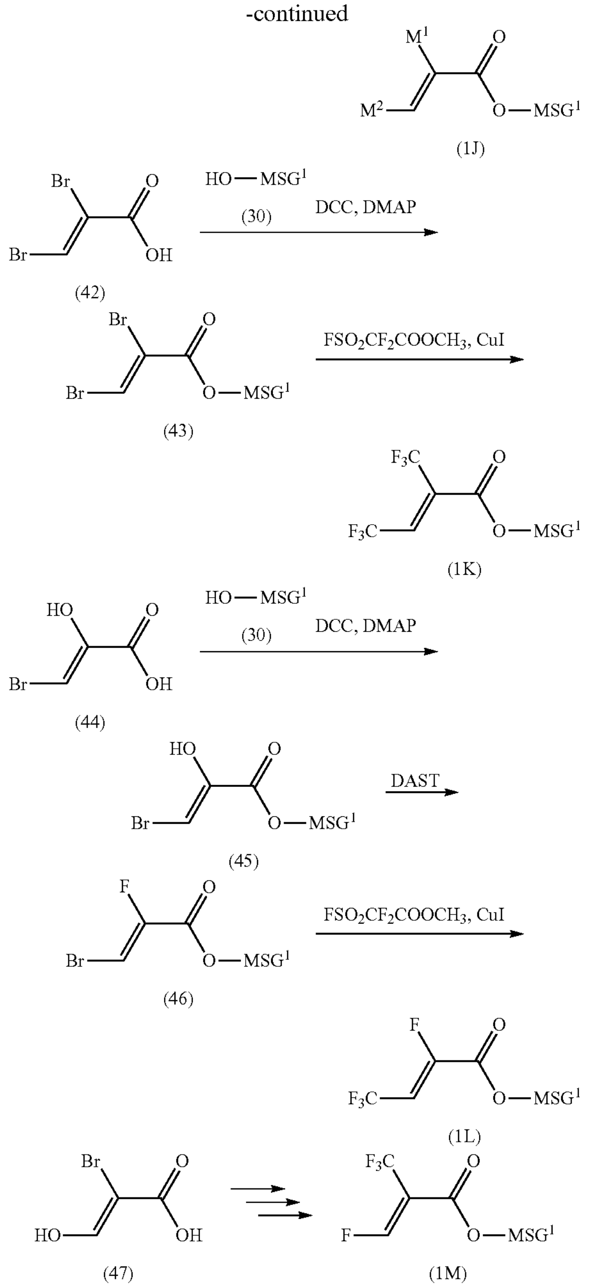

The carboxylic acid (41) shown in the above scheme, where both $M^1$ and $M^2$ are not —$CF_3$, where $M^1$ is fluorine and $M^2$ is not —$CF_3$, or where $M^1$ is —$CF_3$ and $M^2$ is not fluorine, is commercially available. The dehydration condensation of this carboxylic acid (41) and compound (30) in the presence of DCC and DMAP gives compound (1J).

In the case where both $M^1$ and $M^2$ are —$CF_3$, compound (43) was prepared by the dehydration condensation of the carboxylic acid (42) and compound (30) in the presence of DCC and DMAP. Compound (43) is allowed to react with methyl 2,2-difluoro-2-(fluorosulfonyl)acetate in the presence of a catalyst of copper iodide to give compound (1K).

In the case where $M^1$ is fluorine and $M^2$ is —$CF_3$, compound (45) was prepared by the dehydration condensation of the carboxylic acid (44) and compound (30) in the presence of DCC and DMAP. Compound (45) is fluorinated with a fluorinating agent such as DAST to give compound (46). Compound (1L) is prepared by the reaction of compound (46) with methyl 2,2-difluoro-2-(fluorosulfonyl)acetate in the presence of a catalyst of copper iodide.

In the case where $M^1$ is —$CF_3$ and $M^2$ is fluorine, compound (1M) is prepared by using the carboxylic acid (47) as a starting material according to the method described above.

Examples of the method for forming the linking group (Sp≠a single bond) in compound (1) are shown in the scheme described below. In this scheme, $MSG^1$ is a monovalent organic group having at least one ring. Compounds (1N) to (1Q) correspond to compound (1).

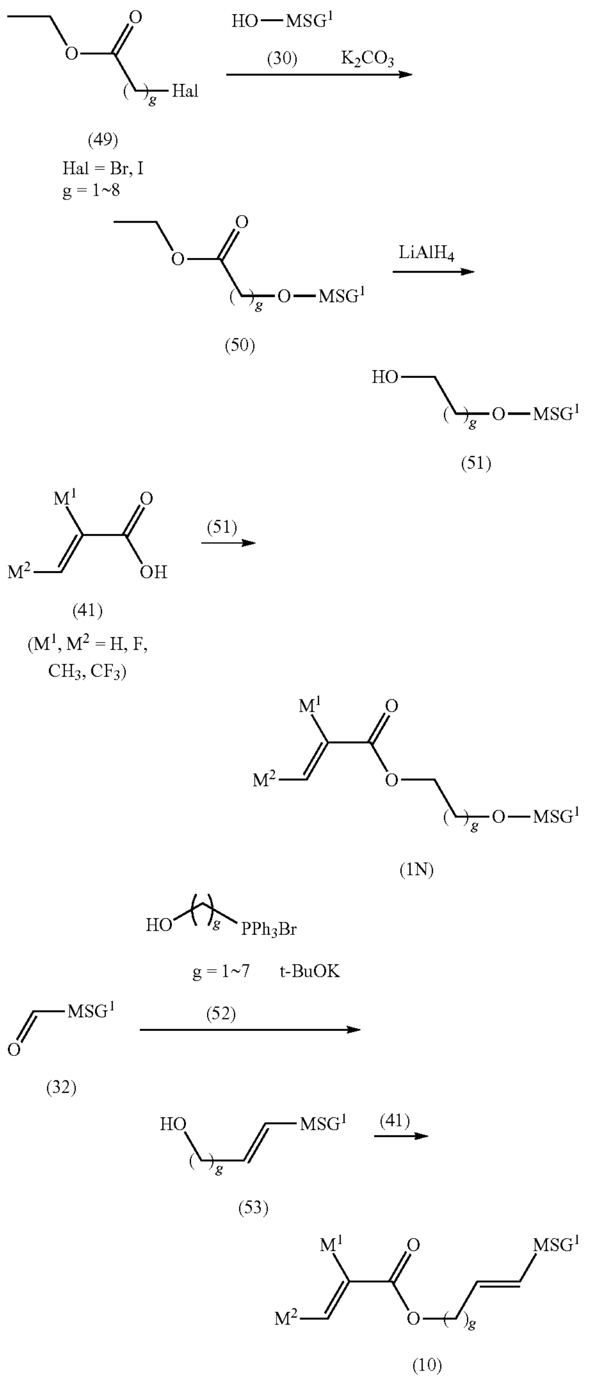

-continued

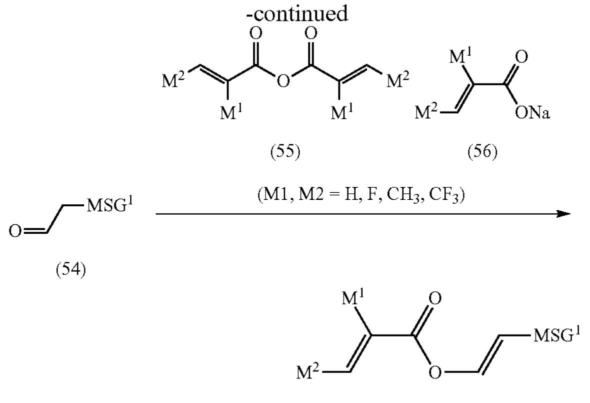

(1P)

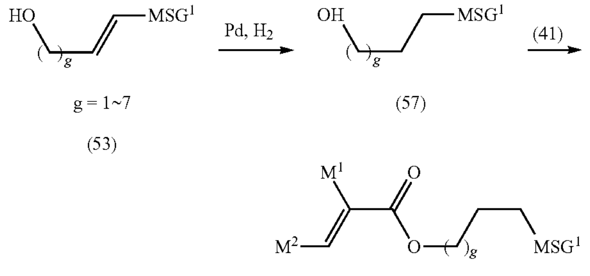

(1Q)

(2) Formation of —$(CH_2)_g$—O—

The reaction of compound (49) prepared by known methods with compound (30) in the presence of potassium carbonate or the like gives compound (50). Compound (50) is reduced with a reducing agent such as lithium aluminum hydride to give compound (51). The dehydration condensation of compound (51) and the carboxylic acid (41) gives compound (1N).

(3) Formation of —$(CH_2)_g$—CH═CH—

A phosphorus ylide generated by the treatment of the phosphonium salt (52) prepared by known methods with a base such as potassium tert-butoxide is allowed to react with the aldehyde (32) to give compound (53). The dehydration condensation of compound (53) and the carboxylic acid (41) gives compound (10).

(4) Formation of —CH═CH—

The reaction of the aldehyde (54) prepared by known method with the acid anhydride (55) and the sodium carboxylate (56) in the presence of potassium carbonate or the like gives compound (1P).

(5) Formation of —$(CH_2)$g-CH $CH_2$—

The alcohol (57) is prepared by the hydrogenation of compound (53) in the presence of a catalyst such as palladium-carbon. The dehydration condensation of this alcohol and the carboxylic acid (41) gives compound (1Q).

(6) Thioesters

The compound where the polymerizable group is —SCO-$(M^1)C$═$CH(M^2)$ is prepared as follows. Thioesters corresponding to compounds (1J) to (1M) can be formed by carrying out the reaction described in item (1) using the corresponding thiol $MSG^1$-SH as a starting material instead of $MSG^1$-OH (30). Thioesters corresponding to compound (1N) to (1Q) can be formed by carrying out the reaction described in items (2) to (5) using the corresponding thiol $MSG^1$-SH as a starting material instead of $MSG^1$-OH (30).

3. Polymerizable Compositions

The polymerizable composition includes at least one of compound (1) as the first component. The component of the composition may be the first component alone. The composition may include the other components such as the second component and the third component. The kind of second component and so forth depends on the use of a desired polymer. This polymerizable composition may further include other polymerizable compounds that are different from compound (1), as the second component. Desirable examples of other polymerizable compounds are acrylates, methacrylates, vinyl compounds, vinyloxy compounds, propenyl ethers, epoxy compounds (oxiranes, oxetanes) and vinyl ketones. More desirable examples are a compound having at least one acryloyloxy and a compound having at least one methacryloyloxy. More desirable examples also include a compound having both acryloyloxy and methacryloyloxy.

Specific examples of other polymerizable compounds are compounds (M-1) to (M-12). In compounds (M-1) to (M-12), $R^{25}$, $R^{26}$ and $R^{27}$ are independently hydrogen or methyl; u, x and y are independently 0 or 1; v and w are independently an integer from 1 to 10; and $L^{21}$, $L^{22}$, $L^{23}$, $L^{24}$, $L^{25}$ and $L^{26}$ are independently hydrogen or fluorine.

(M-1)

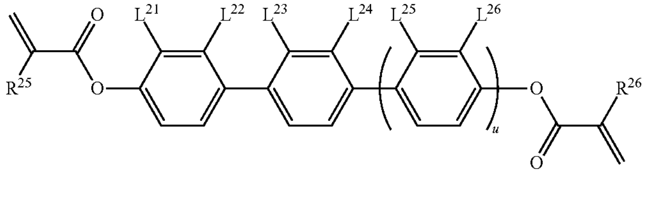

(M-2)

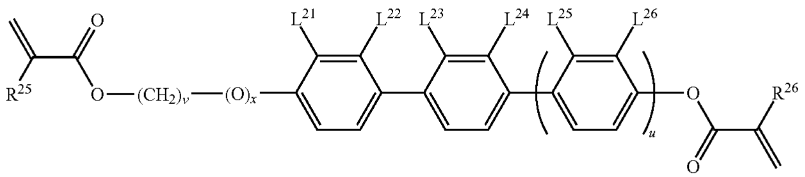

-continued
(M-3)
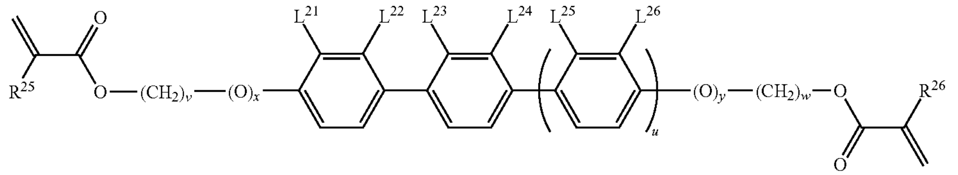
(M-4)
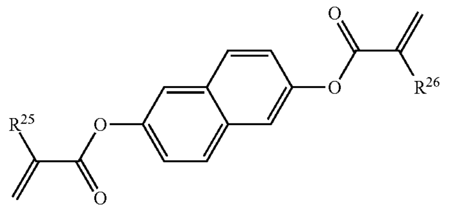
(M-5)
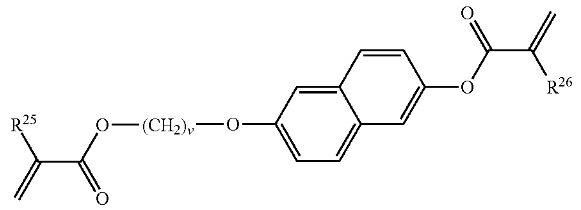
(M-6)
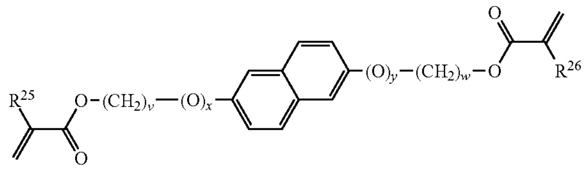
(M-7)
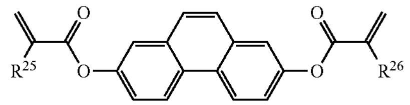
(M-8)
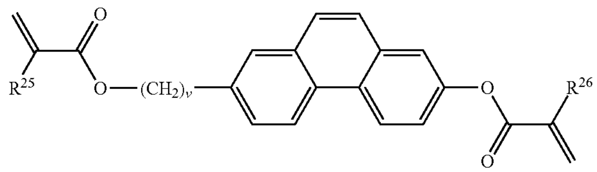
(M-9)
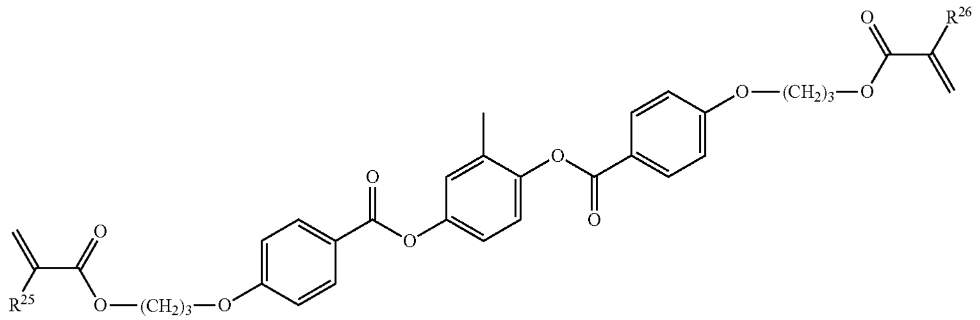
(M-10)
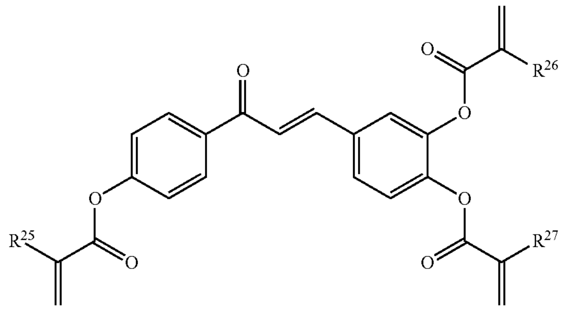
(M-11)
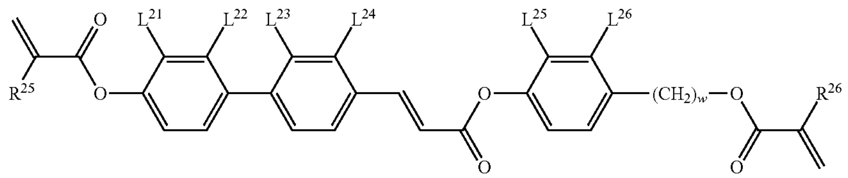

-continued (M-12)

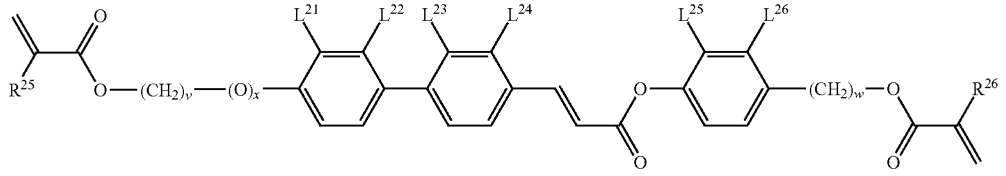

When the second component of the polymerizable composition is a polymerizable compound having a liquid crystal phase, the polymerization in which the orientation of liquid crystal molecules is regulated gives an optically anisotropic material. This optically anisotropic material can be used for an optical retardation film, a polarizer, a circularly polarized light element, an elliptically polarized light element, an antireflection film, a selective reflection film, a color compensation film, a viewing angle-compensation film and so forth. An additive such as a polymerization initiator may be added to the polymerizable composition for the purpose of adjusting the characteristics of the optically anisotropic material.

The polymerizable composition may include a liquid crystal composition as the second component. When a liquid crystal display device for use in a mode such as PS-TN, PS-IPS, PS-FFS, PSA-VA or PSA-OCB is desired, it is desirable that the polymerizable composition should include compound (1) as component A, and should further include a compound selected from components B, C, D and E shown below. Component B is compounds (2) to (4). Component C is compound (5). Component D is compounds (6) to (12). Component E is compounds (13) to (15). It is desirable that components B, C, D and E should be selected in consideration of positive or negative dielectric anisotropy, the magnitude of dielectric anisotropy and so forth when this kind of polymerizable composition is prepared. The polymerizable composition in which the component is suitably selected has a high maximum temperature, a low minimum temperature, a small viscosity, a suitable optical anisotropy (that is to say, a large or a small optical anisotropy), a large positive or large negative dielectric anisotropy and a suitable elastic constant (that is to say, a large or a small elastic constant).

In the polymerizable composition including a liquid crystal composition, the added amount of compound (1), that is to say component A, is in the range of 0.05% by weight to 20% by weight based on the liquid crystal composition. A more desirable added amount is in the range of 0.1% by weight to 10% by weight. A further desirable added amount is in the range of 0.2% by weight to 1% by weight. At least one of other polymerizable compounds that are different from compound (1) may further be added. In this case, it is desirable that the total added amount of compound (1) and other polymerizable compounds should be in the range described above. The physical properties of the resulting polymer can be adjusted by a suitable selection of other polymerizable compounds. Examples of other polymerizable compounds are acrylates, methacrylates and so forth, those of which have been explained previously. These examples also include compounds (M-1) to (M-12).

Component B is a compound having halogen or a fluorine-containing group in the right terminal. Desirable examples of component B include compounds (2-1) to (2-16), compounds (3-1) to (3-113) and compounds (4-1) to (4-57). In the compounds of component B, the definition of $R^{11}$ and $X^{11}$ is the same as that described in item 10 above.

(2-1)

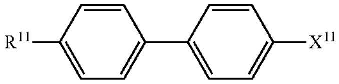

(2-2)

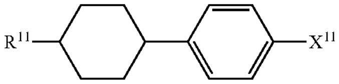

(2-3)

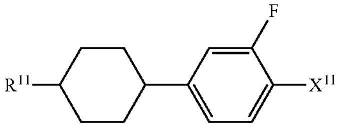

(2-4)

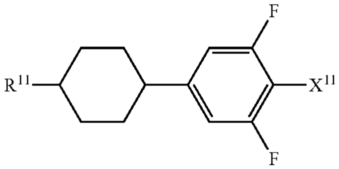

(2-5)

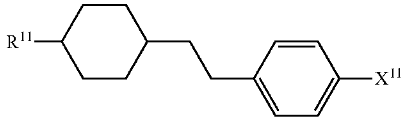

(2-6)

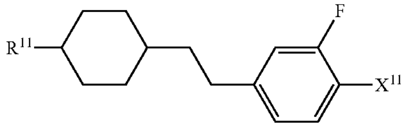

(2-7)

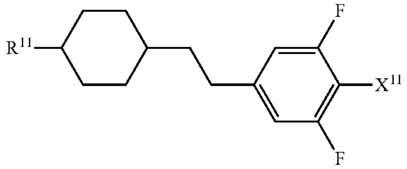

(2-8)

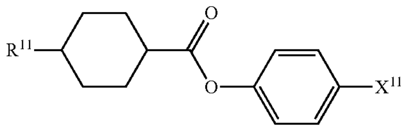

(2-9)

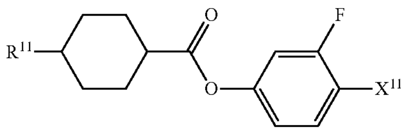

-continued
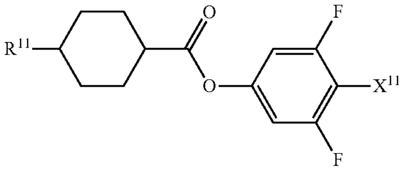
(2-10)
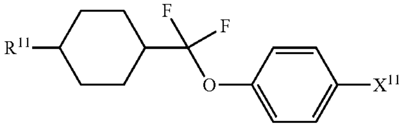
(2-11)
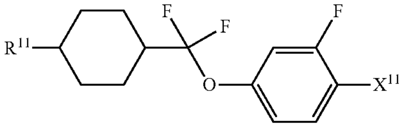
(2-12)
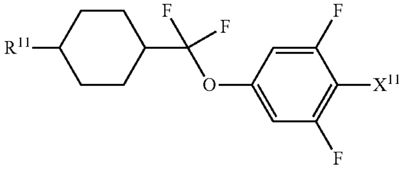
(2-13)
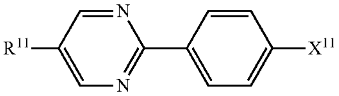
(2-14)
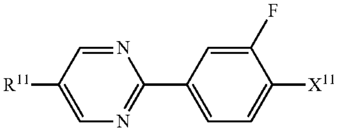
(2-15)
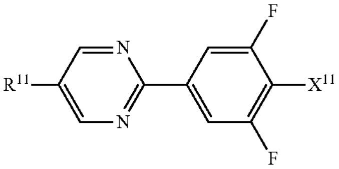
(2-16)
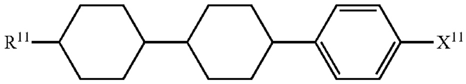
(3-1)
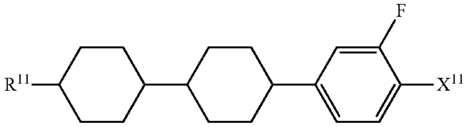
(3-2)
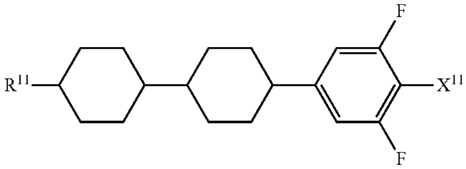
(3-3)
-continued
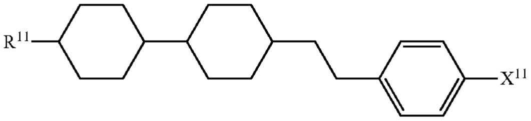
(3-4)
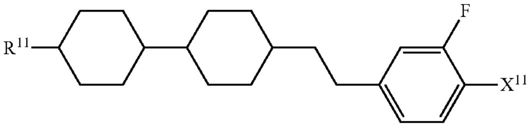
(3-5)
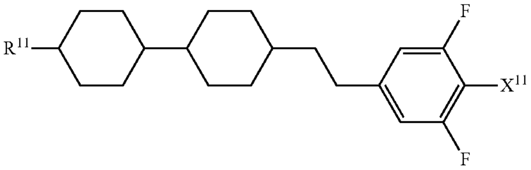
(3-6)
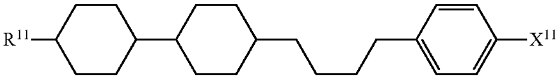
(3-7)
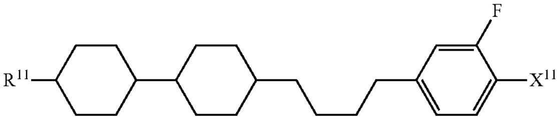
(3-8)
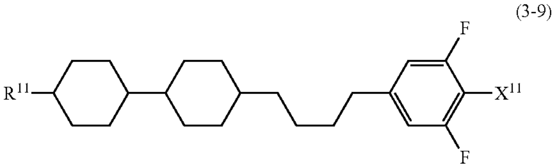
(3-9)
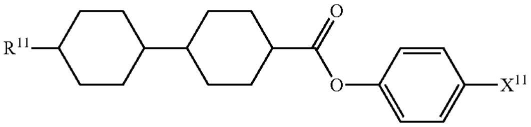
(3-10)
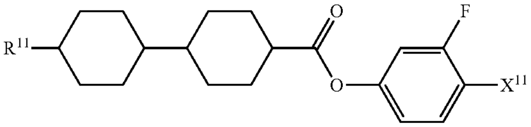
(3-11)
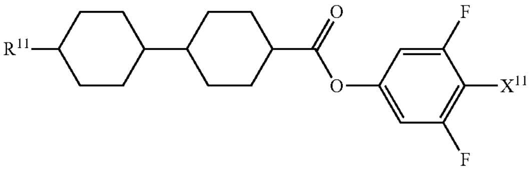
(3-12)
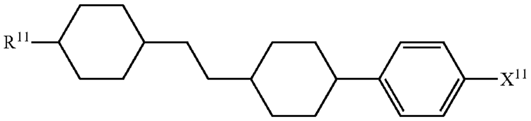
(3-13)

-continued
(3-14)
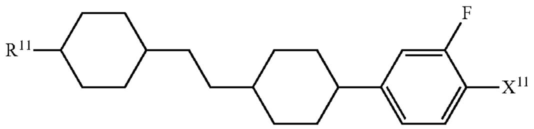
(3-15)
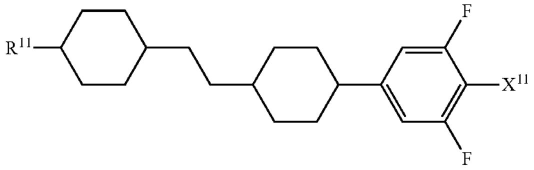
(3-16)
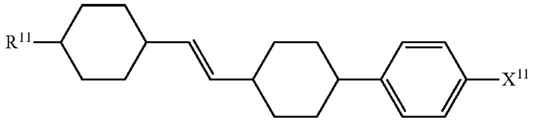
(3-17)
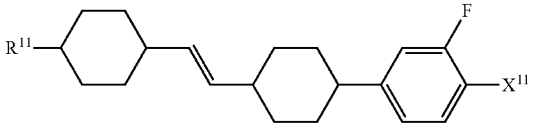
(3-18)
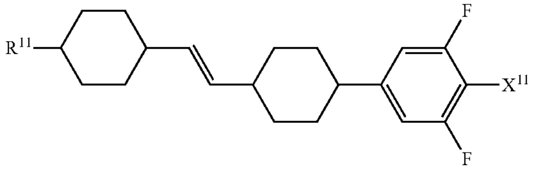
(3-19)
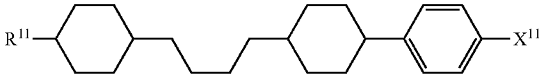
(3-20)
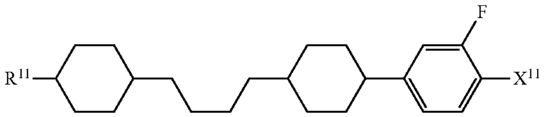
(3-21)
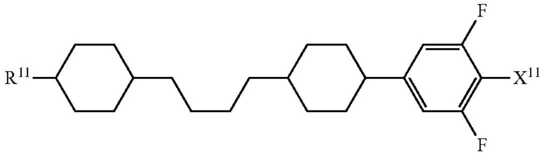
(3-22)
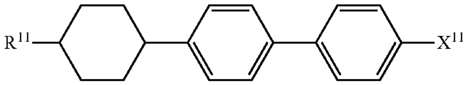
(3-23)
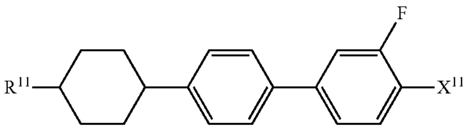
-continued
(3-24)
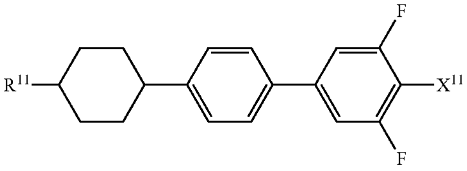
(3-25)
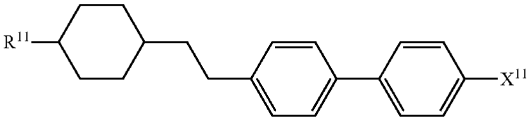
(3-26)
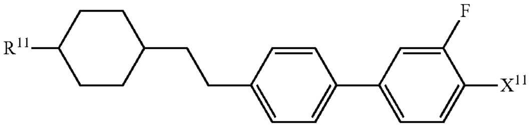
(3-27)
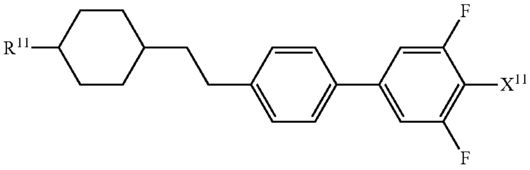
(3-28)
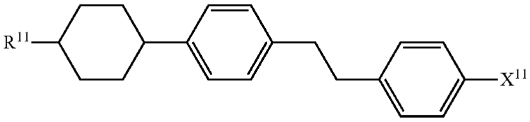
(3-29)
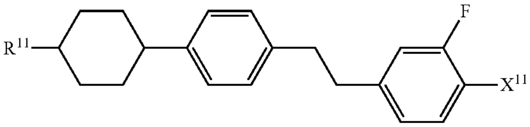
(3-30)
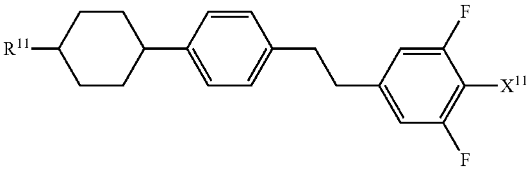
(3-31)
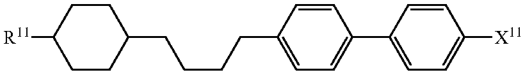
(3-32)
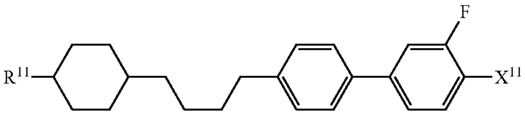

-continued
(3-33)
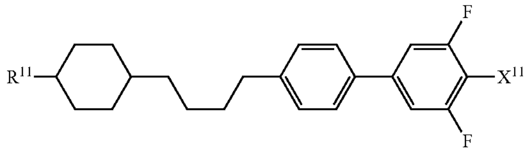
(3-34)
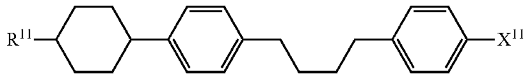
(3-35)
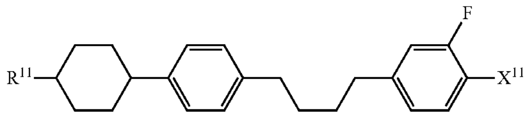
(3-36)
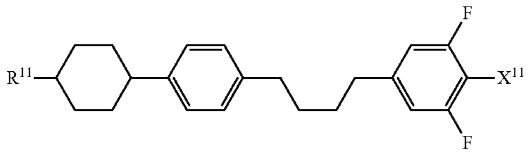
(3-37)
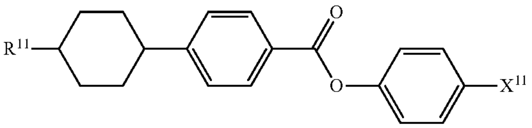
(3-38)
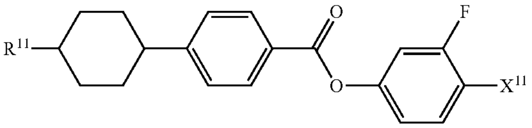
(3-39)
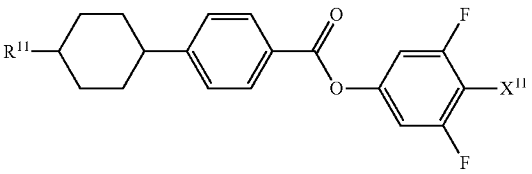
(3-40)
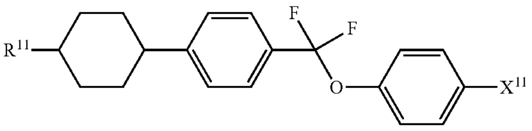
(3-41)
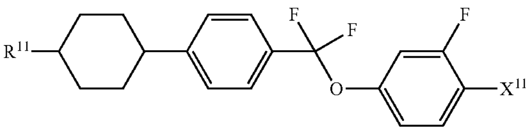
-continued
(3-42)
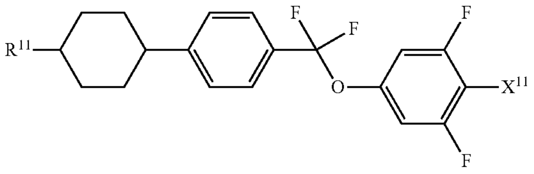
(3-43)
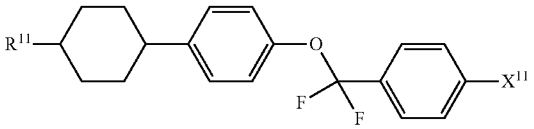
(3-44)
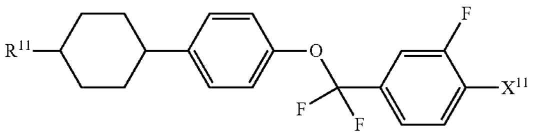
(3-45)
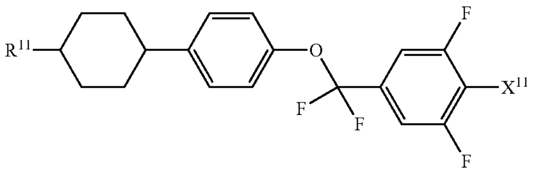
(3-46)
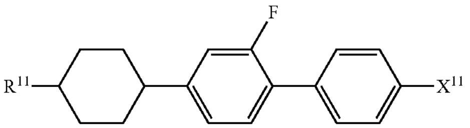
(3-47)
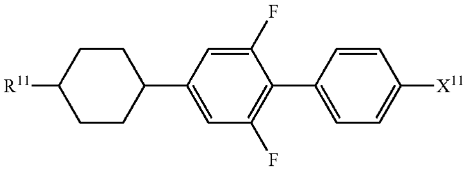
(3-48)
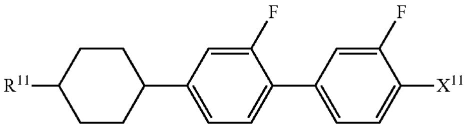
(3-49)
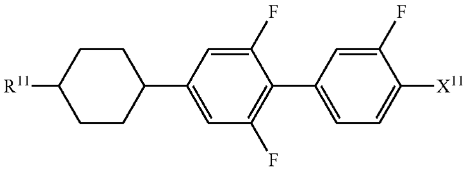
(3-50)
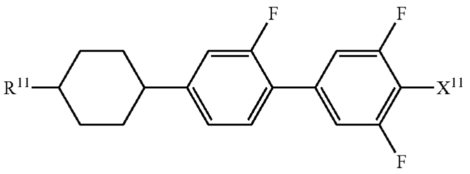

-continued
(3-51)
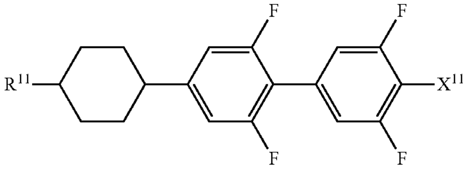
(3-52)
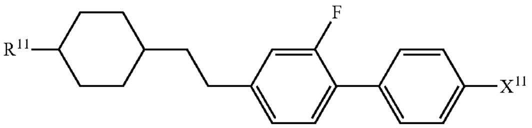
(3-53)
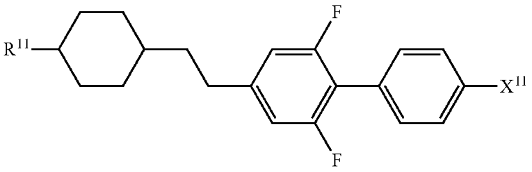
(3-54)
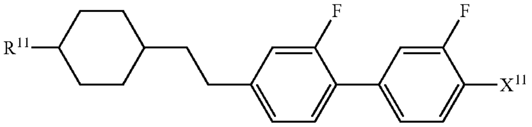
(3-55)
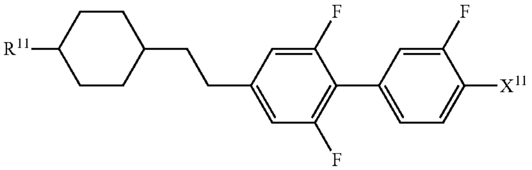
(3-56)
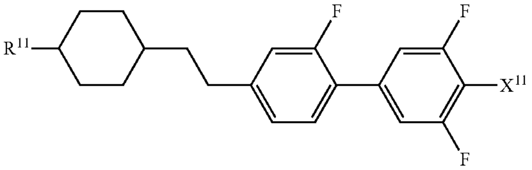
(3-57)
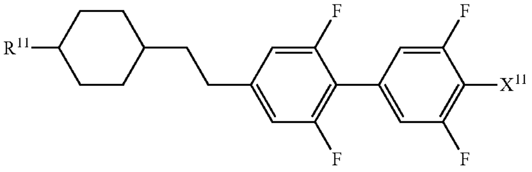
(3-58)
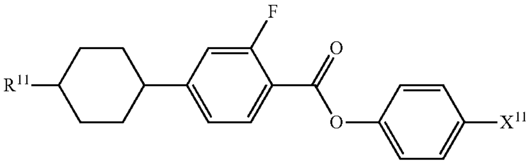
-continued
(3-59)
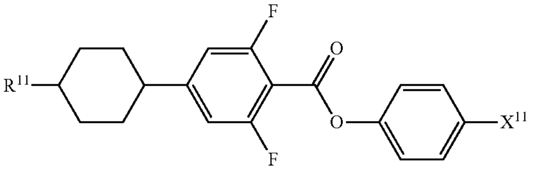
(3-60)
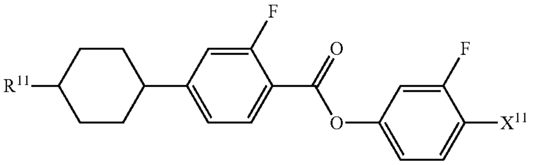
(3-61)
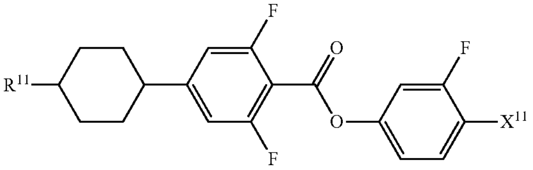
(3-62)
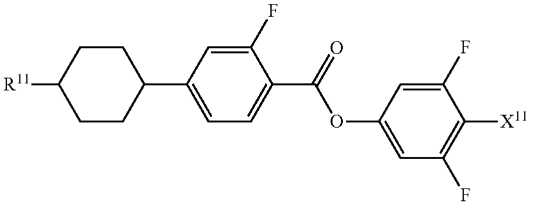
(3-63)
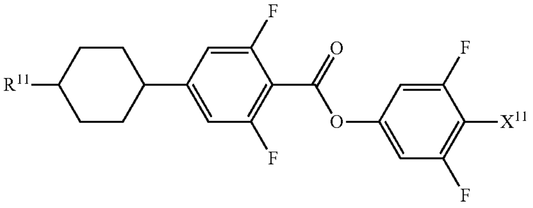
(3-64)
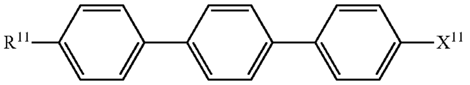
(3-65)
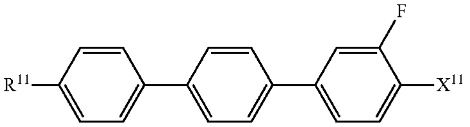
(3-66)
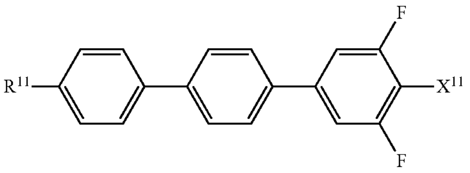

-continued
(3-67)
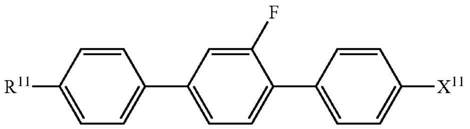
(3-68)
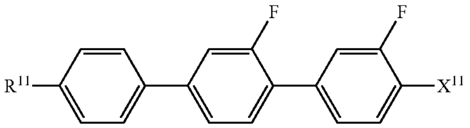
(3-69)
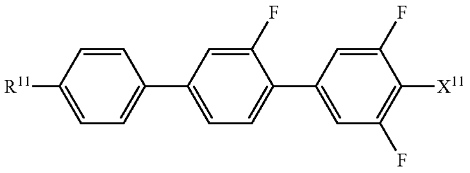
(3-70)
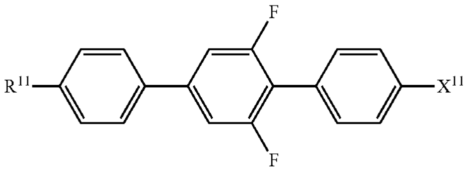
(3-71)
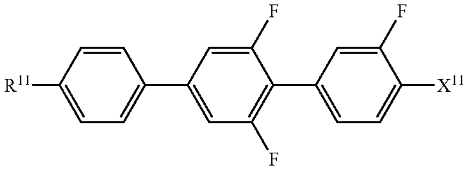
(3-72)
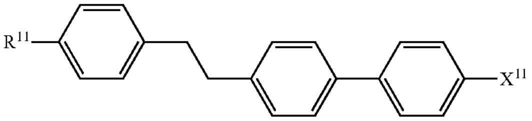
(3-73)
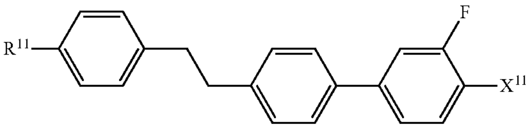
(3-74)
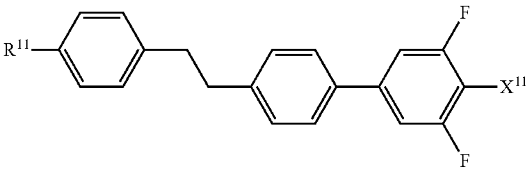
(3-75)
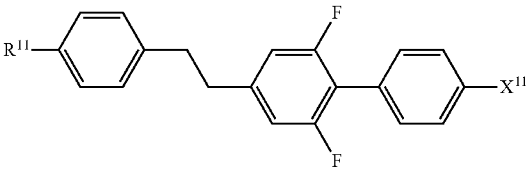
-continued
(3-76)
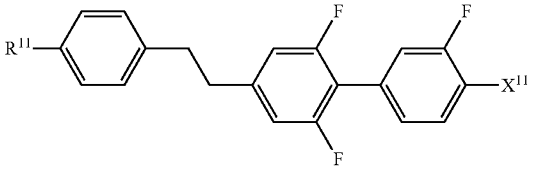
(3-77)
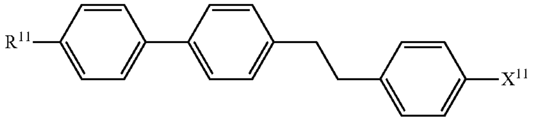
(3-78)
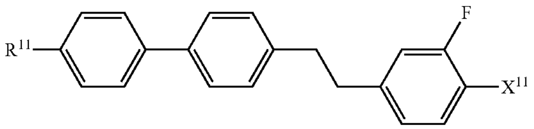
(3-79)
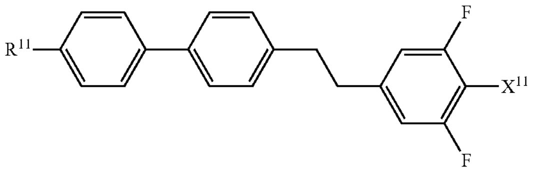
(3-80)
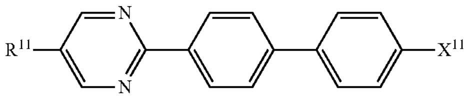
(3-81)
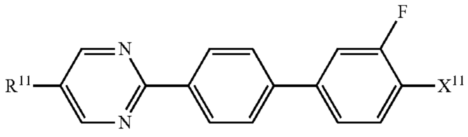
(3-82)
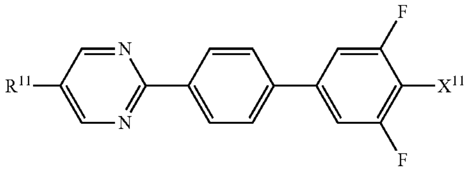
(3-83)
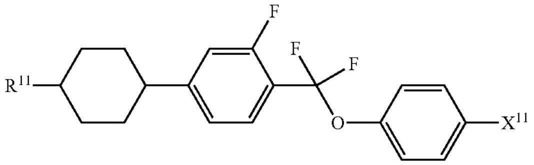
(3-84)
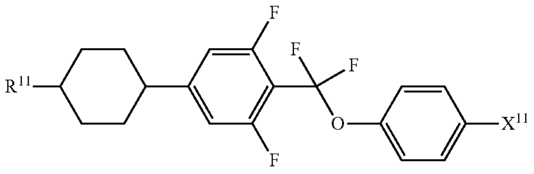

-continued
(3-85)
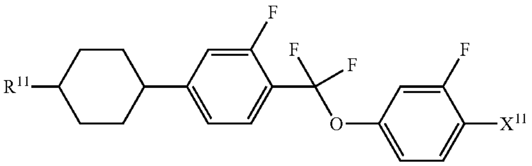
(3-86)
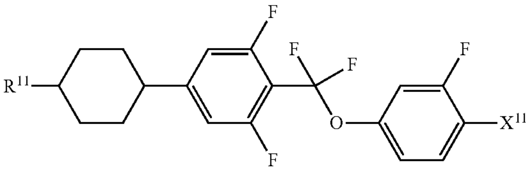
(3-87)
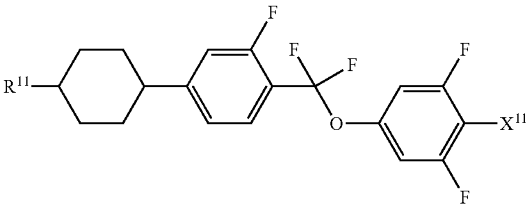
(3-88)
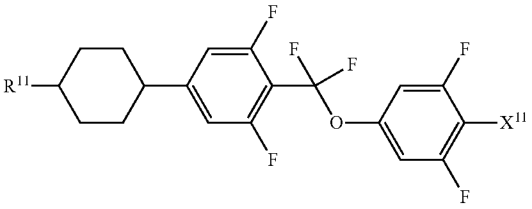
(3-89)
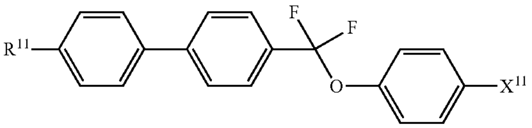
(3-90)
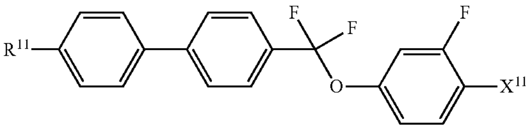
(3-91)
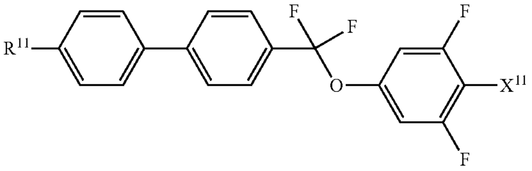
(3-92)
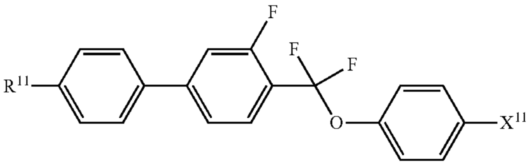
-continued
(3-93)
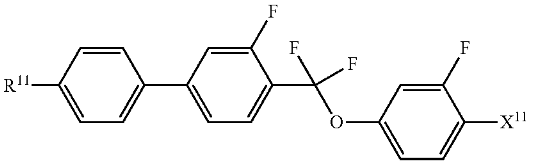
(3-94)
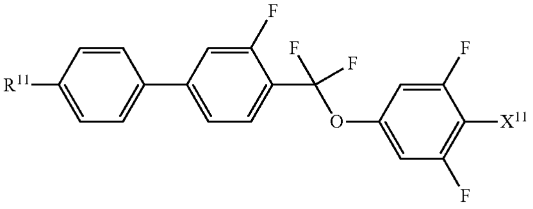
(3-95)
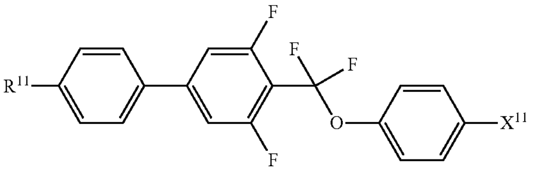
(3-96)
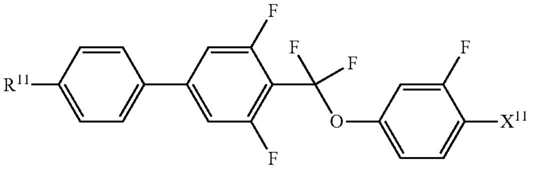
(3-97)
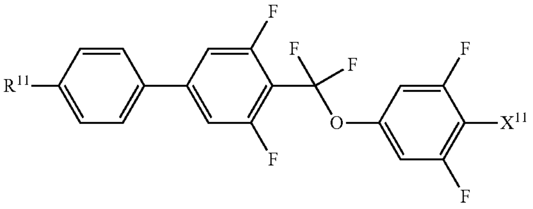
(3-98)
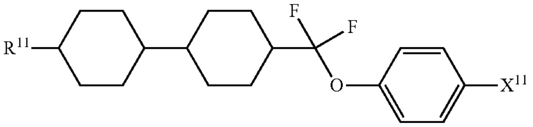
(3-99)
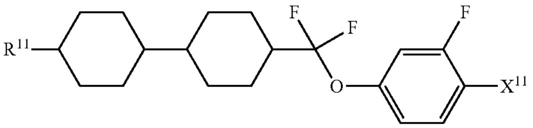
(3-100)
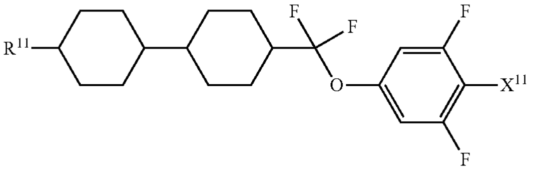

-continued
(3-101)
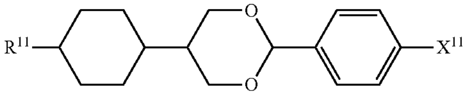
(3-102)
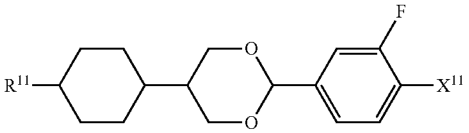
(3-103)
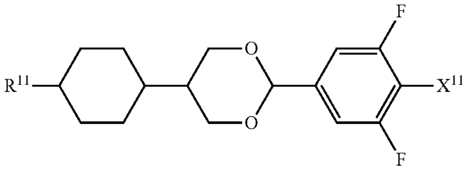
(3-104)
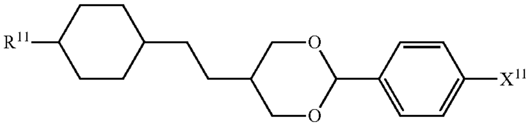
(3-105)
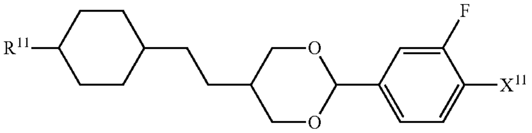
(3-106)
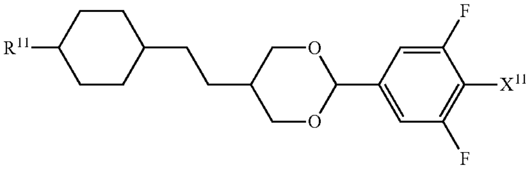
(3-107)
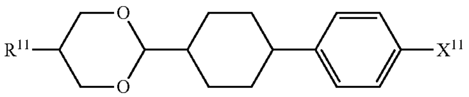
(3-108)
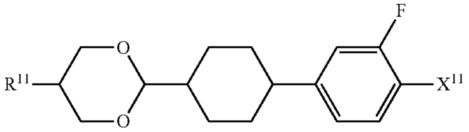
(3-109)
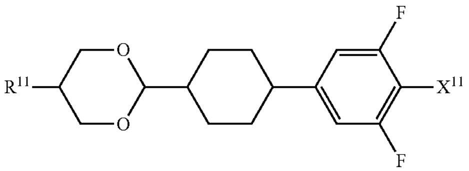
-continued
(3-110)
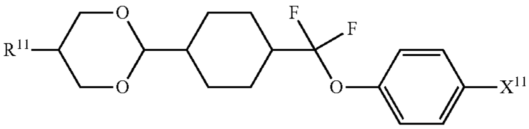
(3-111)
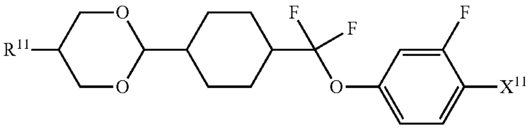
(3-112)
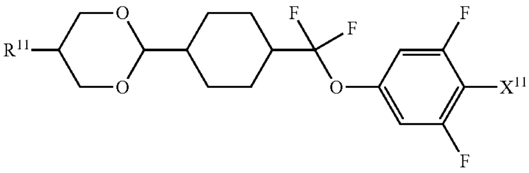
(3-113)
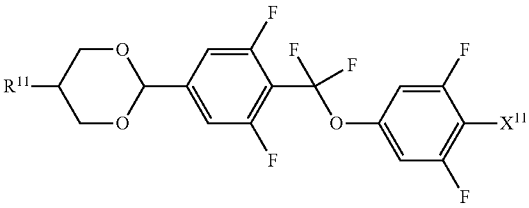
(4-1)
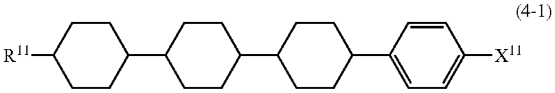
(4-2)
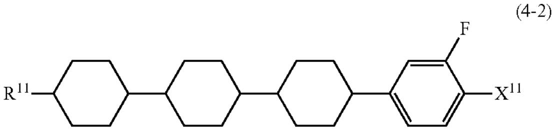
(4-3)
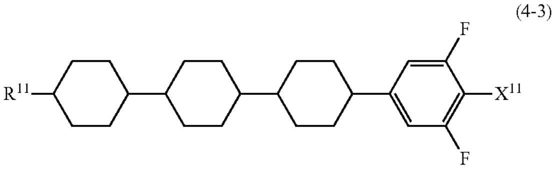
(4-4)
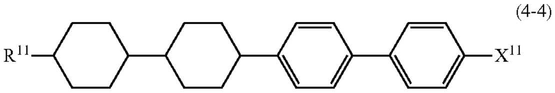
(4-5)
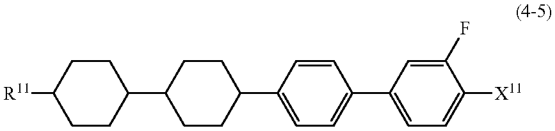
(4-6)
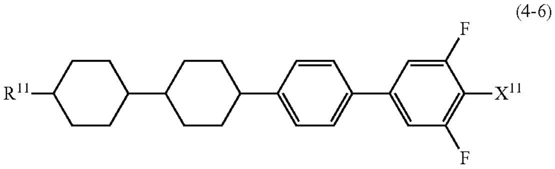

-continued
(4-7)
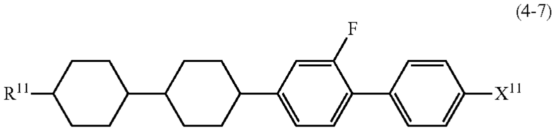
(4-8)
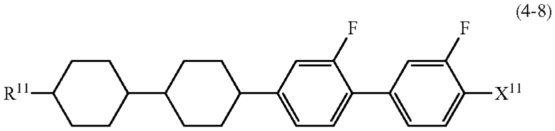
(4-9)
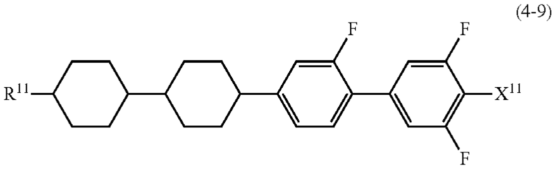
(4-10)
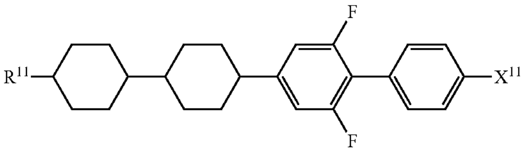
(4-11)
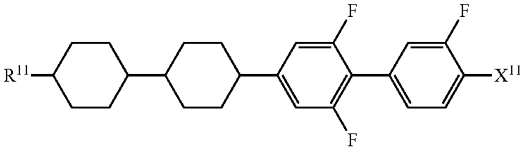
(4-12)
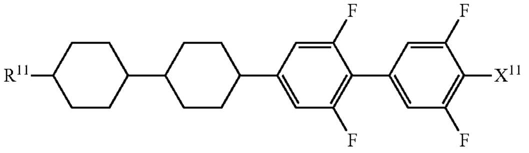
(4-13)
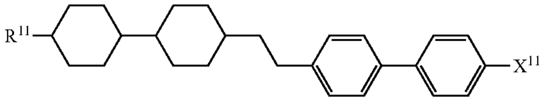
(4-14)
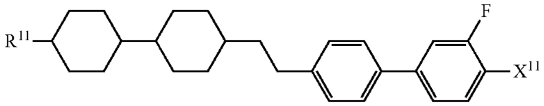
(4-15)
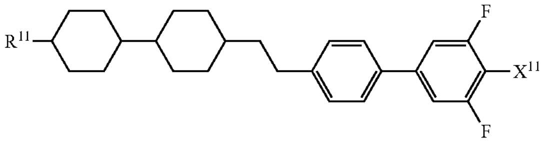
(4-16)
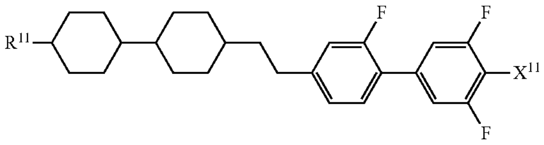
-continued
(4-17)
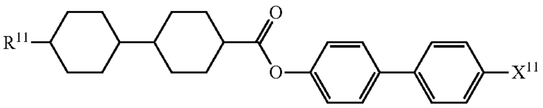
(4-18)
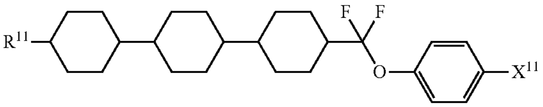
(4-19)
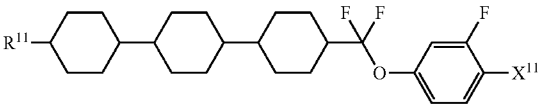
(4-20)
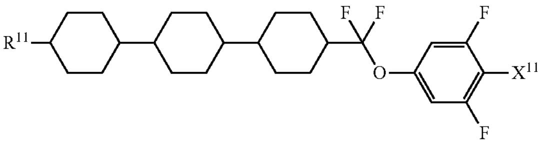
(4-21)
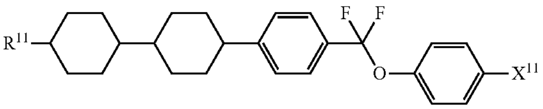
(4-22)
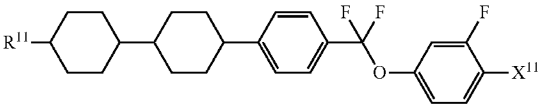
(4-23)
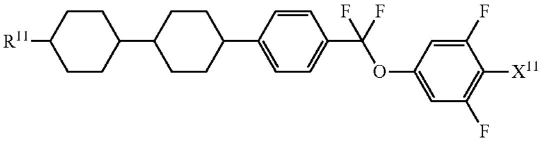
(4-24)
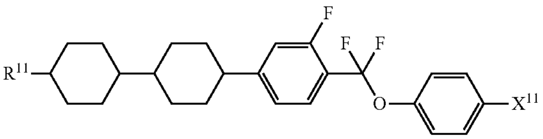
(4-25)
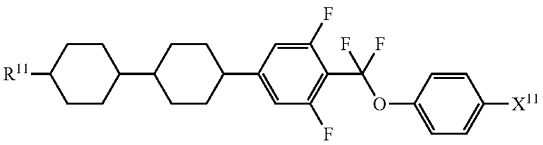
(4-26)
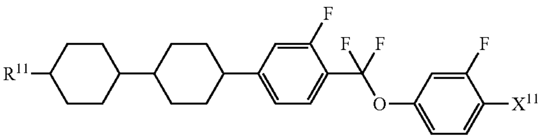

-continued
(4-27)
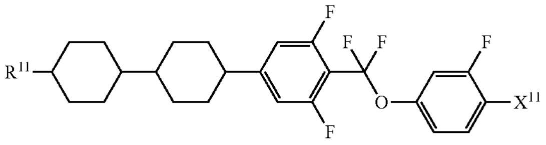
(4-28)
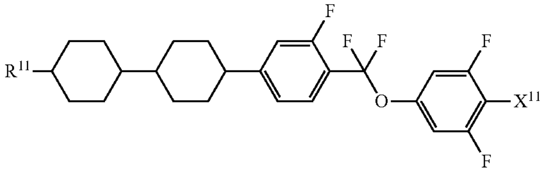
(4-29)
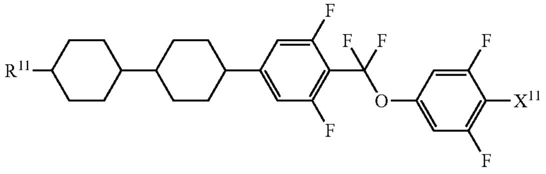
(4-30)
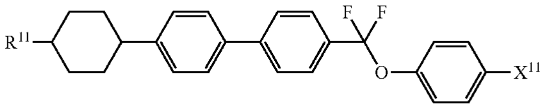
(4-31)
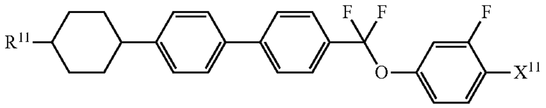
(4-32)
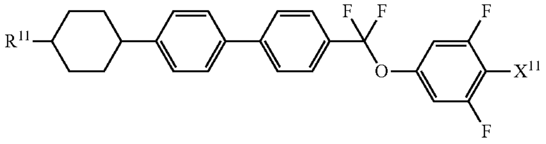
(4-33)
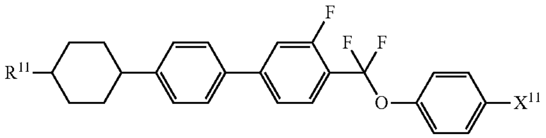
(4-34)
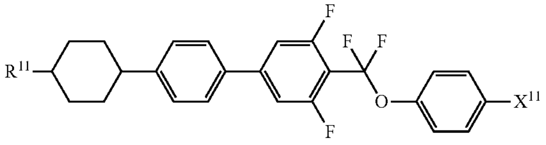
(4-35)
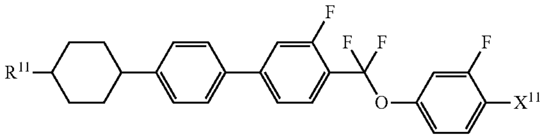
-continued
(4-36)
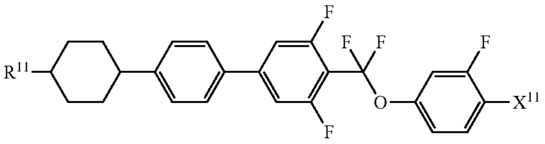
(4-37)
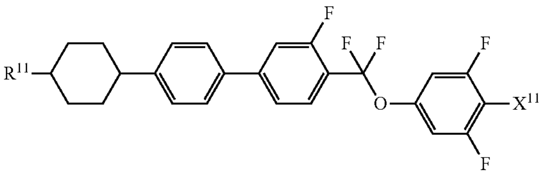
(4-38)
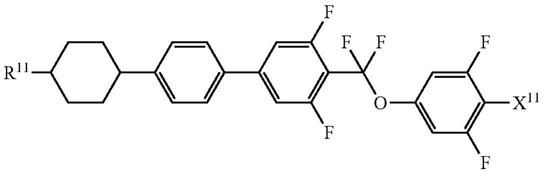
(4-39)
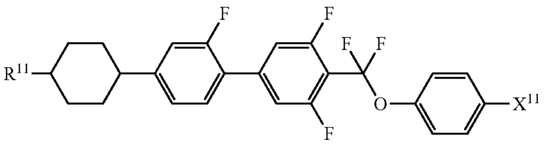
(4-40)
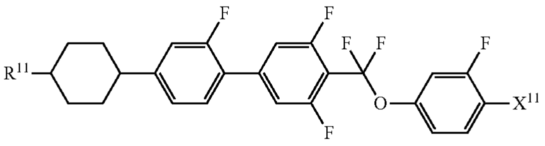
(4-41)
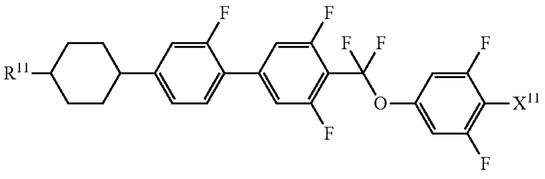
(4-42)
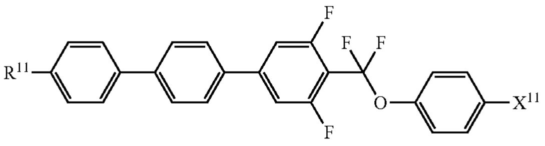
(4-43)
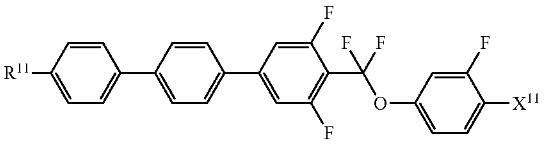

-continued (4-44)

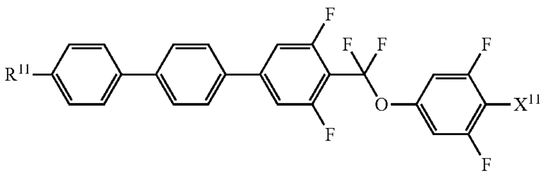

(4-45)

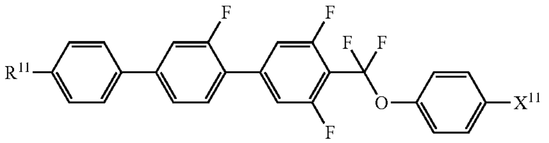

(4-46)

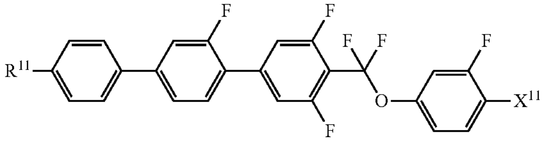

(4-47)

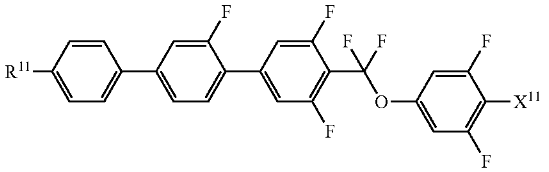

(4-48)

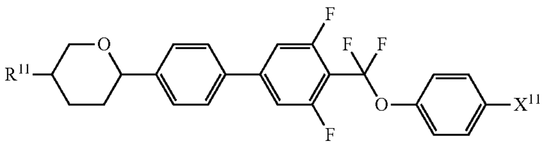

(4-49)

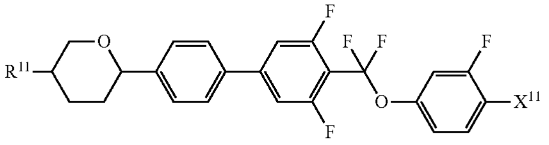

(4-50)

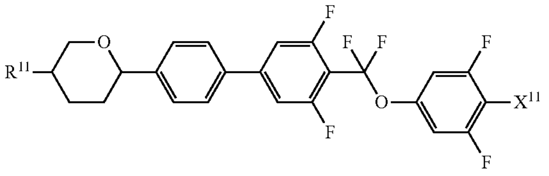

(4-51)

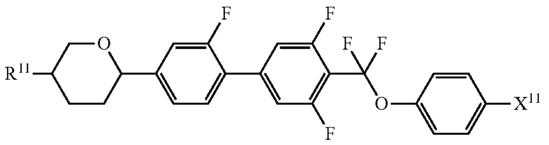

(4-52)

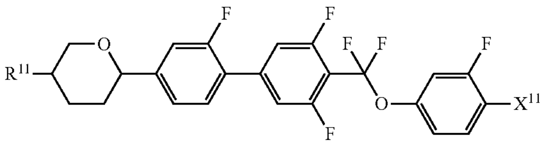

-continued (4-53)

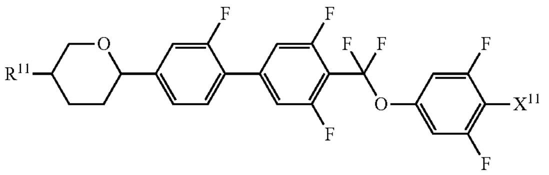

(4-54)

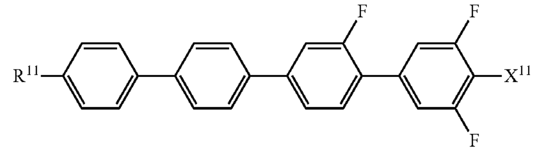

(4-55)

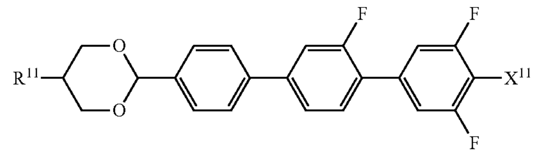

(4-56)

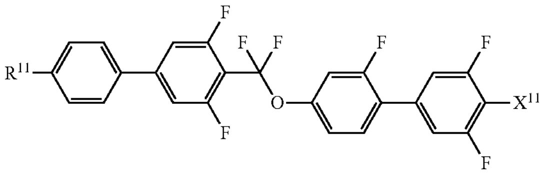

(4-57)

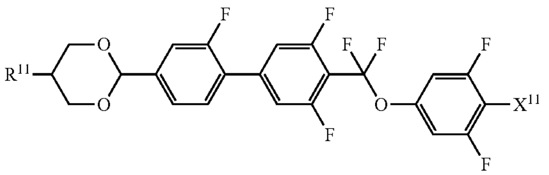

Component B is used for the preparation of a composition for use in modes of PS-IPS, PS-FFS, PSA-OCB and so forth, since the dielectric anisotropy is positive and the stability to heat, light or the like is quite excellent. The content of component B is suitably in the range of 1% by weight to 99% by weight, preferably in the range of 10% by weight to 97% by weight, more preferably in the range of 40% by weight to 95% by weight, based on the liquid crystal composition. In this composition, the viscosity can be adjusted by the further addition of compounds (13) to (15) (component E). It is desirable that the content of component B should be 30% by weight or less based on the liquid crystal composition when component B is added to a composition having negative dielectric anisotropy. The elastic constant of the composition can be adjusted and the voltage-transmission curve of the device can be adjusted by the addition of component B.

Component C is compound (5) where the right-terminal group is —C≡N or —C≡C—C≡N. Desirable examples of component C include compounds (5-1) to (5-64). In the compounds of component C, the definition of $R^{12}$ and $X^{12}$ is the same as that described in item 11 above.

-continued
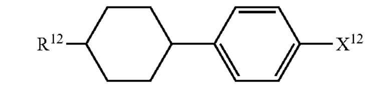
(5-1)
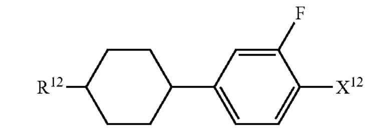
(5-2)
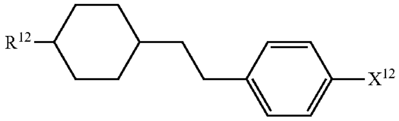
(5-3)
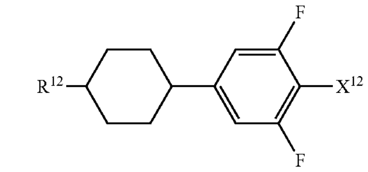
(5-4)
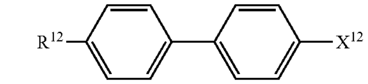
(5-5)
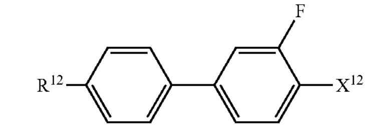
(5-6)
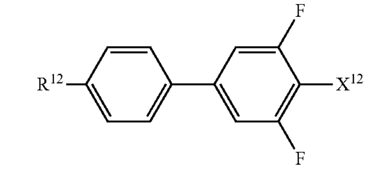
(5-7)
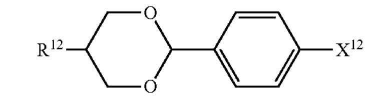
(5-8)
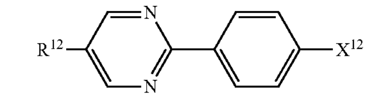
(5-9)
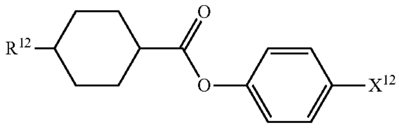
(5-10)
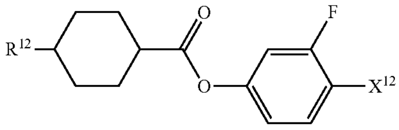
(5-11)
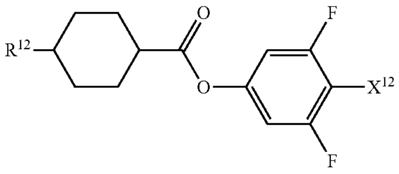
(5-12)
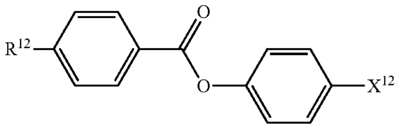
(5-13)
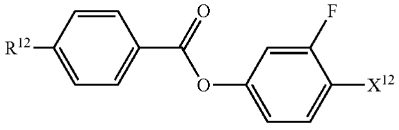
(5-14)
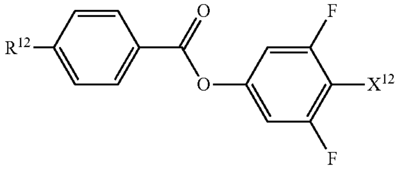
(5-15)
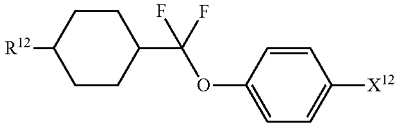
(5-16)
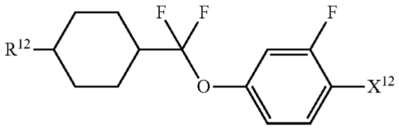
(5-17)
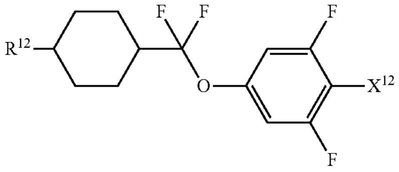
(5-18)
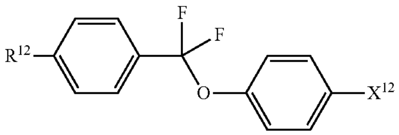
(5-19)
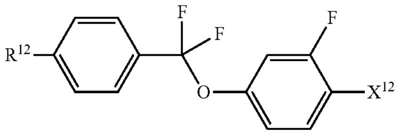
(5-20)
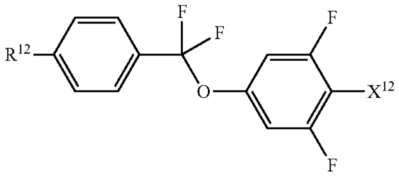
(5-21)

-continued
(5-22)
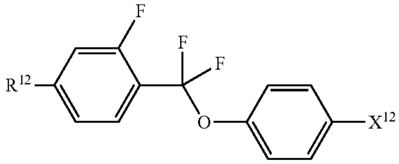
(5-23)
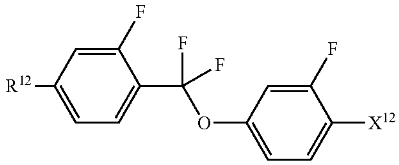
(5-24)
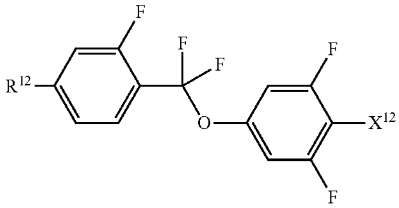
(5-25)
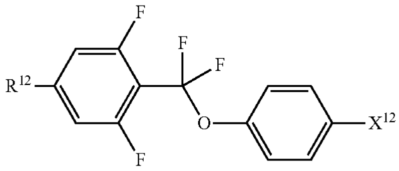
(5-26)
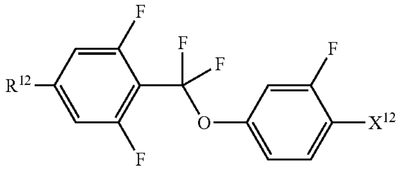
(5-27)
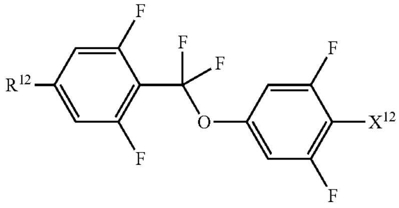
(5-28)
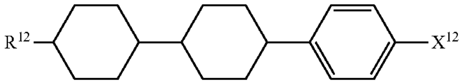
(5-29)
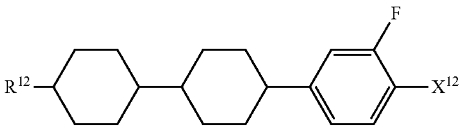
(5-30)
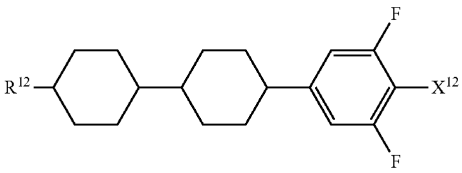
-continued
(5-31)
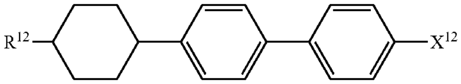
(5-32)
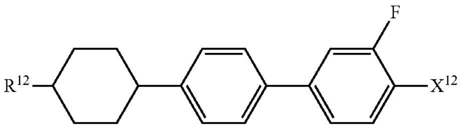
(5-33)
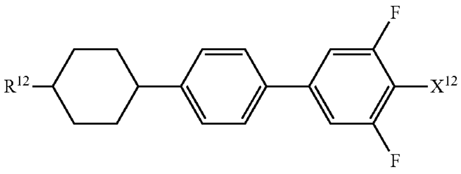
(5-34)
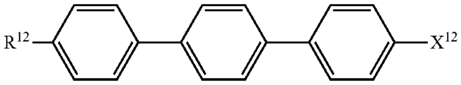
(5-35)
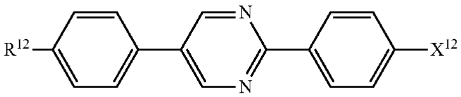
(5-36)
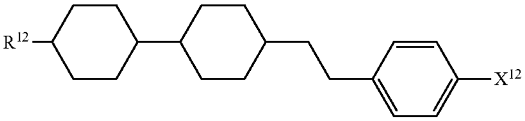
(5-37)
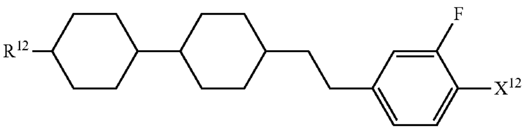
(5-38)
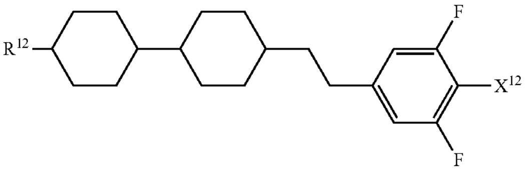
(5-39)
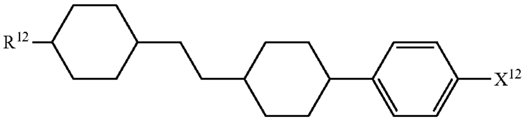
(5-40)
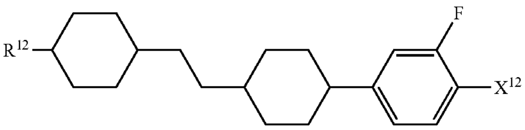

-continued
(5-41)
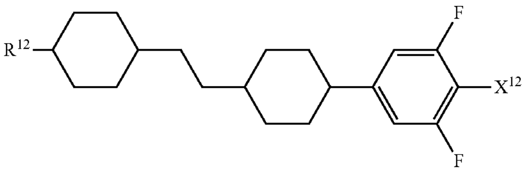
(5-42)
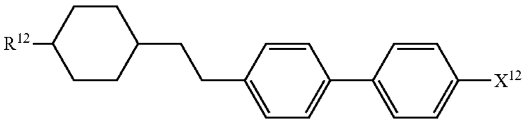
(5-43)
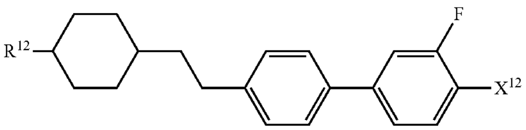
(5-44)
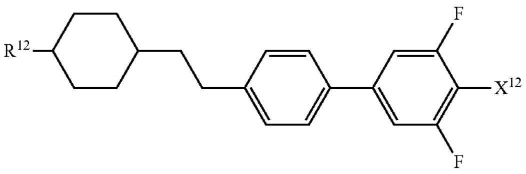
(5-45)
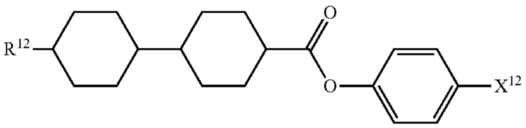
(5-46)
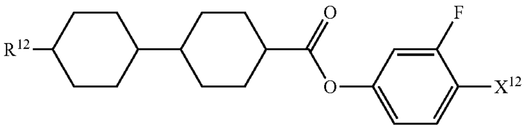
(5-47)
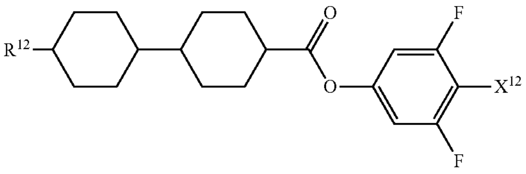
(5-48)
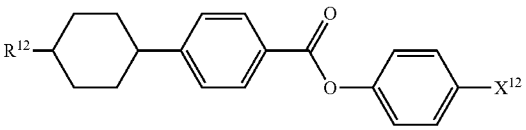
(5-49)
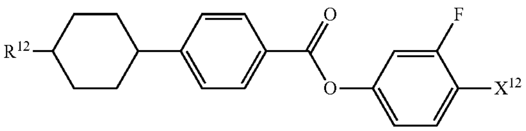
-continued
(5-50)
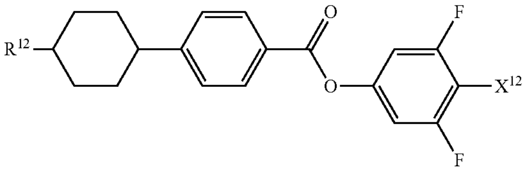
(5-51)
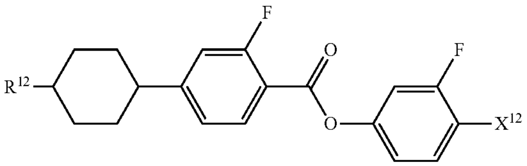
(5-52)
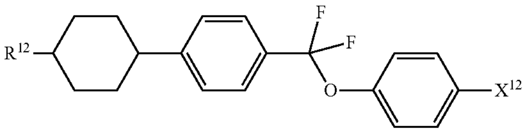
(5-53)
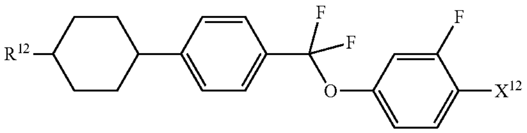
(5-54)
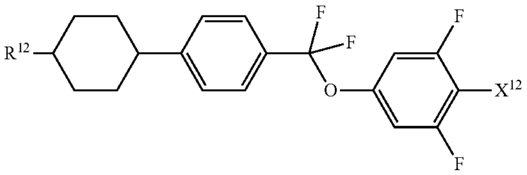
(5-55)
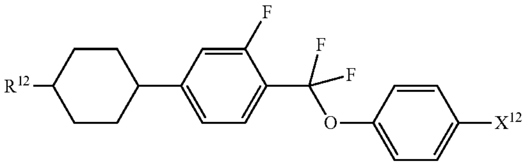
(5-56)
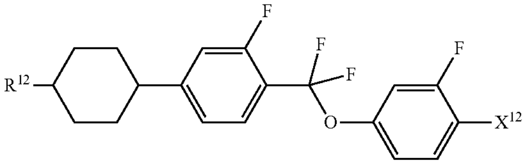
(5-57)
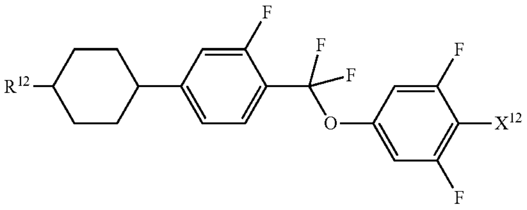

-continued (5-58)

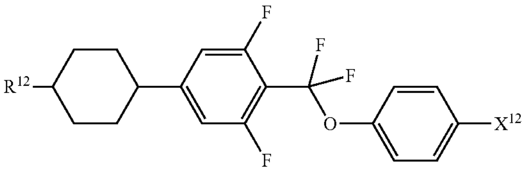

(5-59)

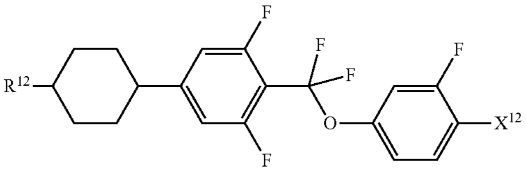

(5-60)

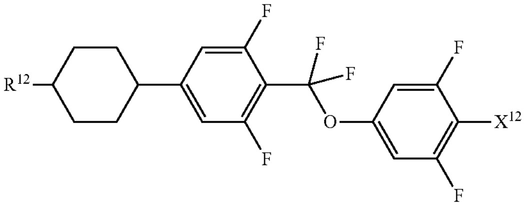

(5-61)

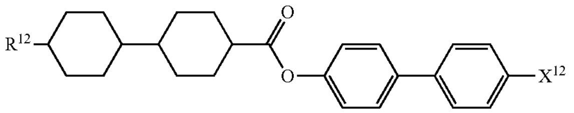

(5-62)

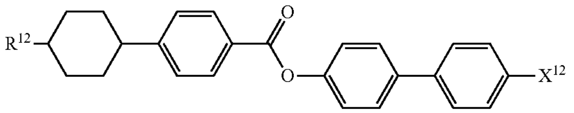

(5-63)

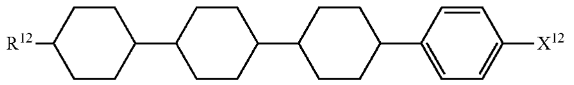

(5-64)

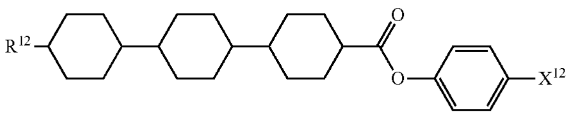

Component C is mainly used for the preparation of a composition for use in a PS-TN mode and so forth, since the dielectric anisotropy is positive and its value is large. The dielectric anisotropy of the composition can be increased by the addition of component C. Component C has the effect of increasing the temperature range of a liquid crystal phase, adjusting the viscosity and adjusting the optical anisotropy. Component C is useful for adjusting the voltage-transmission curve of the device.

The content of component C is suitably in the range of 1% by weight to 99% by weight, preferably in the range of 10% by weight to 97% by weight, more preferably 40% by weight to 95% by weight, based on the liquid crystal composition, in the preparation of a composition for use in a mode of PS-TN or the like. In this composition, the temperature range of a liquid crystal phase, the viscosity, the optical anisotropy, the dielectric anisotropy or the like can be adjusted by the further addition of component E. The content of component C is preferably 30% by weight or less based on the liquid crystal composition when component C is added to a composition having negative dielectric anisotropy. The elastic constant of the composition can be adjusted and the voltage-transmission curve of the device can be adjusted by the addition of component C.

Component D is compounds (6) to (12). These compounds have a benzene ring in which hydrogens in the lateral positions have been replaced by two halogens, such as 2,3-difluoro-1,4-phenylene. Desirable examples of component D include compounds (6-1) to (6-8), compounds (7-1) to (7-17), compounds (8-1), compounds (9-1) to (9-3), compounds (10-1) to (10-11), compounds (11-1) to (11-3) and compounds (12-1) to (12-3). In the compounds of component D, the definition of $R^{13}$, $R^{14}$ and $R^{15}$ is the same as that described in item 12 above.

(6-1)

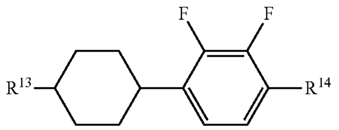

(6-2)

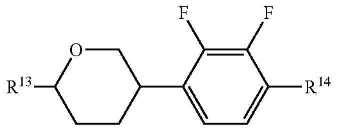

(6-3)

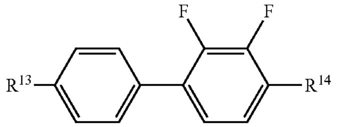

(6-4)

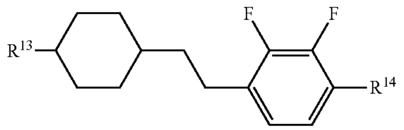

(6-5)

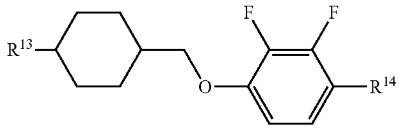

(6-6)

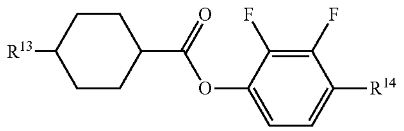

(6-7)

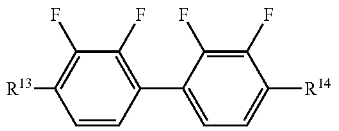

(6-8)

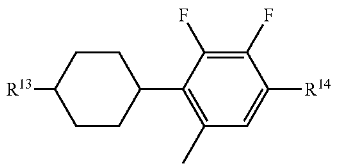

-continued
(7-1)
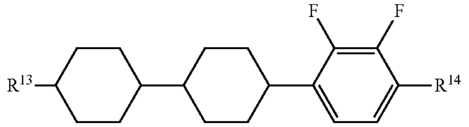
(7-2)
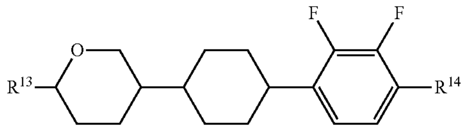
(7-3)
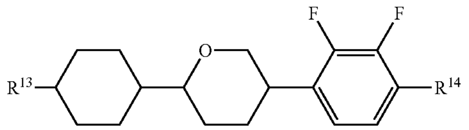
(7-4)
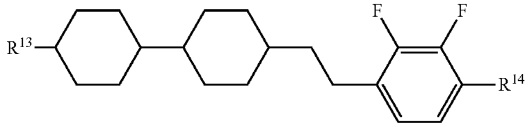
(7-5)
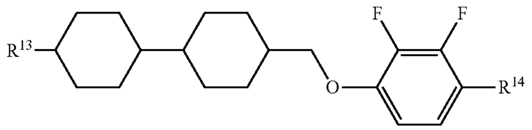
(7-6)
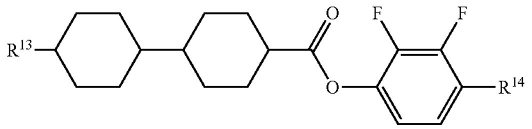
(7-7)
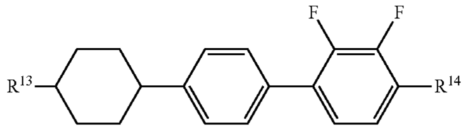
(7-8)
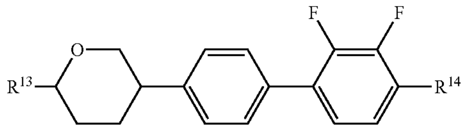
(7-9)
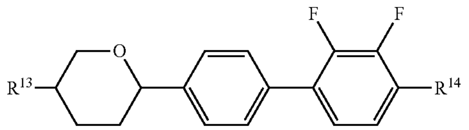
(7-10)
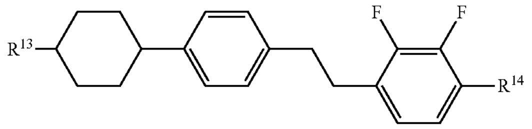
(7-11)
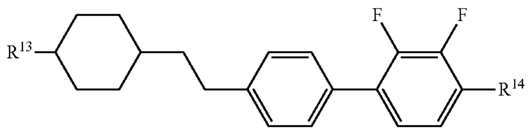
-continued
(7-12)
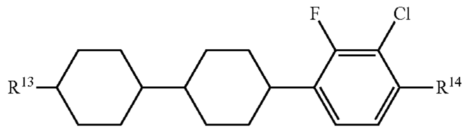
(7-13)
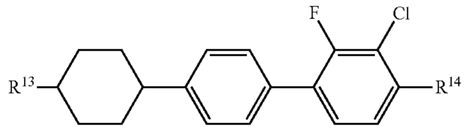
(7-14)
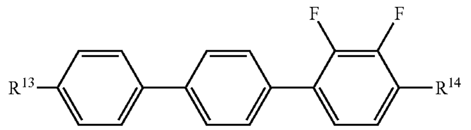
(7-15)
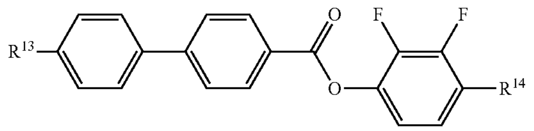
(7-16)
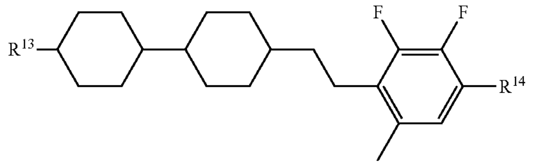
(7-17)
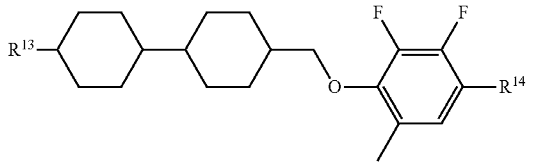
(8-1)
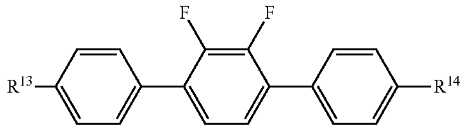
(9-1)
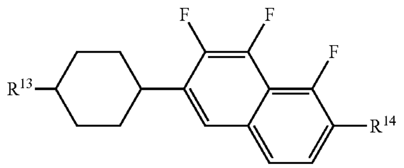
(9-2)
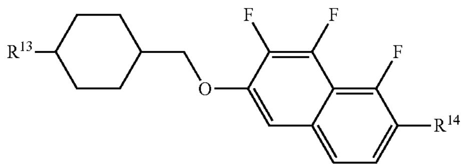

-continued
(9-3)
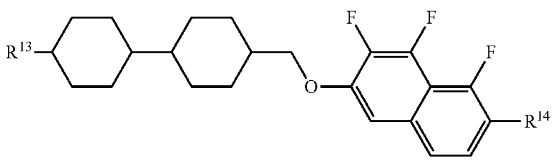
(10-1)
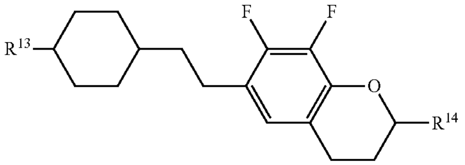
(10-2)
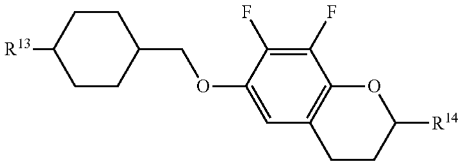
(10-3)
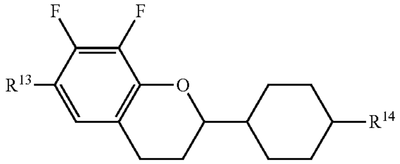
(10-4)
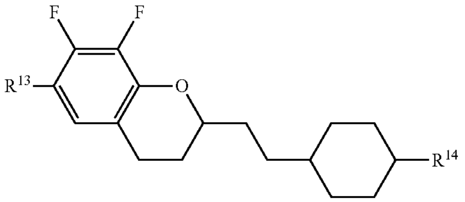
(10-5)
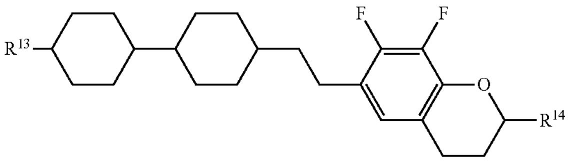
(10-6)
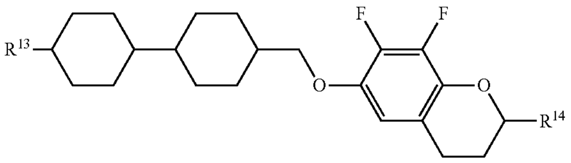
(10-7)
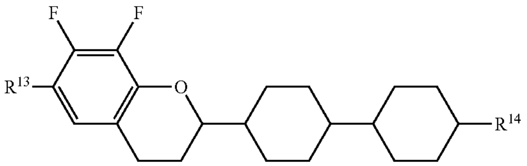
-continued
(10-8)
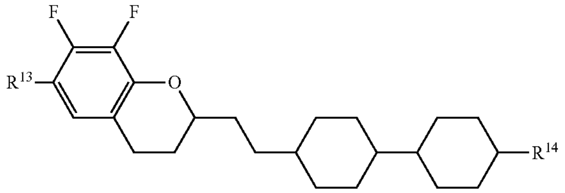
(10-9)
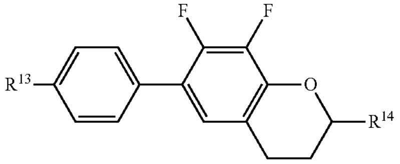
(10-10)
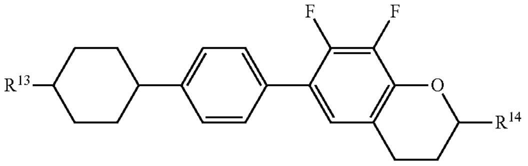
(10-11)
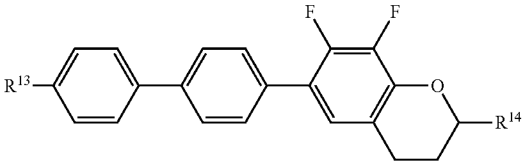
(11-1)
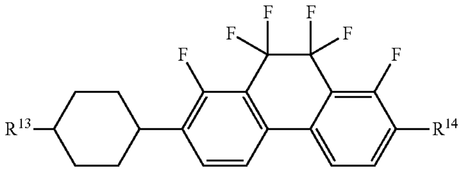
(11-2)
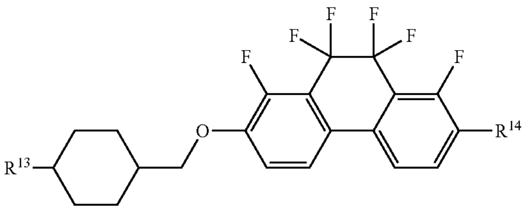
(11-3)
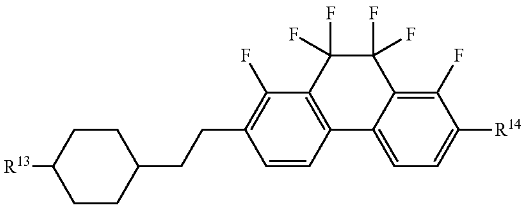
(12-1)
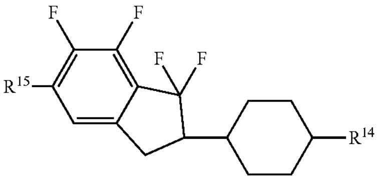

-continued (12-2)

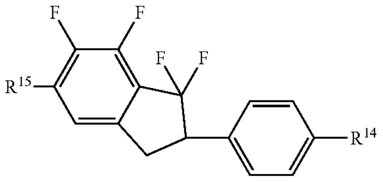

(12-3)

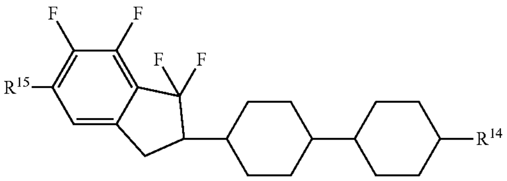

Component D is a compound in which the dielectric anisotropy is negative. Component D is mainly used for the preparation of a composition for use in modes of PS-IPS, PS-FFS, PSA-VA and so forth. As the content of component D is increased, the dielectric anisotropy of the composition increases negatively. However, the viscosity increases. Thus, it is desirable that the content should decrease as long as the required value of the threshold voltage of the device is satisfied. Accordingly, the content is preferably 40% by weight or more in order to ensure adequate voltage drive, in consideration that the absolute value of the dielectric anisotropy is about 5.

In component D, compound (6) is mainly effective in adjusting the viscosity, adjusting the optical anisotropy or adjusting the dielectric anisotropy, since it is a two-ring compound. Compounds (7) and (8) are effective in increasing the maximum temperature, increasing the optical anisotropy or increasing the dielectric anisotropy, since it is a three-ring compound. Compounds (9) to (12) are effective in increasing the dielectric anisotropy.

The content of component D is preferably 40% by weight or more, and more preferably in the range of 50% by weight to 95% by weight, based on the liquid crystal composition, in the preparation of a composition for use in modes of PS-IPS, PS-FFS, PSA-VA and so forth. It is desirable that the content of component D should be 30% by weight or less based on the liquid crystal composition when component D is added to a composition having positive dielectric anisotropy. The elastic constant of the composition can be adjusted and the voltage-transmission curve of the device can be adjusted by the addition of component D.

Component E is a compound where the two terminal groups are alkyl or the like. Desirable examples of component E include compounds (13-1) to (13-11), compounds (14-1) to (14-19) and compounds (15-1) to (15-7). In the compounds of component E, the definition of $R^{16}$ and $R^{17}$ is the same as that described in item 13 above.

(13-1)

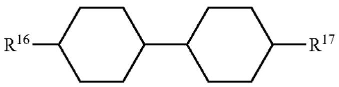

(13-2)

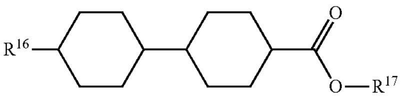

-continued (13-3)

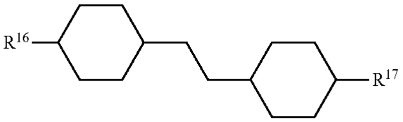

(13-4)

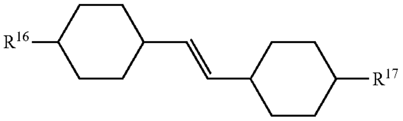

(13-5)

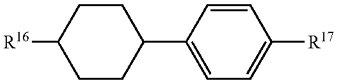

(13-6)

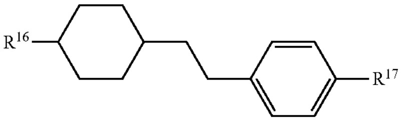

(13-7)

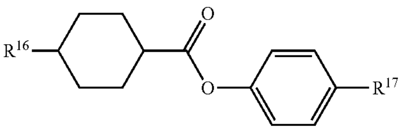

(13-8)

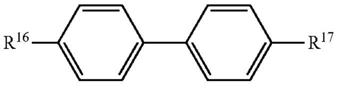

(13-9)

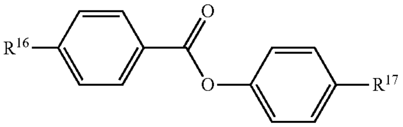

(13-10)

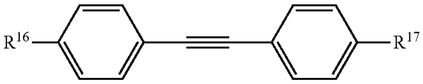

(13-11)

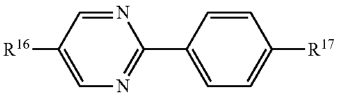

(14-1)

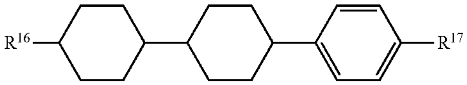

(14-2)

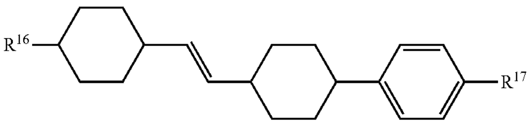

(14-3)

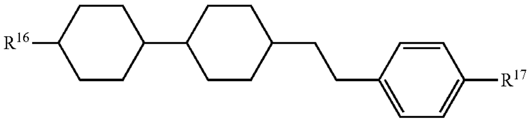

(14-4)

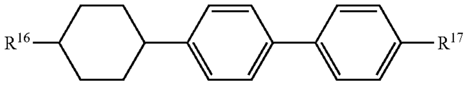

-continued
(14-5)
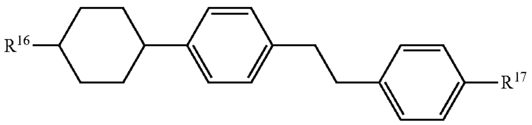
(14-6)
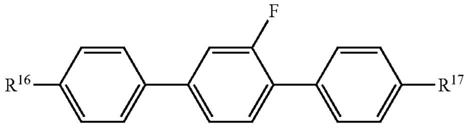
(14-7)
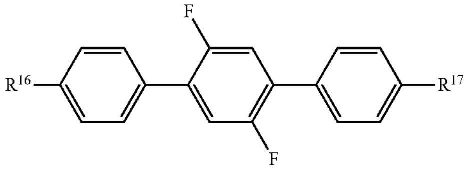
(14-8)
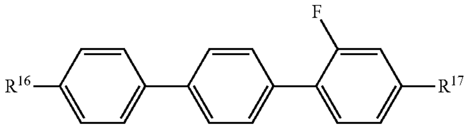
(14-9)
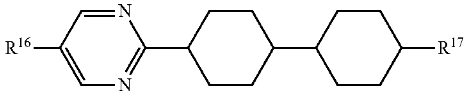
(14-10)
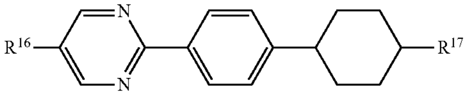
(14-11)
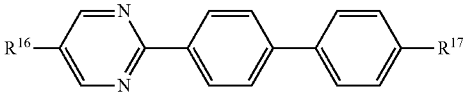
(14-12)
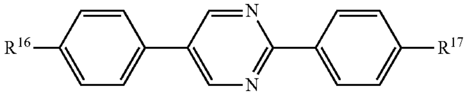
(14-13)
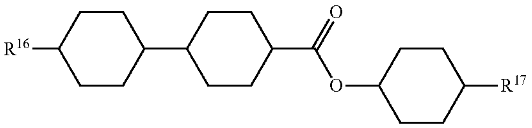
(14-14)
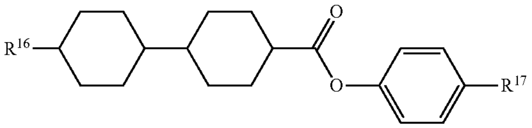
(14-15)
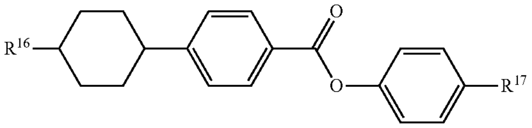
-continued
(14-16)
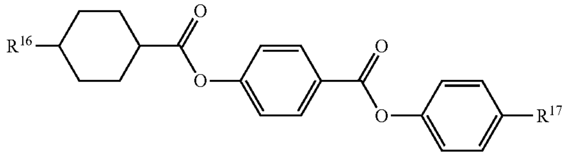
(14-17)
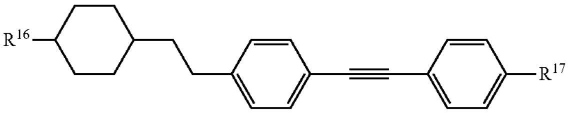
(14-18)
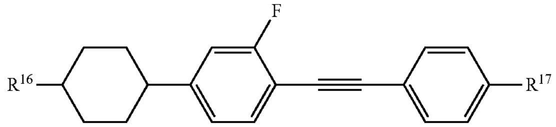
(14-19)
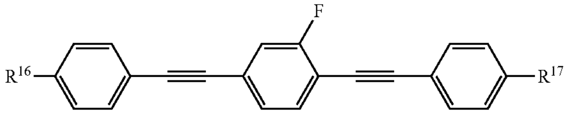
(15-1)
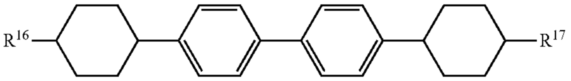
(15-2)
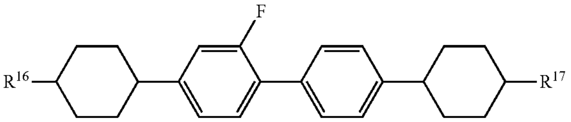
(15-3)
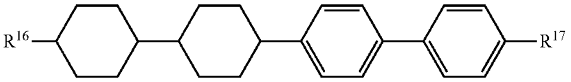
(15-4)
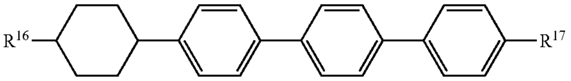
(15-5)
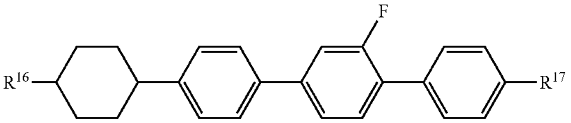
(15-6)
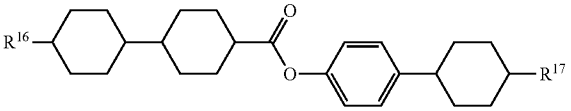
(15-7)
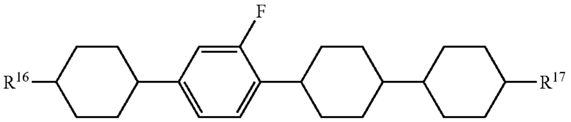

Component E is close to neutral, since the absolute value of the dielectric anisotropy is small. Compound (13) is mainly effective in adjusting the viscosity or adjusting the optical anisotropy. Compounds (14) and (15) are effective in increasing the temperature range of a nematic phase that is caused by an increase in the maximum temperature, or adjusting the optical anisotropy.

As the content of component E is increased, the viscosity of the composition decreases. However, the dielectric anisotropy decreases. Thus, it is desirable that the content should increase as long as the required value of the threshold voltage of the device is safisfied. Accordingly, the content of component E is preferably 30% by weight or more, and more preferably 40% by weight or more based on the liquid crystal composition, in the preparation of a composition for use in modes of PS-IPS, PSA-VA and so forth.

The preparation of the polymerizable composition is carried out according to known methods such as the mutual dissolution of necessary components at a temperature higher than room temperature. An additive may be added to the composition depending on its intended use. Examples of the additive are an optically active compound, an antioxidant, an ultraviolet light absorber, a light stabilizer, a thermal stabilizer, a defoaming agent, a polymerization initiator, a polymerization inhibitor and so forth. These kinds of additives are known to a person skilled in the art, and have been described in the literature.

An optically active compound is effective in inducing a helical structure in liquid crystal molecules, giving a necessary twist angle and thus preventing a reverse twist. A helical pitch can be adjusted by the addition of the optically active compound. Two or more optically active compounds may be added for the purpose of adjusting the temperature dependence of the helical pitch. Desirable examples of the optically active compound include the following compounds (Op-1) to (Op-18). In compound (Op-18), ring J is 1,4-cyclohexylene or 1,4-phenylene, and $R^{28}$ is alkyl having 1 to 10 carbons.

(Op-1)

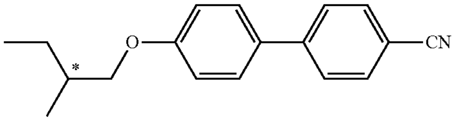

(Op-2)

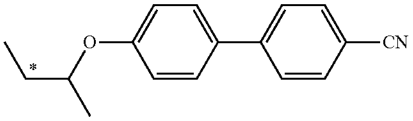

(Op-3)

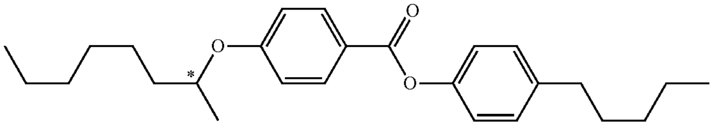

(Op-4)

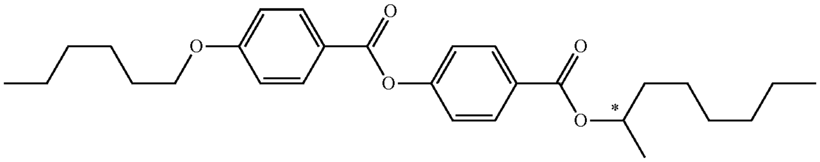

(Op-5)

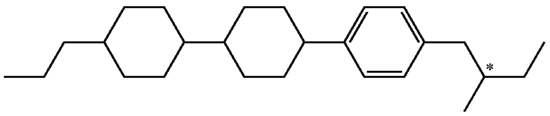

(Op-6)

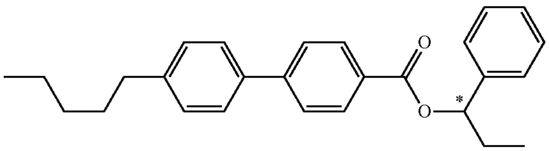

(Op-7)

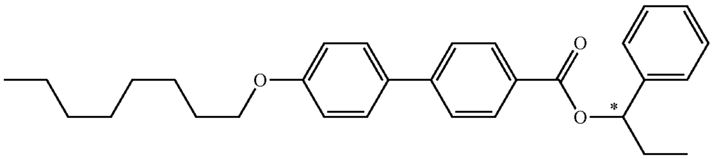

(Op-8)

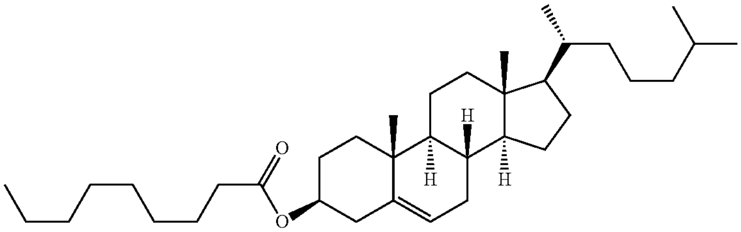

-continued
(Op-9)
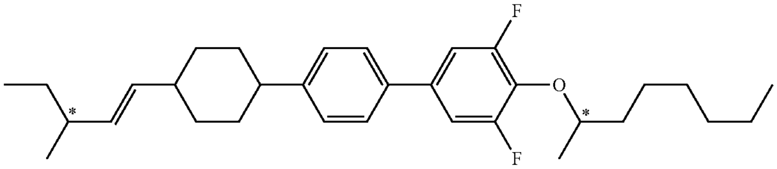
(Op-10)
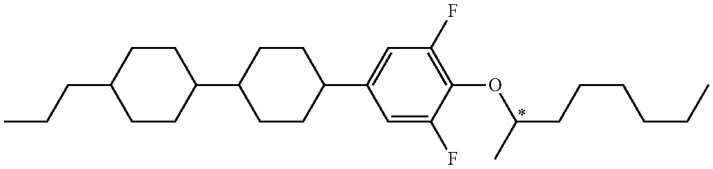
(Op-11)
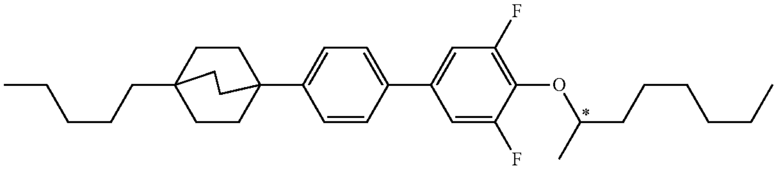
(Op-12)
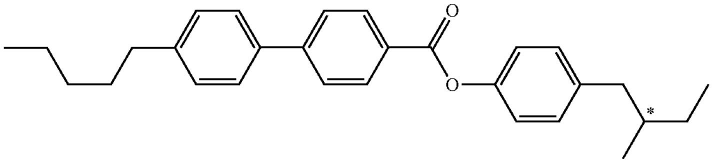
(Op-13)
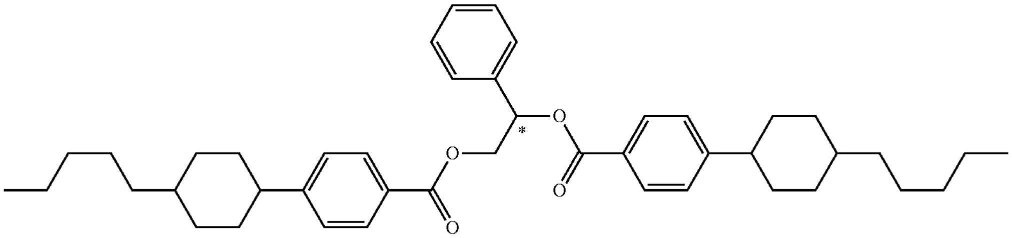
(Op-14)
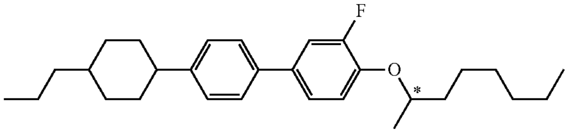
(Op-15)
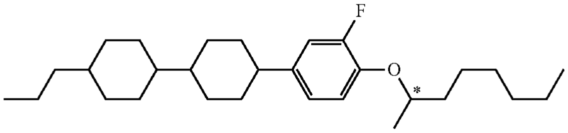
(Op-16)
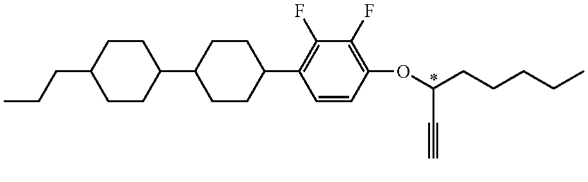
(Op-17)
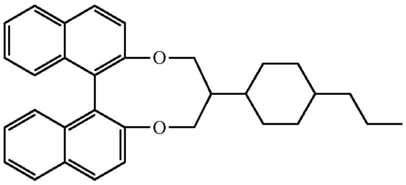

-continued (Op-18)

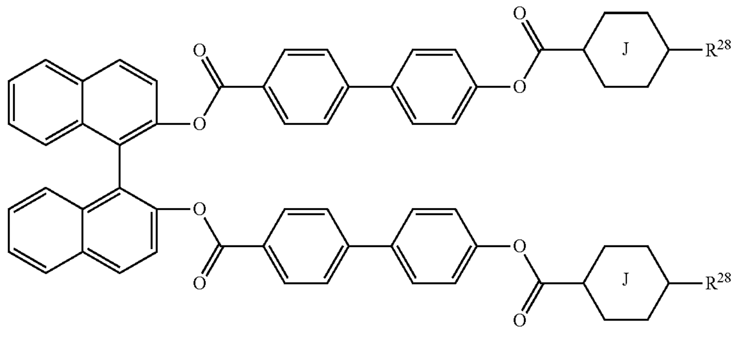

An antioxidant is effective in maintaining a large voltage holding ratio. Desirable examples of the antioxidant include compounds (AO-1) and (AO-2) described below, Irganox 415, Irganox 565, Irganox 1010, Irganox 1035, Irganox 3114 and Irganox 1098 (trade name: BASF SE). An ultraviolet light absorber is effective for preventing a decrease in the maximum temperature. Desirable examples of the ultraviolet light absorber include benzophenone derivatives, benzoate derivatives and triazole derivatives. Specific examples include compounds (AO-3) and (AO-4) described below, Tinuvin 329, Tinuvin P, Tinuvin 326, Tinuvin 234, Tinuvin 213, Tinuvin 400, Tinuvin 328, Tinuvin 99-2 (trade name: BASF SE) and 1,4-diazabicyclo[2.2.2]octane (DABCO). A light stabilizer such as an amine with steric hindrance is also desirable for maintaining a large voltage holding ratio. Desirable examples of the light stabilizer include compounds (AO-5) and (AO-6) described below, Tinuvin 144, Tinuvin 765 and Tinuvin 770DF (trade name: BASF SE). A thermal stabilizer is also effective in maintaining a large voltage holding ratio. Desirable examples include Irgafos 168 (trade name: BASF SE). An antifoaming agent is effective in preventing foam formation. Desirable examples of the antifoaming agent include dimethyl silicone oil and methyl phenyl silicone oil.

(AO-1)

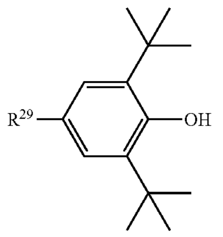

(AO-2)

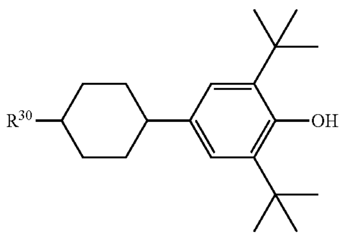

-continued (AO-3)

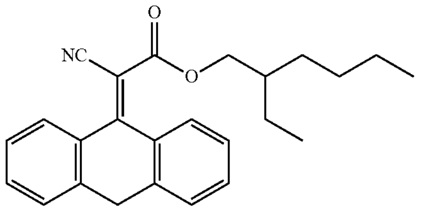

(AO-4)

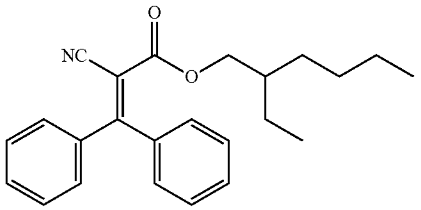

(AO-5)

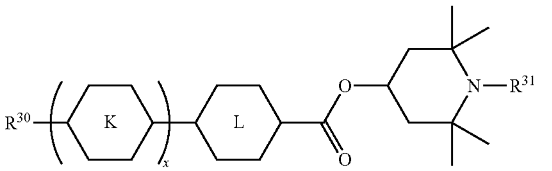

(AO-6)

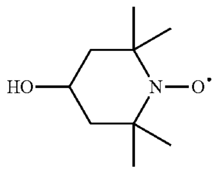

In compound (AO-1), $R^{29}$ is alkyl having 1 to 20 carbons, alkoxy having 1 to 20 carbons, —$COOR^{32}$ or —$CH_2CH_2COOR^{32}$, where $R^{32}$ is alkyl having 1 to 20 carbons. In compounds (AO-2) and (AO-5), $R^{30}$ is alkyl having 1 to 20 carbons. In compound (AO-5), $R^{31}$ is hydrogen, methyl or O. (oxygen radical), ring K and ring L are 1,4-cyclohexylene or 1,4-phenylene, and x is 0, 1 or 2.

4. Liquid Crystal Composites

Compound (1) has a high polymerization reactivity, a high conversion yield and a high solubility in a liquid crystal composition. The liquid crystal composite is formed by the polymerization of a polymerizable composition including compound (1) and a liquid crystal composition. A polymer is formed in the liquid crystal composition by the polymerization of compound (1). This polymer is effective in inducing pretilt in liquid crystal molecules. It is desirable that the polymerization should be carried out at a temperature in which the polymerizable composition exhibits a liquid crystal phase. The polymerization takes place with the aid of heat, light or the like. A desirable reaction is photopolymerization. It is desirable that the photopolymerization should be carried out at 100° C. or lower to avoid the thermal polymerization occurring simultaneously. The polymerization may be carried out under the conditions of an applied electric or magnetic field.

The polymerization reactivity and the conversion yield of compound (1) can be adjusted. Compound (1) is suitable for radical polymerization. Compound (1) can smoothly be polymerized by the addition of a polymerization initiator. The amount of the remaining compound (1) can be decreased by optimizing the reaction temperature. Examples of a photo-radical polymerization initiator are TPO, 1173 and 4265 of Darocur series, and 184, 369, 500, 651, 784, 819, 907, 1300, 1700, 1800, 1850 and 2959 of Irgacure series, at BASF SE.

Additional examples of the photo-radical polymerization initiators are 4-methoxyphenyl-2,4-bis(trichloromethyl)triazine, 2-(4-butoxystyryl)-5-trichloromethyl-1,3,4-oxadiazole, 9-phenylacridine, 9,10-benzphenazine, a mixture of benzophenone/Michler's ketone, a mixture of hexaarylbiimidazole/mercaptobenzimidazole, 1-(4-isopropylphenyl)-2-hydroxy-2-methylpropan-1-one, benzyldimethylketal, 2-methyl-1-[4-(methylthio)phenyl]-2-morphorinopropan-1-one, a mixture of 2,4-diethylxanthone/methyl p-dimethylaminobenzoate and a mixture of benzophenone/methyltriethanolamine.

The polymerization can be carried out by irradiation with ultraviolet light under the conditions of an applied electric field, after a photo-radical polymerization initiator had been added to a polymerizable composition. However, the unreacted polymerization initiator or the degradation product of the polymerization initiator may cause a poor display such as image burn-in to the device. The photo-polymerization may be carried out without the polymerization initiator in order to avoid it. Desirable wavelengths of the irradiated light are in the range of 150 nm to 500 nm. More desirable wavelengths are in the range of 250 nm to 450 nm, and the most desirable wavelengths are in the range of 300 nm to 400 nm.

A polymerization inhibitor may be added in order to prevent the polymerization when a polymerizable compound is kept in storage. The polymerizable compound is usually added to a composition without removing the polymerization inhibitor. Examples of the polymerization inhibitor include hydroquinone derivatives such as hydroquinone and methylhydroquinone, 4-tert-butylcatechol, 4-methoxyphenol and phenothiazine.

5. Liquid Crystal Display Devices

The effect of the polymer in a liquid crystal display device is interpreted as follows: A polymerizable composition is a mixture of a liquid crystal compound, a polymerizable compound and so forth. The liquid crystal molecules are oriented in the direction of an electric field by the application of the electric field to the composition. The molecules of the polymerizable compound are also oriented in the same direction in accordance with this orientation. Under these conditions, irradiation of the composition with ultraviolet light polymerizes the polymerizable compound, as a result of which the network of a polymer is formed in the polymerizable composition. The liquid crystal molecules are stabilized under the conditions in which they are oriented in the direction of the electric field by the effect of this network. This effect is maintained even when the electric field is removed. The response time of the device is decreased accordingly.

It is desirable that the polymerization of the polymerizable composition should be carried out in a display device. One example is as follows: A display device is prepared in which it has two glass substrates equipped with transparent electrodes and alignment films. A polymerizable composition is prepared, in which the component is compound (1), a liquid crystal composition, an additive and so forth. This composition is injected into the display device. Compound (1) is polymerized by irradiation of the display device with ultraviolet light while an electric field is applied. The polymerization gives a liquid crystal composite. A liquid crystal display device having the liquid crystal composite can easily made by this method. The rubbing treatment for the alignment film may be skipped in this method. Incidentally, a method in which liquid crystal molecules are stabilized without an electric field may be employed.

A liquid crystal display device having a PSA mode is made when the added amount of the polymerizable compound is in the range of 0.1% by weight to 2% by weight based on the liquid crystal composition. The device having a PSA mode can be driven by means of a driving mode such as an active matrix (AM) or a passive matrix (PM). This kind of device can be applied to any type of a reflection type, a transmission type and a semi-transmission type. A device having a polymer dispersed mode can be made by increasing the added amount of the polymer.

EXAMPLES

The invention will be explained in more detail by way of examples. The invention is not limited to the examples.

6. Examples for Compound (1)

Compound (1) was prepared by the method described below. Compounds prepared herein were identified by NMR analysis and so forth. The physical properties of the compounds were measured by the methods described below.

NMR Analysis

A model DRX-500 apparatus made by Bruker BioSpin Corporation was used for measurement. In the measurement of $^1$H-NMR, a sample was dissolved in a deuterated solvent such as $CDCl_3$, and the measurement was carried out under the conditions of room temperature, 500 MHz and the accumulation of 16 scans. Tetramethylsilane (TMS) was used as an internal standard. In the measurement of $^{19}$F-NMR, $CFCl_3$ was used as the internal standard, and 24 scans were accumulated. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively.

HPLC Analysis

Model Prominence (LC-20AD; SPD-20A) made by Shimadzu Corporation was used for measurement. A column YMC-Pack ODS-A (length 150 mm, bore 4.6 mm, particle size 5 µm) made by YMC Co., Ltd. was used. Acetonitrile and water were suitably mixed and used as an eluent. A UV detector, a RI detector, a Corona detector and so forth were suitably used as a detector. A wavelength for the UV detector was 254 nm. A sample was dissolved in acetonitrile to give a 0.1% by weight solution, and then 1 microliter of the solution was injected into the sample injector. Model C-R7Aplus made by Shimadzu Corporation was used as a recorder.

Ultraviolet and Visible Spectrophotometric Analysis

Model PharmaSpec UV-1700 made by Shimadzu Corporation was used for measurement. Wavelengths in the range of 190 nm to 700 nm were used for the detection. A sample was dissolved in acetonitrile, giving a 0.01 mmol/L solution, which was placed in a quartz cell (optical path length: 1 cm) and measured.

Samples for Measurement

A compound itself was used as a sample when the phase structure and the transition temperature (a clearing point, a melting point, a starting temperature of polymerization, and so forth) were measured. A mixture of the compound and mother liquid crystals was used as a sample when physical properties such as the maximum temperature of a nematic phase, viscosity, optical anisotropy and dielectric anisotropy were measured.

Measurement Methods

The physical properties of compounds were measured according to the following methods. Most were methods described in the JEITA standards (JEITA-ED-2521B) which was deliberated and established by Japan Electronics and Information Technology Industries Association (abbreviated to JEITA), or the modified methods. No thin film transistors (TFT) were attached to a TN device used for measurement.

(1) Phase Structures

A sample was placed on a hot plate of a melting point apparatus (Hot Stage Model FP-52 made by Mettler Toledo International Inc.) equipped with a polarizing microscope. The phase conditions and their changes were observed with the polarizing microscope while the sample was heated at the rate of 3° C. per minute, and the kinds of phases were specified.

(2) Transition Temperature (° C.)

A differential scanning calorimeter, Diamond DSC System, made by Perkin-Elmer Inc. or a high sensitivity differential scanning analyzer, X-DSC7000, made by SII NanoTechnology Inc. was used for measurement. A sample was heated and then cooled at the rate of 3° C. per minute. The starting point of an endothermic peak or an exothermic peak caused by the phase change of the sample was obtained by extrapolation, and thus the transition temperature was determined. The melting point and the starting temperature of polymerization of a compound were also measured by use of this apparatus. The transition temperature of a compound from solid to a liquid crystal phase such as a smectic phase or a nematic phase may be abbreviated to "the minimum temperature of a liquid crystal phase". The transition temperature of a compound from a liquid crystal phase to liquid may be abbreviated to "a clearing point".

The symbol C stood for crystals, which were expressed as $C_1$ and $C_2$ when the kinds of crystals were distinguishable. The symbols S and N stood for a smectic phase and a nematic phase, respectively. When a smectic A phase, a smectic B phase, a smectic C phase or a smectic F was distinguishable in the smectic phases, it was expressed as $S_A$, $S_B$, $S_C$ or $S_F$, respectively. The symbol I stood for a liquid (isotropic). Transition temperatures were expressed as, for example, "C 50.0 N 100.0 Iso", which means that the transition temperature from crystals to a nematic phase was 50.0° C., and the transition temperature from the nematic phase to a liquid was 100.0° C.

(3) Maximum Temperature of a Nematic Phase ($T_{NI}$ or NI; ° C.)

A sample was placed on a hot plate in a melting point apparatus equipped with a polarizing microscope and was heated at the rate of 1° C. per minute. The temperature was measured when a part of the sample began to change from a nematic phase to an isotropic liquid. A higher limit of the temperature range of a nematic phase may be abbreviated to "the maximum temperature." The symbol $T_{NI}$ means that the sample was a mixture of compound (1) and mother liquid crystals. The symbol NI means that the sample was a mixture of compound (1) and compounds such as components B, C, D and E.

(4) Minimum Temperature of a Nematic Phase ($T_C$; ° C.)

A sample having a nematic phase was kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., $T_C$ was expressed as ≤−20° C. A lower limit of the temperature range of a nematic phase may be abbreviated to "the minimum temperature."

(5) Viscosity (Bulk Viscosity; η; Measured at 20° C.; mPa·s)

The viscosity was measured by use of an E-type viscometer made by Tokyo Keiki Inc.

(6) Optical Anisotropy (Refractive Index Anisotropy; Δn; Measured at 25° C.)

The measurement was carried out using an Abbe refractometer with a polarizing plate attached to the ocular, using light at a wavelength of 589 nanometers. The surface of the main prism was rubbed in one direction, and then a sample was placed on the main prism. The refractive index (n||) was measured when the direction of the polarized light was parallel to that of rubbing. The refractive index (n⊥) was measured when the direction of polarized light was perpendicular to that of rubbing. The value of the optical anisotropy (Δn) was calculated from the equation: Δn=n||−n⊥.

(7) Specific Resistance (ρ; Measured at 25° C.; Ωcm):

A sample of 10 milliliter was poured into a vessel equipped with electrodes. DC voltage (10 V) was applied to the vessel, and the DC current was measured after 10 seconds. The specific resistance was calculated from the following equation. (specific resistance)=[(voltage)×(electric capacity of vessel)]/[(DC current)×(dielectric constant in vacuum)].

(8) Voltage Holding Ratio (VHR-1; Measured at 25° C.; %)

A TN device used for measurement had a polyimide-alignment film, and the distance between the two glass substrates (cell gap) was 5 micrometers. A sample was poured into the device, and then this device was sealed with a UV-curable adhesive. A pulse voltage (60 microseconds at 5 V) was applied to this device and the device was charged. A decreasing voltage was measured for 16.7 milliseconds with a high-speed voltmeter, and area A between a voltage curve and a horizontal axis in a unit cycle was obtained. Area B was an area without the decrease. The voltage holding ratio was expressed as a percentage of area A to area B.

(9) Voltage Holding Ratio (VHR-2; Measured at 80° C.; %)

The voltage holding ratio was measured by the method described above, except that it was measured at 80° C. instead of 25° C. The results were shown by using the symbol VHR-2.

The measurement method of physical properties for a sample having positive dielectric anisotropy is sometimes different from that for a sample having negative dielectric anisotropy. Measurement methods are described in items (10a) to (14a) when the dielectric anisotropy is positive. When the dielectric anisotropy is negative, they are shown in items (10b) to (14b).

(10a) Viscosity (Rotational Viscosity; γ1; Measured at 25° C.; mPa·s)

Positive dielectric anisotropy: The measurement was carried out according to the method described in M. Imai, et al., Molecular Crystals and Liquid Crystals, Vol. 259, 37 (1995). A sample was poured into a TN device in which the twist angle was 0 degrees and the distance between the two glass substrates (cell gap) was 5 micrometers. A voltage with an increment of 0.5 volt in the range of 16 to 19.5 volts was applied stepwise to this device. After a period of 0.2 second with no voltage, a voltage was applied repeatedly under the conditions of a single rectangular wave alone (rectangular pulse; 0.2 second) and of no voltage (2 seconds). The peak current and the peak time of the transient current generated by the applied voltage were measured. The value of rotational viscosity was obtained from these measured values and the calculating equation (8) on page 40 of the paper presented by M. Imai, et al. The value of dielectric anisotropy necessary for this calculation was obtained by use of the device that had been used for the measurement of rotational viscosity, according to the method that will be described below.

(10b) Viscosity (Rotational Viscosity; γ1; Measured at 25° C.; mPa·s)

Negative dielectric anisotropy: The measurement was carried out according to the method described in M. Imai, et al., Molecular Crystals and Liquid Crystals, Vol. 259, p. 37 (1995). A sample was poured into a VA device in which the distance between the two glass substrates (cell gap) was 20 micrometers. A voltage in the range of 39 V to 50 V was applied stepwise with an increment of 1 volt to this device. After a period of 0.2 second with no voltage, a voltage was applied repeatedly under the conditions of only one rectangular wave (rectangular pulse; 0.2 second) and no voltage (2 seconds). The peak current and the peak time of the transient current generated by the applied voltage were measured. The value of rotational viscosity was obtained from these measured values and the calculating equation (8) on page 40 of the paper presented by M. Imai, et al. The value of the dielectric anisotropy necessary for the present calculation was obtained by the method that will be described below, under the heading "Dielectric anisotropy."

(11a) Dielectric Anisotropy (Δ∈; Measured at 25° C.)

Positive dielectric anisotropy: A sample was poured into a TN device in which the distance between the two glass substrates (cell gap) was 9 micrometers and the twist angle was 80 degrees. Sine waves (10 V, 1 kHz) were applied to this device, and the dielectric constant (∈||) in the major axis direction of liquid crystal molecules was measured after 2 seconds. Sine waves (0.5 V, 1 kHz) were applied to this device and the dielectric constant (∈⊥) in the minor axis direction of the liquid crystal molecules was measured after 2 seconds. The value of dielectric anisotropy was calculated from the equation: Δ∈=∈||−∈⊥.

(11b) Dielectric Anisotropy (Δ∈; Measured at 25° C.)

Negative dielectric anisotropy: The value of dielectric anisotropy was calculated from the equation: Δ∈=∈||−∈⊥. Dielectric constants (∈⊥ and ∈⊥) were measured as follows.

1) Measurement of a dielectric constant (∈||): A solution of octadecyltriethoxysilane (0.16 mL) in ethanol (20 mL) was applied to thoroughly cleaned glass substrates. The glass substrates were rotated with a spinner, and then heated at 150° C. for one hour. A sample was poured into a VA device in which the distance between the two glass substrates (cell gap) was 4 micrometers, and then this device was sealed with a UV-curable adhesive. Sine waves (0.5 V, 1 kHz) were applied to this device, and the dielectric constant (∈||) in the major axis direction of liquid crystal molecules was measured after 2 seconds.

2) Measurement of a dielectric constant (∈⊥): A polyimide solution was applied to thoroughly cleaned glass substrates. The glass substrates were calcined, and then the resulting alignment film was subjected to rubbing. A sample was poured into a TN device in which the distance between the two glass substrates (cell gap) was 9 micrometers and the twist angle was 80 degrees. Sine waves (0.5 V, 1 kHz) were applied to this device, and the dielectric constant (∈⊥) in the minor axis direction of liquid crystal molecules was measured after 2 seconds.

(12a) Elastic Constants (K; Measured at 25° C.; pN)

Positive dielectric anisotropy: A LCR meter Model HP 4284-A made by Yokokawa Hewlett-Packard, Ltd. was used for measurement. A sample was poured into a homogeneous device in which the distance between the two glass substrates (cell gap) was 20 micrometers. An electric charge of 0 volts to 20 volts was applied to this device, and the electrostatic capacity and the applied voltage were measured. The measured values of the electric capacity (C) and the applied voltage (V) were fitted to the equation (2.98) and the equation (2.101) in page 75 of the "Ekisho Debaisu Handobukku" (Liquid Crystal Device Handbook, in English; The Nikkan Kogyo Shimbun, Ltd., Japan) and the values of $K_{11}$ and $K_{33}$ were obtained from the equation (2.99). Next, the value of $K_{22}$ was calculated from the equation (3.18) in page 171 and the values of $K_{11}$ and $K_{33}$ thus obtained. The elastic constant K was expressed as an average value of $K_{11}$, $K_{22}$ and $K_{33}$.

(12b) Elastic Constants ($K_{11}$ and $K_{33}$; Measured at 25° C.; pN)

Negative dielectric anisotropy: An elastic constant measurement system Model EC-1 made by Toyo Corporation was used for measurement. A sample was poured into a homeotropic device in which the distance between the two glass substrates (cell gap) was 20 micrometers. An electric charge of 20 volts to 0 volts was applied to this device, and electrostatic capacity and applied voltage were measured. The values of the electrostatic capacity (C) and the applied voltage (V) were fitted to the equation (2.98) and the equation (2.101) in page 75 of the "Ekisho Debaisu Handobukku" (Liquid Crystal Device Handbook, in English; The Nikkan Kogyo Shimbun, Ltd., Japan), and the value of the elastic constant was obtained from the equation (2.100).

(13a) Threshold Voltage (Vth; Measured at 25° C.; V)

Positive dielectric anisotropy: The measurement was carried out with an LCD evaluation system Model LCD-5100 made by Otsuka Electronics Co., Ltd. The light source was a halogen lamp. A sample was poured into a TN device having a normally white mode, in which the distance between the two glass substrates (cell gap) was 4.45/Δn (micrometers) and the twist angle was 80 degrees. Voltage to be applied to this device (32 Hz, rectangular waves) was stepwise increased in 0.02 V increments from 0 V up to 10 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was expressed as voltage at 90% transmittance.

(13b) Threshold Voltage (Vth; Measured at 25° C.; V)

Negative dielectric anisotropy: The measurement was carried out with an LCD evaluation system Model LCD-5100 made by Otsuka Electronics Co., Ltd. The light source was a halogen lamp. A sample was poured into a PVA device having a normally black mode, in which the distance between the two glass substrates (cell gap) was 4 micrometers and the rubbing direction was antiparallel, and then this device was sealed with a UV-curable adhesive. The voltage to be applied to this device (60 Hz, rectangular waves) was stepwise increased in 0.02 V increments from 0 V up to 20 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was voltage at 10% transmittance.

(14a) Response Time (τ; Measured at 25° C.; Millisecond)

Positive dielectric anisotropy: The measurement was carried out with an LCD evaluation system Model LCD-5100 made by Otsuka Electronics Co., Ltd. The light source was a halogen lamp. The low-pass filter was set at 5 kHz. A sample was poured into a TN device having a normally white mode, in which the cell gap between the two glass substrates was 5.0 micrometers and the twist angle was 80 degrees. Rectangular waves (60 Hz, 5 V, 0.5 second) were applied to this device. The device was simultaneously irradiated with light in the perpendicular direction, and the amount of light passing through the device was measured. The transmittance was regarded as 100% when the amount of light reached a maximum. The transmittance was regarded as 0% when the amount of light reached a minimum. Rise time (τr; millisecond) was the time required for a change from 90% to 10% transmittance. Fall time (τf; millisecond) was the time required for a change from 10% to 90% transmittance. The response time was expressed as the sum of the rise time and the fall time thus obtained.

(14b) Response Time (τ; Measured at 25° C.; Millisecond)

Negative dielectric anisotropy: The measurement was carried out with an LCD evaluation system Model LCD-5100 made by Otsuka Electronics Co., Ltd. The light source was a halogen lamp. The low-pass filter was set at 5 kHz. A sample was poured into a VA device having a normally black mode, in which the cell gap between two glass substrates was 3.2 micrometers, and the rubbing direction was antiparallel. This device was sealed with a UV-curable adhesive. A voltage that was a little more than the threshold voltage was applied to this device for 1 minute, and then the device was irradiated with ultraviolet light of 23.5 $mW/cm^2$ for 8 minutes while a voltage of 5.6 V was applied. Rectangular waves (60 Hz, 10 V, 0.5 second) were applied to this device. The device was simultaneously irradiated with light in the perpendicular direction, and the amount of light passing through the device was measured. The transmittance was regarded as 100% when the amount of light reached a maximum. The transmittance was regarded as 0% when the amount of light reached a minimum. The response time was expressed as the period of time required for the change from 90% to 10% transmittance (fall time: millisecond).

Example 1

Preparation of Compound (No. 1)

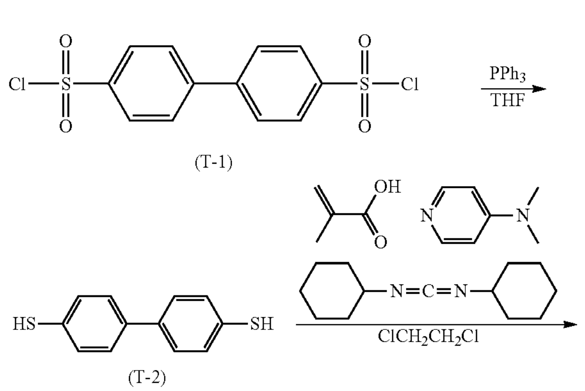

(T-1)

(T-2)

-continued

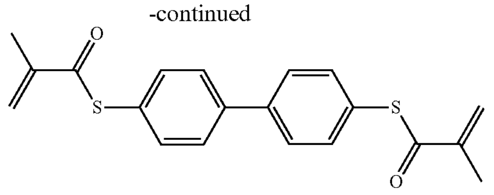

No. 1

First Step:

4,4-Biphenyldisulfonyl chloride (T-1) (20.0 g, 0.057 mol; Tokyo Chemical Industry Co., Ltd.) in a THF (200 ml) solution was added dropwise to triphenylphosphine (104.7 g, 0.4 mol) in a THF (200 ml) solution, and the mixture was stirred at 40° C. for 3 hours. The reaction mixture was allowed to cool to room temperature, poured into water (200 ml), and extracted with dichloromethane (200 ml×3). The extract was washed with water (200 ml×3), dried over anhydrous magnesium sulfate, and concentrated under reduced pressure. The residue was recrystallized from ethanol to give compound (T-2) (8.44 g, 0.039 mol, 67.7%).

Second Step:

Compound (T-2) (8.43 g, 0.039 mol) and methacrylic acid (13.3 g, 0.15 mol) were dissolved in 1,2-dichloroethane (200 ml) and the solution was cooled with ice. N,N-Dimethyl-4-aminopyridine (DMAP) (0.47 g, 0.004 mol) in a 1,2-dichloroethane (5 ml) solution was added dropwise to this solution. Dicyclohexylcarbodiimide (DCC) (19.12 g, 0.093 mol) was then added as a solid, and the mixture was stirred at room temperature for 3 hours. The reaction mixture was poured into water (200 ml) and extracted with 1,2-dichloroethane (100 ml×3). The extract was washed with a saturated aqueous solution of sodium hydrogencarbonate (100 ml×1) and water (100 ml×3), dried over anhydrous magnesium sulfate, and concentrated under reduced pressure. The residue was recrystallized from a mixed solvent of dichloromethane and heptane (1:1 by volume) to give compound (No. 1) (5.27 g, 0.015 mol, 38.3%).

$^1$H-NMR ($CDCl_3$; δ ppm): 7.65 (dd, 4H), 7.52 (dd, 4H), 6.24 (d, 2H), 5.73 (d, 2H), 2.03 (s, 6H).

Comparative Experiment on Solubility

Compound (No. 1) of the invention was added to liquid crystal composition A described below in the ratio of 0.3% by weight. This mixture was heated at 50° C. for 30 minutes, giving a homogeneous solution. After this solution had been allowed to stand under the conditions of Solubility-1 (at room temperature for 2 days) and Solubility-2 (at −20° C. for 10 days), it was observed visually whether or not the crystals were deposited.

The components of liquid crystal composition A were follows. The component compounds were described based on the definition in Table 2.

| | | |
|---|---|---|
| 3-H2B(2F,3F)-O2 | (6-4) | 18% |
| 5-H2B(2F,3F)-O2 | (6-4) | 17% |
| 3-HH1OCro(7F,8F)-5 | (10-6) | 6% |
| 3-HBB(2F,3F)-O2 | (7-7) | 10% |
| 4-HBB(2F,3F)-O2 | (7-7) | 6% |
| 5-HBB(2F,3F)-O2 | (7-7) | 6% |
| 2-HH-3 | (13-1) | 14% |
| 3-HH-4 | (13-1) | 8% |
| 3-HHB-1 | (14-1) | 5% |
| 3-HHB-3 | (14-1) | 6% |
| 3-HHB-O1 | (14-1) | 4% |

7. Comparative Example

Comparative Example 1

Compound (R-1) was used for comparison.

(R-1)

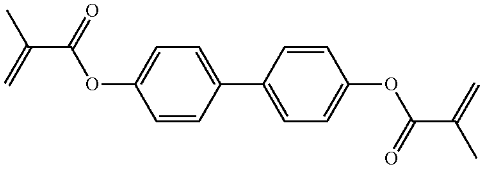

$^1$H-NMR (DMSO-d; δ ppm): 7.24 (d, 4H), 6.96 (d, 4H), 6.41 (d, 2H), 6.26 (d, 2H), 1.98 (s, 6H). The physical properties of comparative compound (R-1) were as follows. Melting point: 150° C.

Solubility was observed in the same manner regarding comparative compound (R-1). The results are shown in Table 1. It was found from the results that compound (No. 1) had an excellent solubility in liquid crystal composition A. It is concluded that the polymerizable compound of the invention is excellent in comparison with conventional compounds, accordingly.

TABLE 1

Comparison of solubility in liquid crystal composition A

| Polymerizable compound | Structural formula | Solubility-1 (at room temp. for 2 days) | Solubility-2 (at −20° C. for 10 days) |
|---|---|---|---|
| Compound (No. 1) | 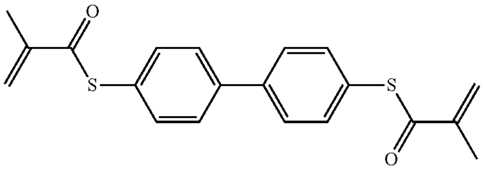 [SMILES: C=C(C)C(=O)Sc1ccc(-c2ccc(SC(=O)C(=C)C)cc2)cc1] | No crystals were deposited | No crystals were deposited |
| Comparative compound (R-1) | 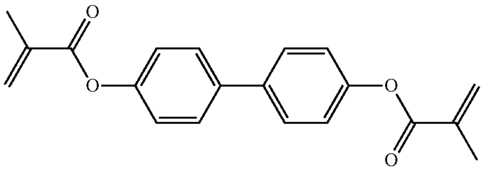 [SMILES: C=C(C)C(=O)Oc1ccc(-c2ccc(OC(=O)C(=C)C)cc2)cc1] | Crystals were deposited | Crystals were deposited |

Preparation of comparative compound (R-1), [1,1'-biphenyl]-4,4'-diyl bis(2-methacrylate)

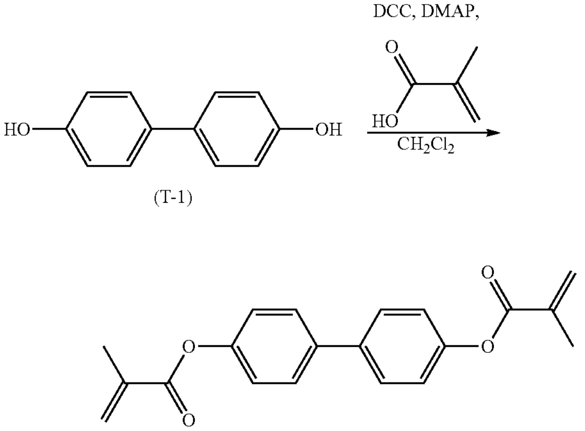

(R-1)

The preparation according to the reaction equation described above was carried out to give colorless crystals of the comparative compound (R-1).

It is possible to prepare the following compound (No. 2) to compound (No. 390) by reference of the experimental procedures described in Example 1 and "2. Synthetic method."

No. 1

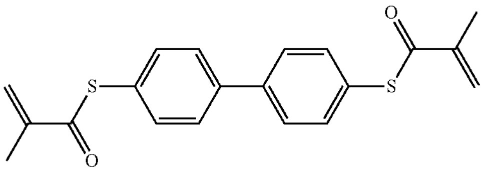

No. 2

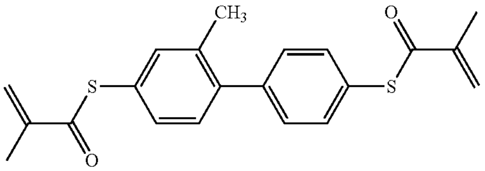

No. 3

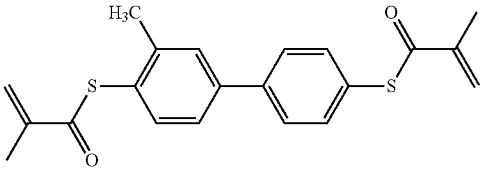

No. 4
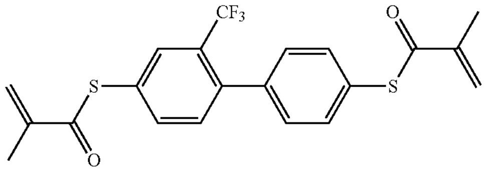
No. 5
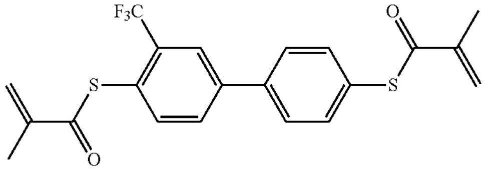
No. 6
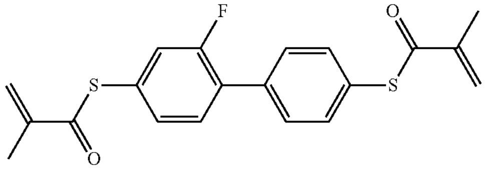
No. 7
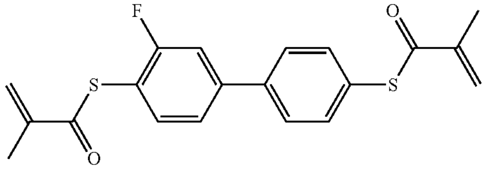
No. 8
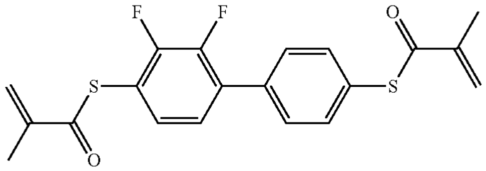
No. 9
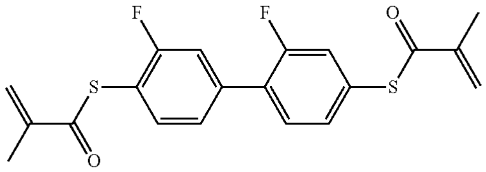
No. 10
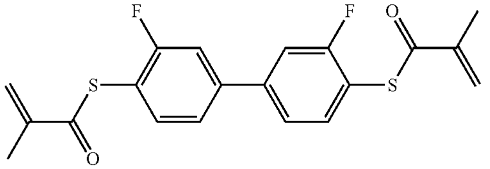
No. 11
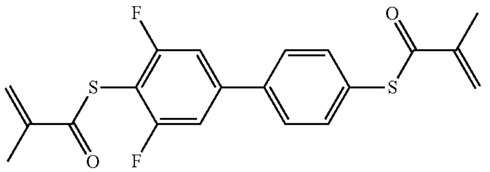
No. 12
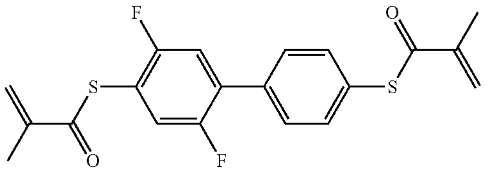
No. 13
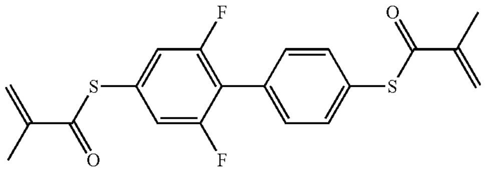
No. 14
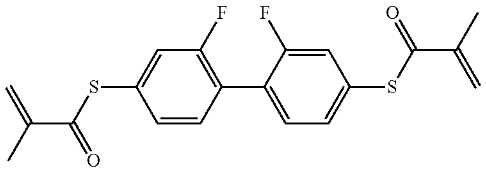
No. 15
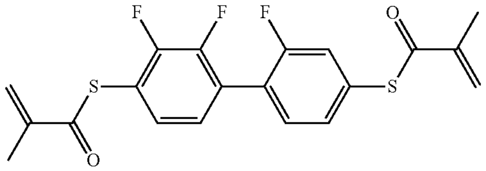
No. 16
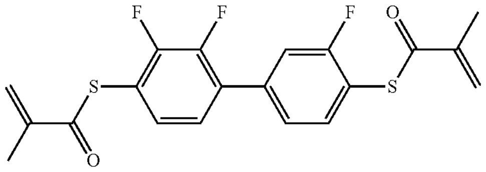
No. 17
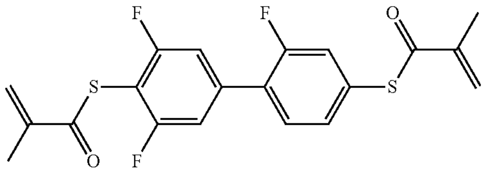
No. 18
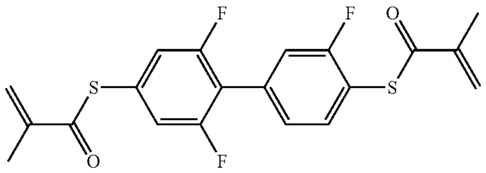
No. 19
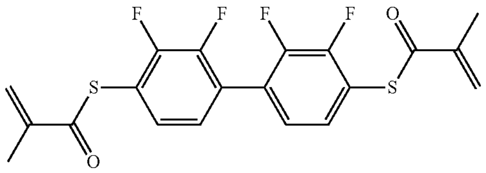
No. 20
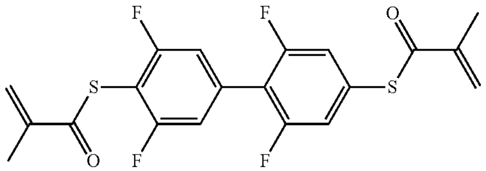

No. 21
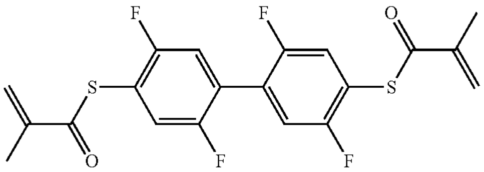
No. 22
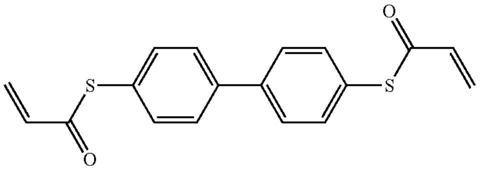
No. 23
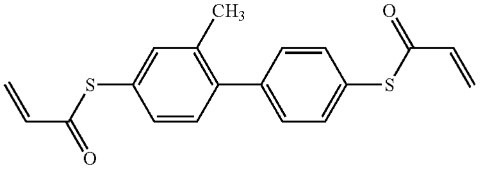
No. 24
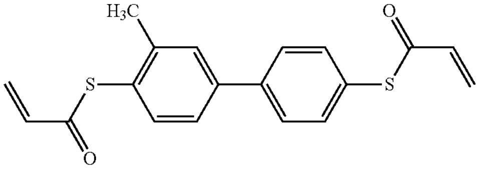
No. 25
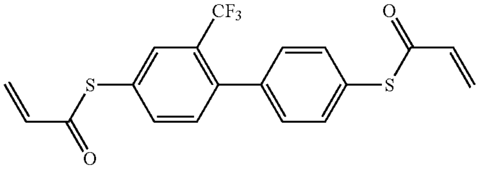
No. 26
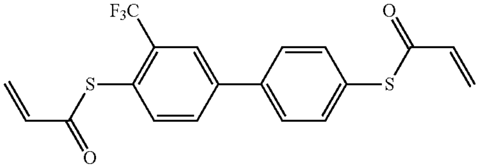
No. 27
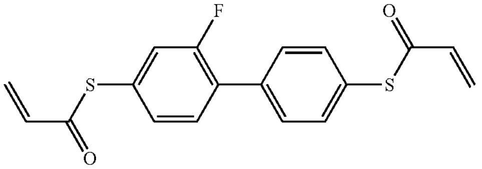
No. 28
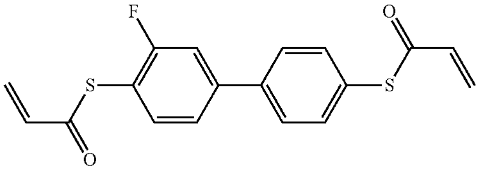
No. 29
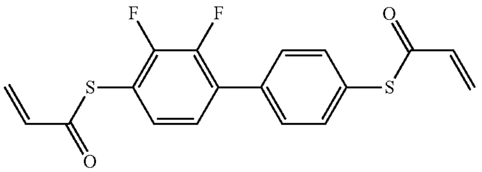
No. 30
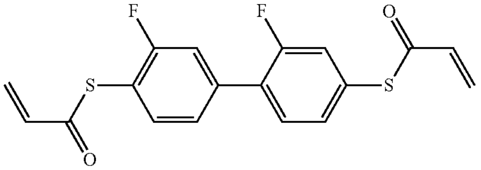
No. 31
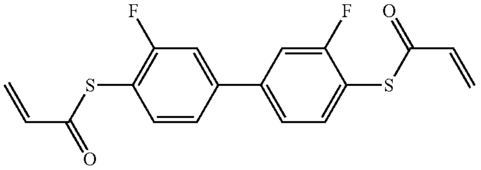
No. 32
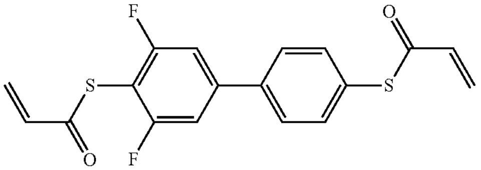
No. 33
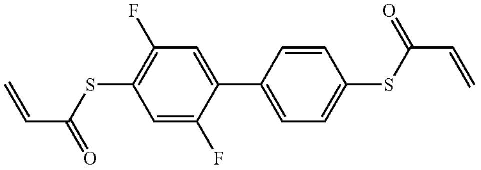
No. 34
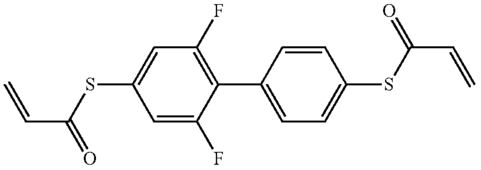
No. 35
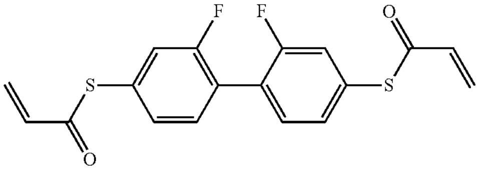
No. 36
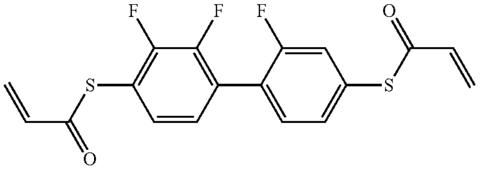
No. 37
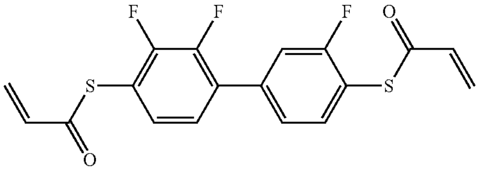
No. 38
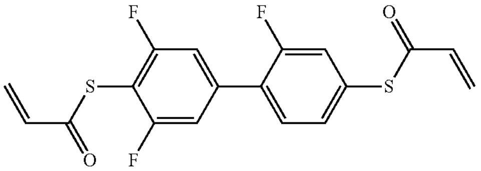

-continued
No. 39
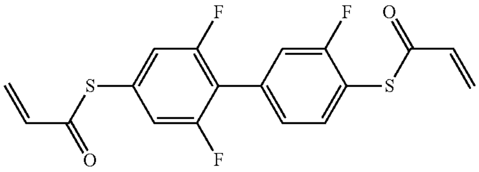
No. 40
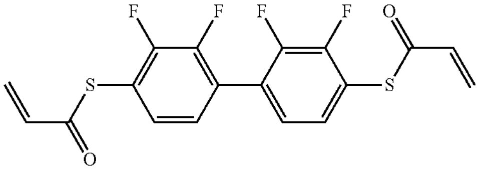
No. 41
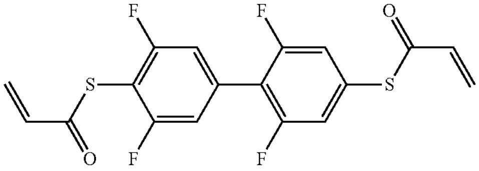
No. 42
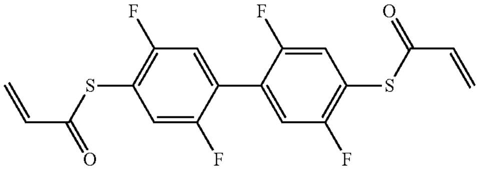
No. 43
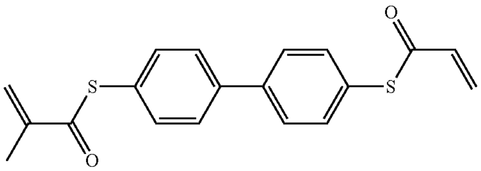
No. 44
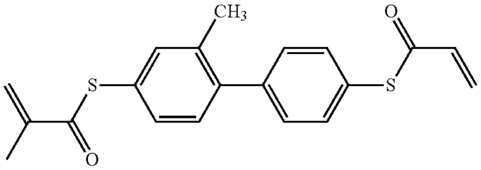
No. 45
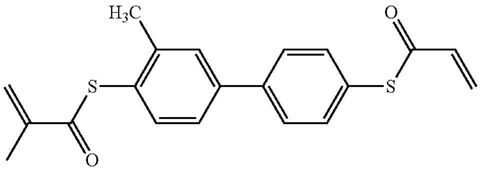
No. 46
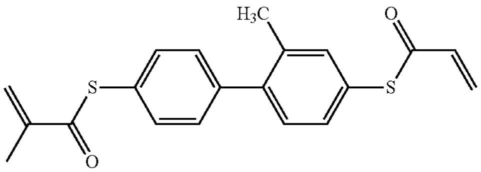
No. 47
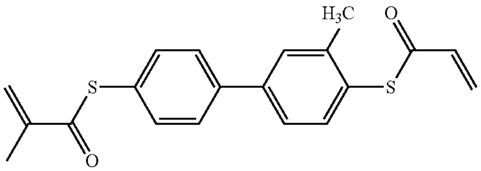
-continued
No. 48
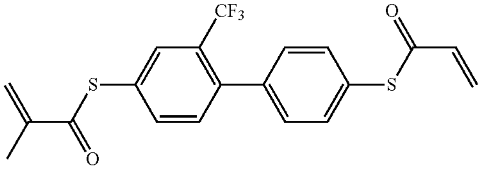
No. 49
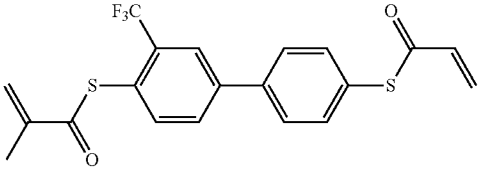
No. 50
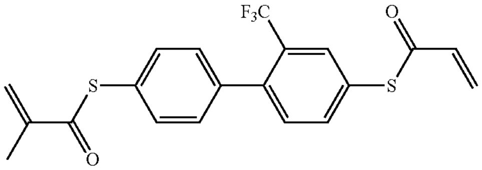
No. 51
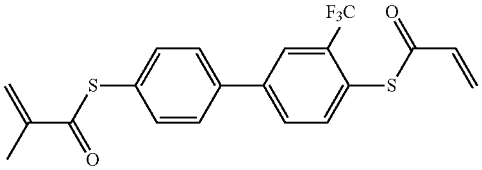
No. 52
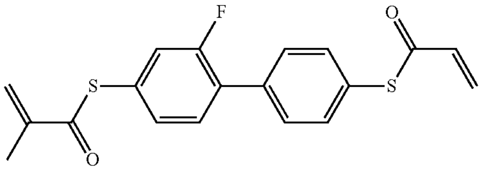
No. 53
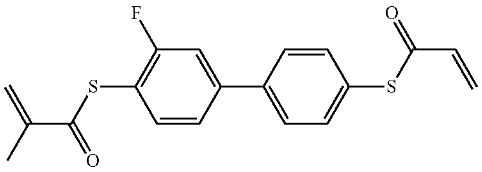
No. 54
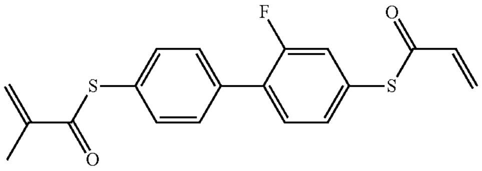
No. 55
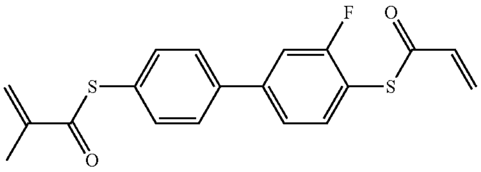
No. 56
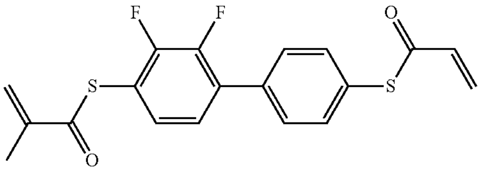

-continued
No. 57
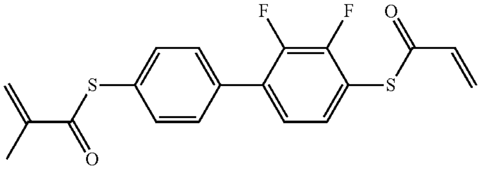
No. 58
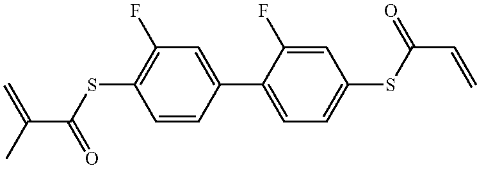
No. 59
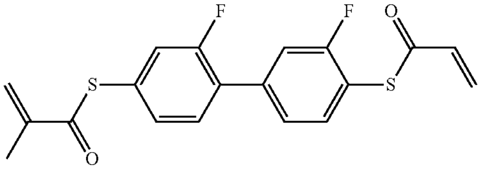
No. 60
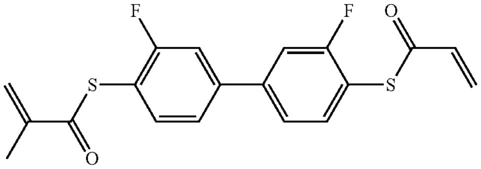
No. 61
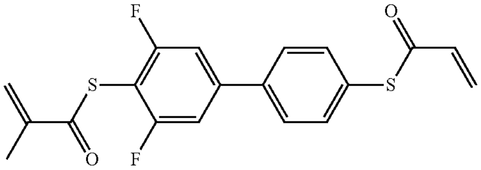
No. 62
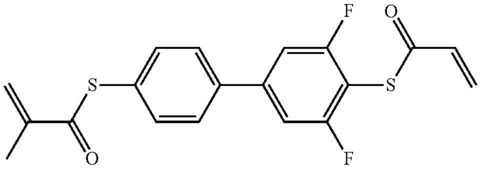
No. 63
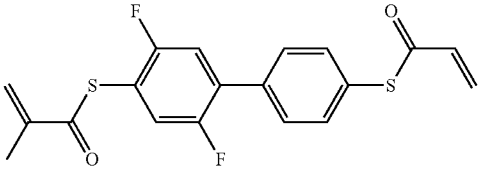
No. 64
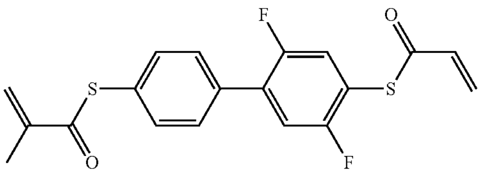
No. 65
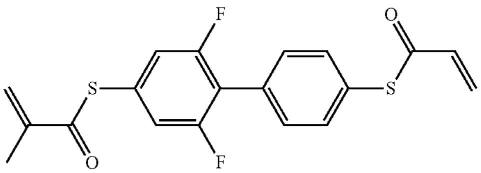
-continued
No. 66
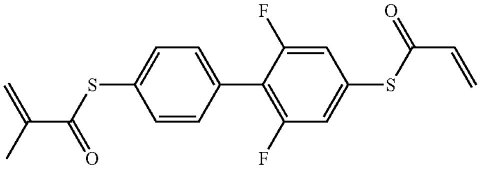
No. 67
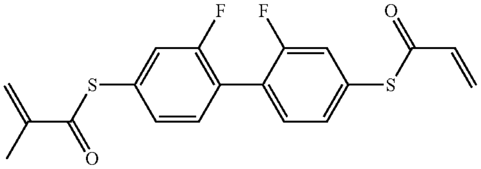
No. 68
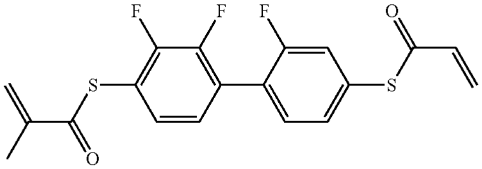
No. 69
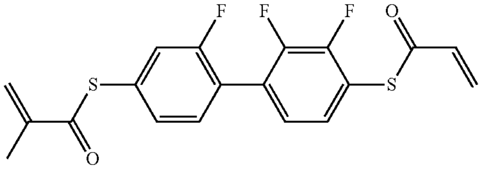
No. 70
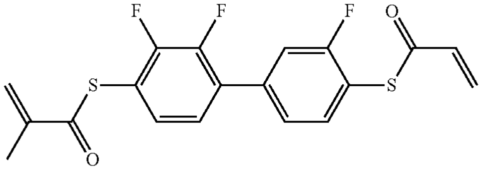
No. 71
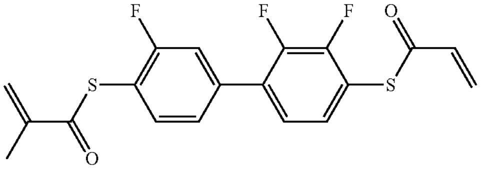
No. 72
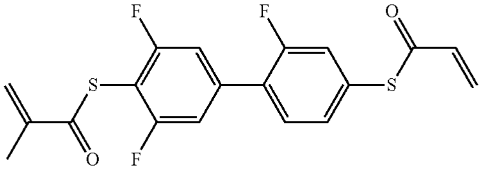
No. 73
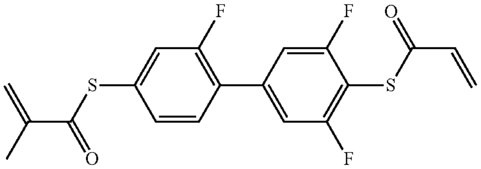
No. 74
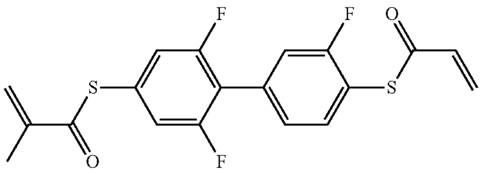

-continued
No. 75
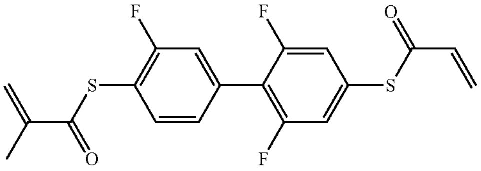
No. 76
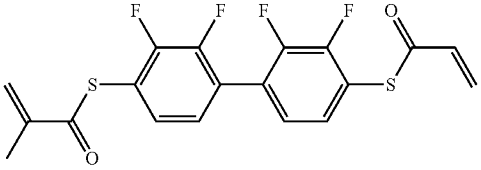
No. 77
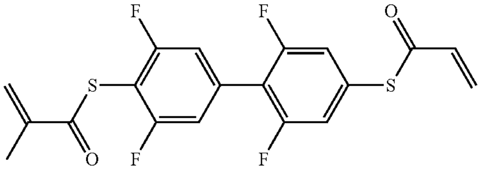
No. 78
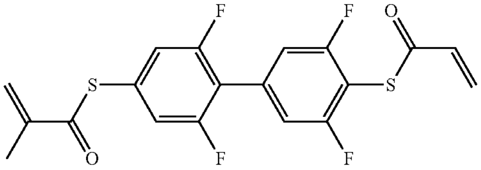
No. 79
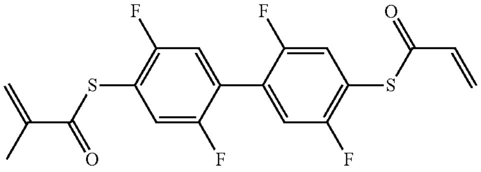
No. 80
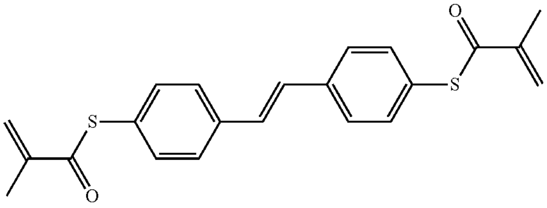
No. 81
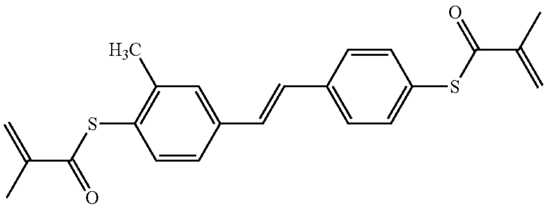
No. 82
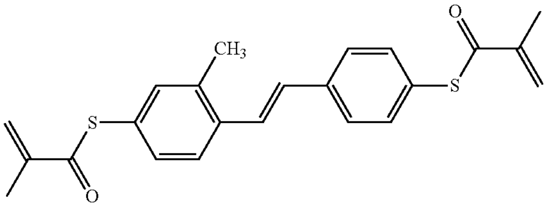
-continued
No. 83
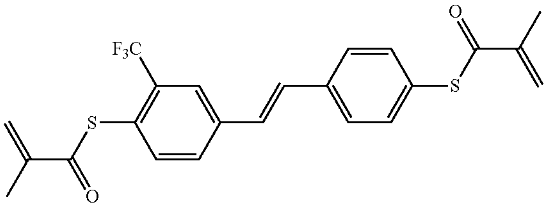
No. 84
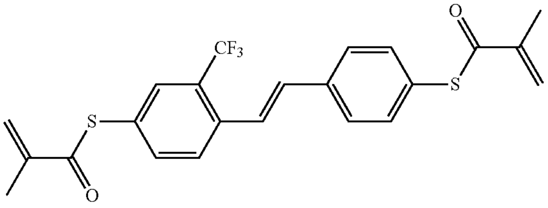
No. 85
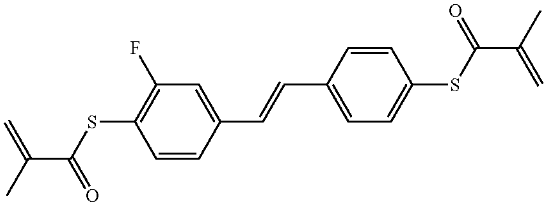
No. 86
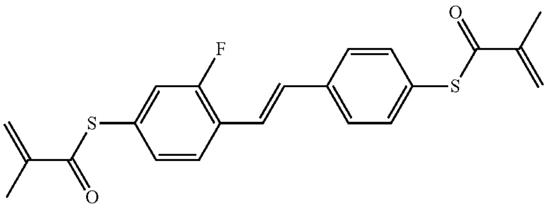
No. 87
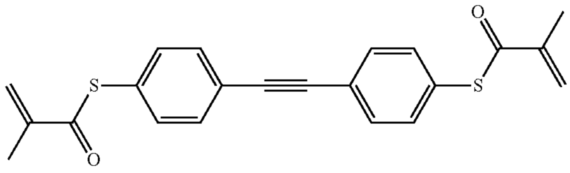
No. 88
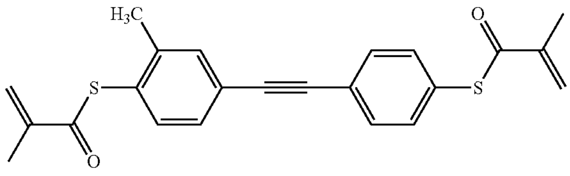
No. 89
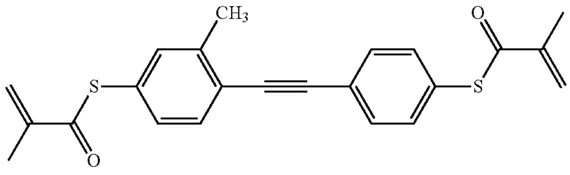

-continued
No. 90
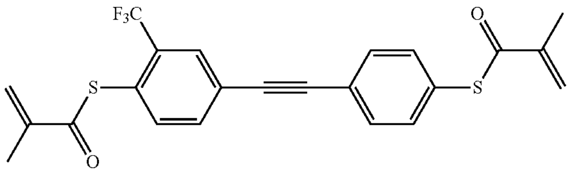
No. 91
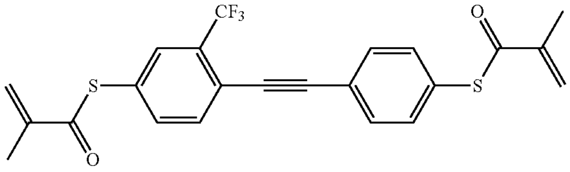
No. 92
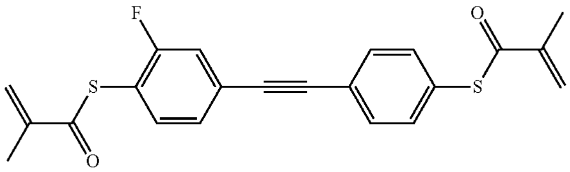
No. 93
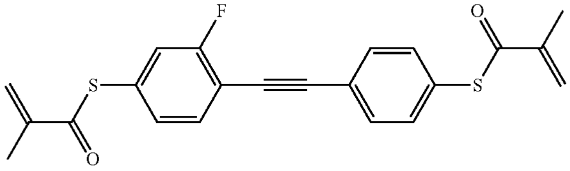
No. 94
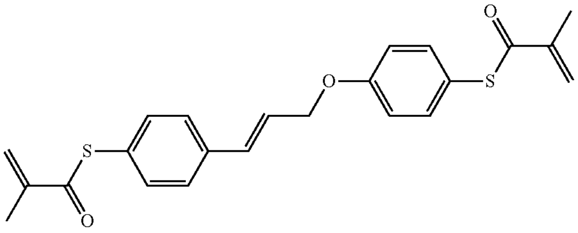
No. 95
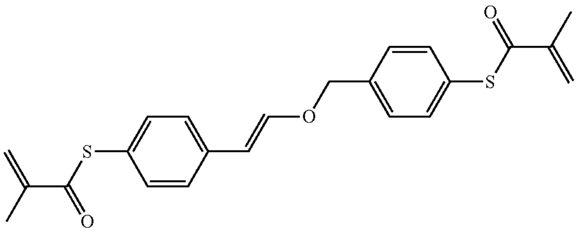
No. 96
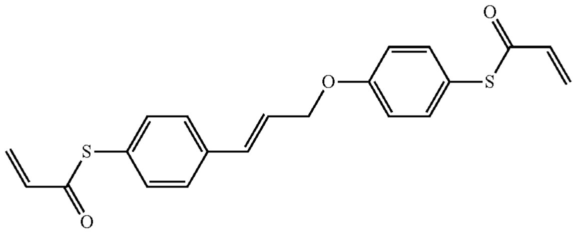
-continued
No. 97
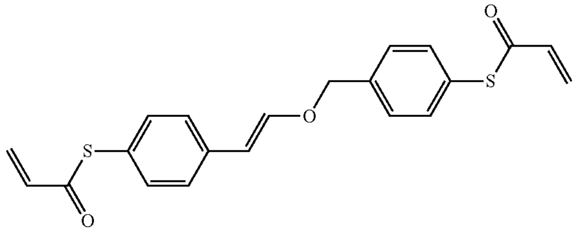
No. 98
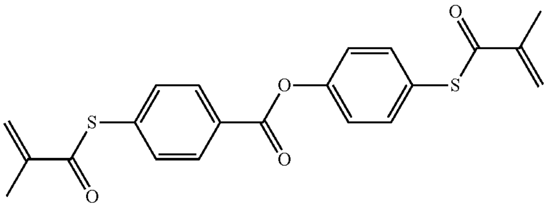
No. 99
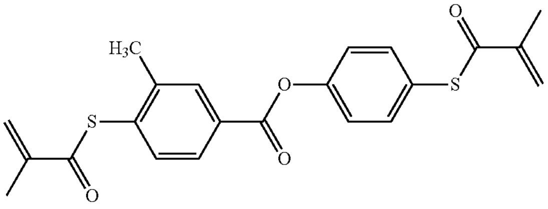
No. 100
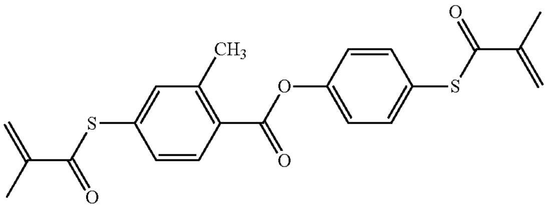
No. 101
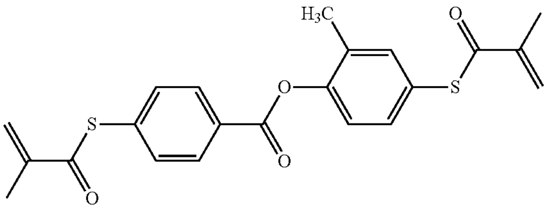
No. 102
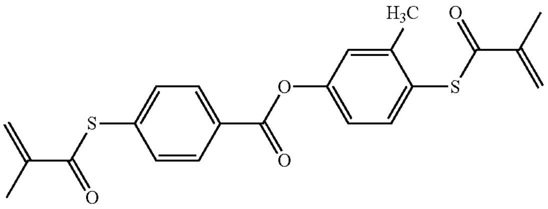

-continued
No. 103
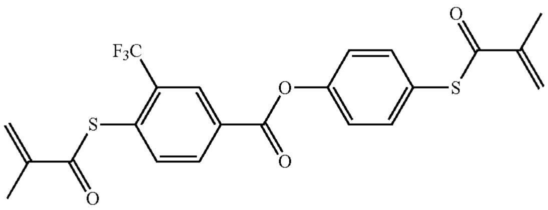
No. 104
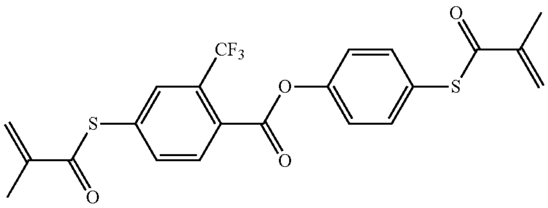
No. 105
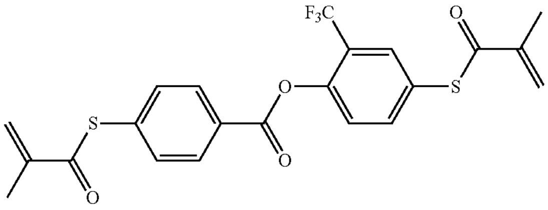
No. 106
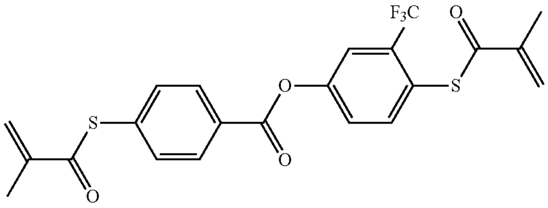
No. 107
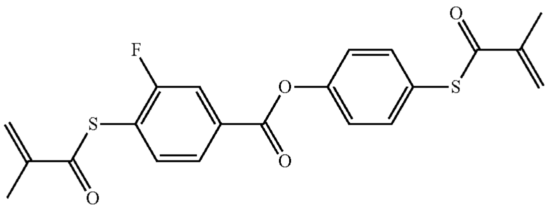
No. 108
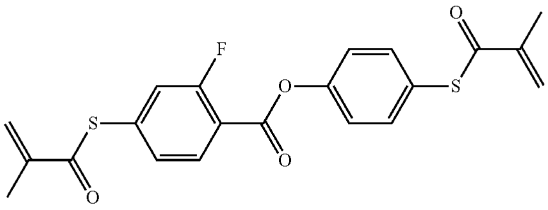
No. 109
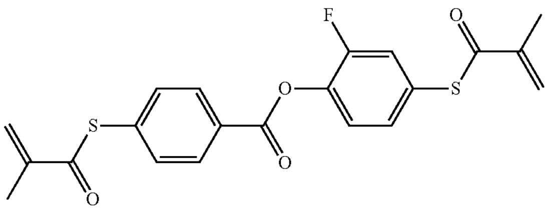
-continued
No. 110
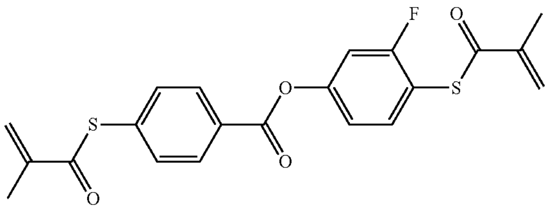
No. 111
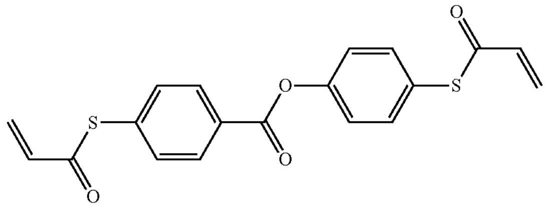
No. 112
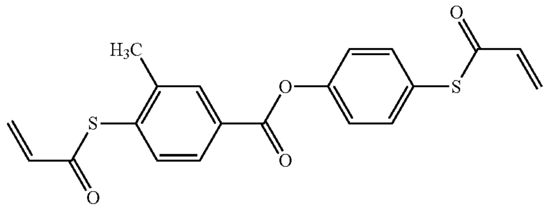
No. 113
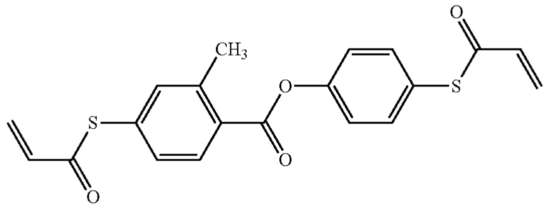
No. 114
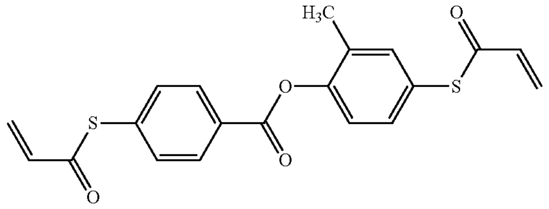
No. 115
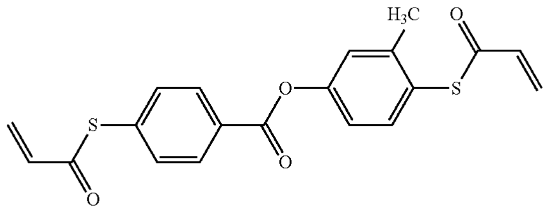
No. 116
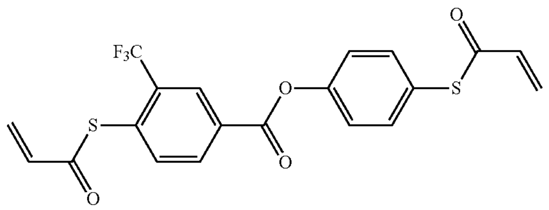

-continued
No. 117
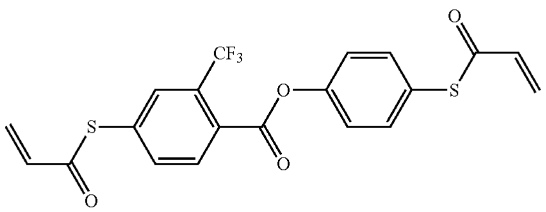
No. 118
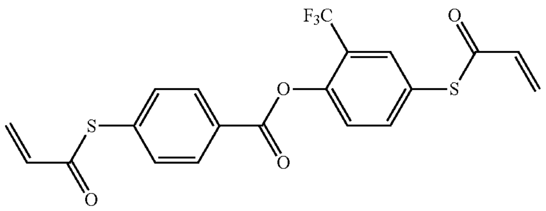
No. 119
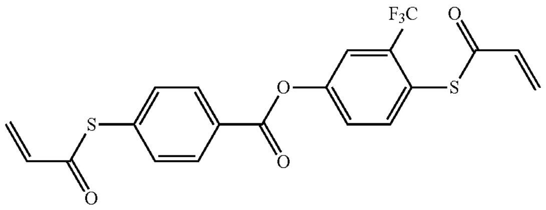
No. 120
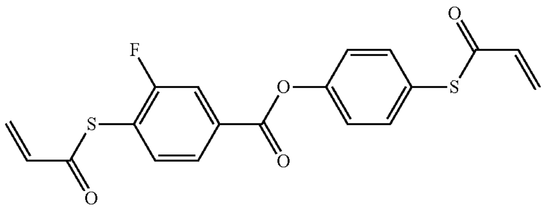
No. 121
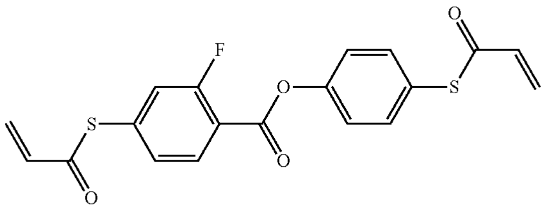
No. 122
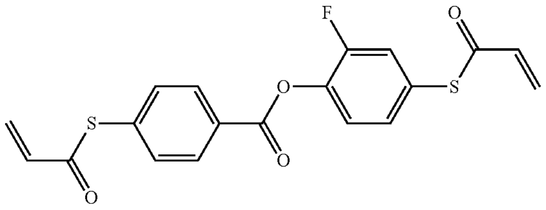
No. 123
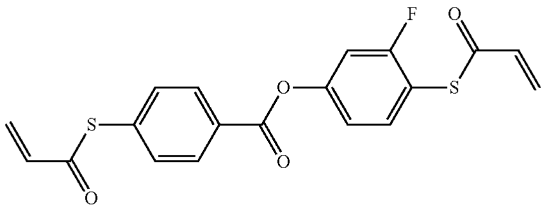
-continued
No. 124
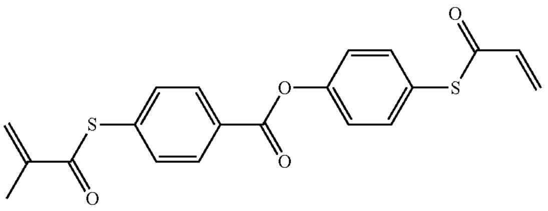
No. 125
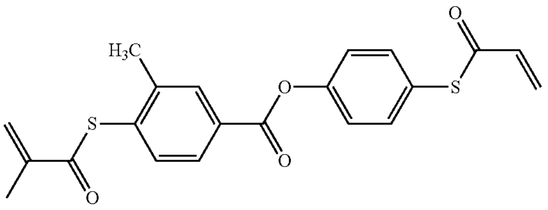
No. 126
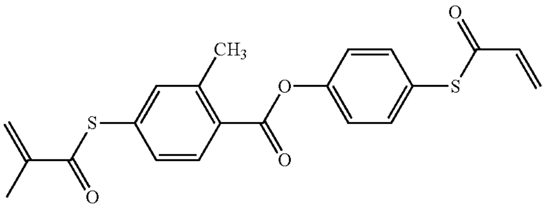
No. 127
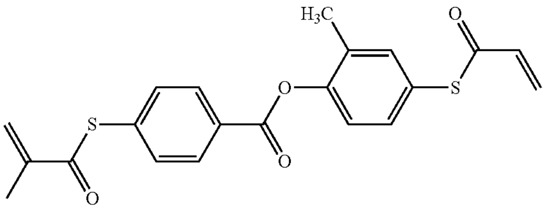
No. 128
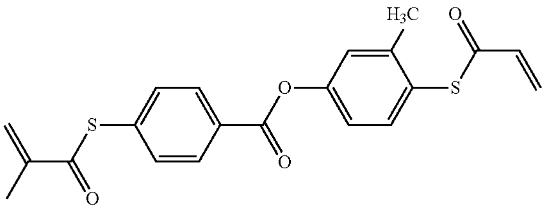
No. 129
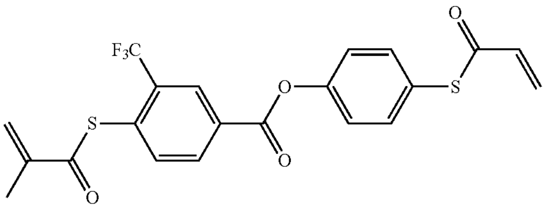
No. 130
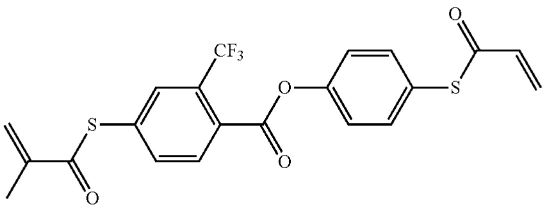

-continued
No. 131
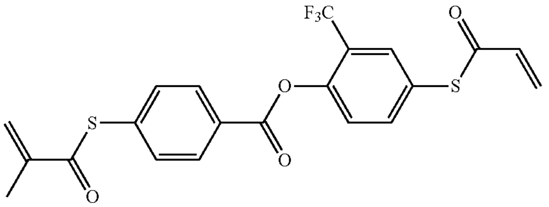
No. 132
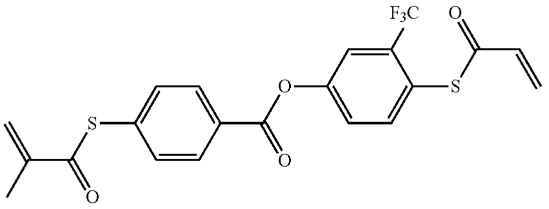
No. 133
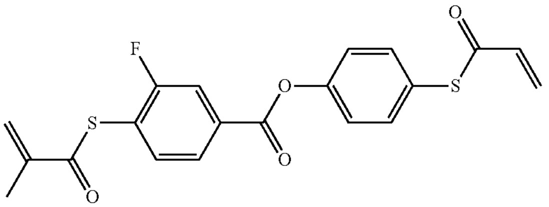
No. 134
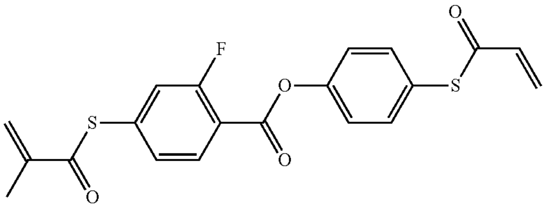
No. 135
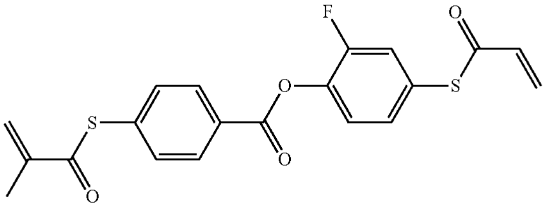
No. 136
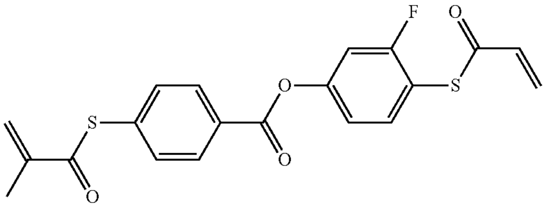
No. 137
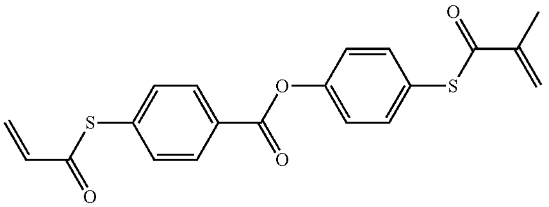
-continued
No. 138
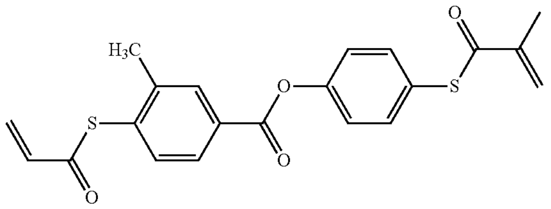
No. 139
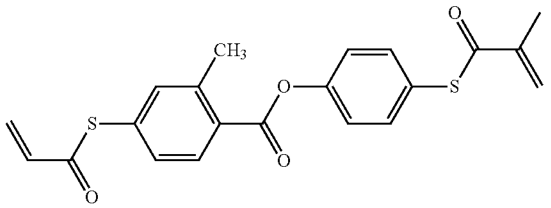
No. 140
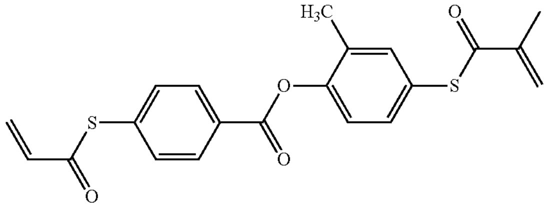
No. 141
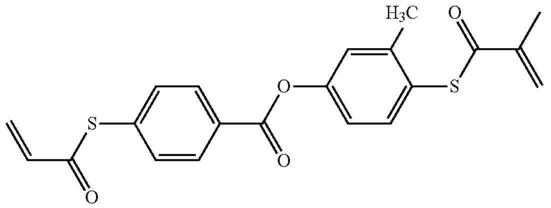
No. 142
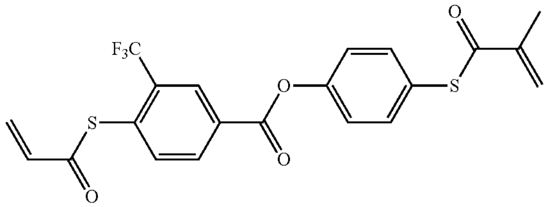
No. 143
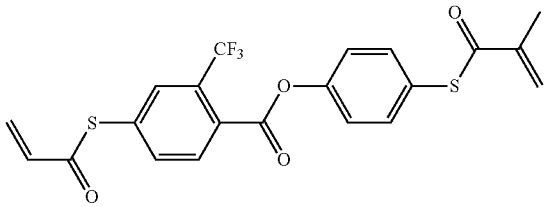
No. 144
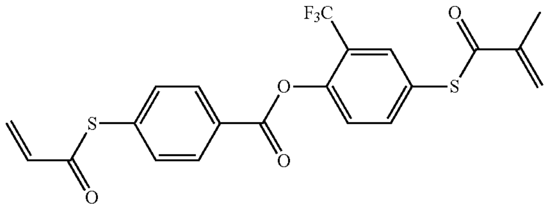

-continued
No. 145
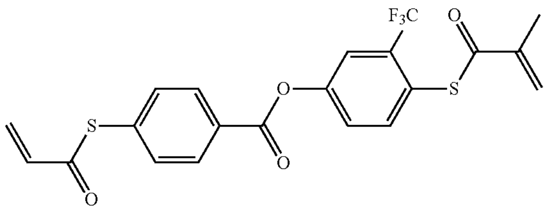
No. 146
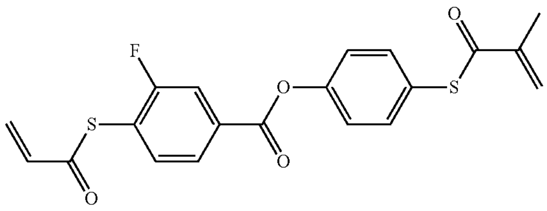
No. 147
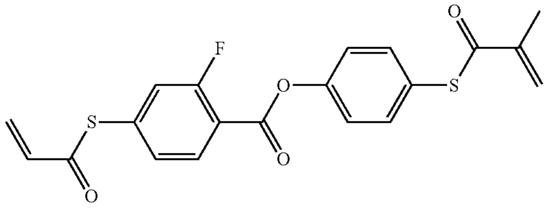
No. 148
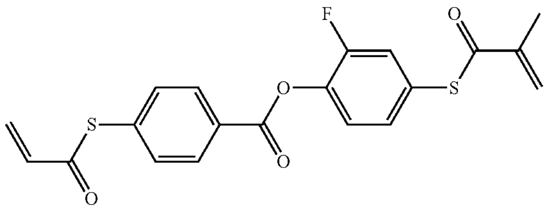
No. 149
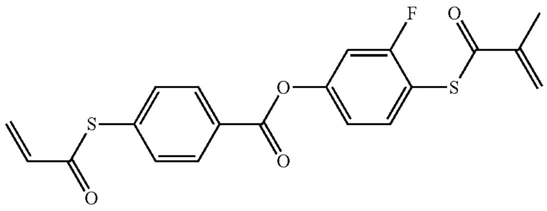
No. 150
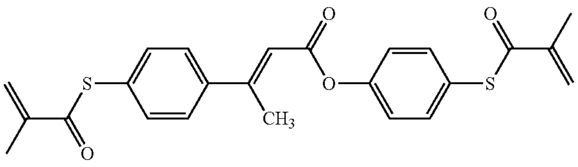
No. 151
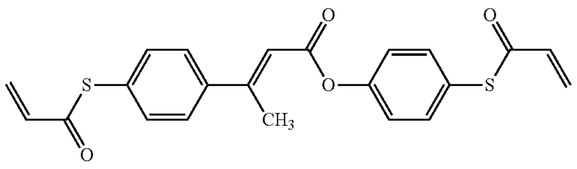
-continued
No. 152
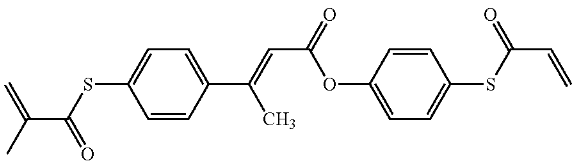
No. 153
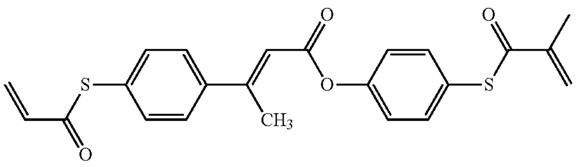
No. 154
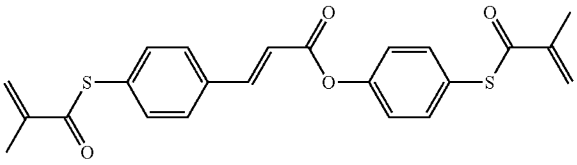
No. 155
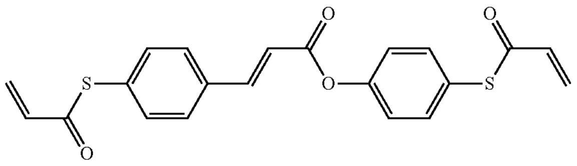
No. 156
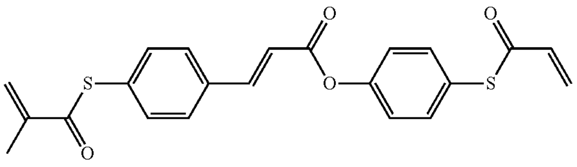
No. 157
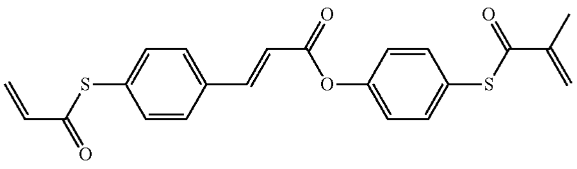
No. 158
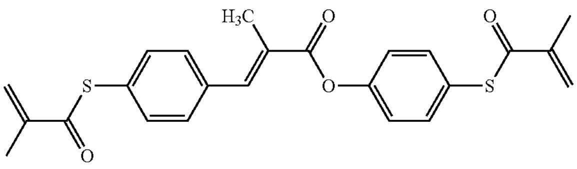
No. 159
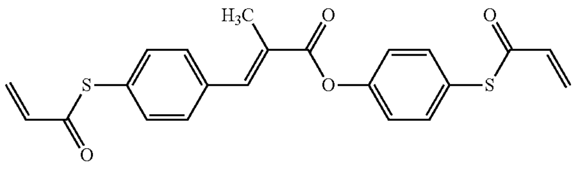

-continued
No. 160
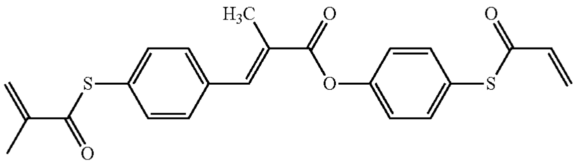
No. 161
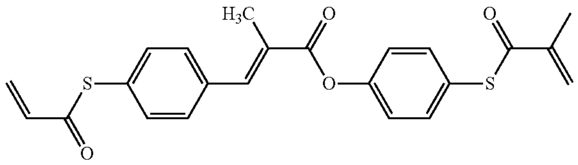
No. 162
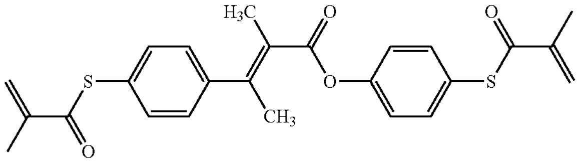
No. 163
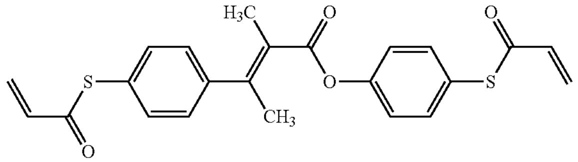
No. 164
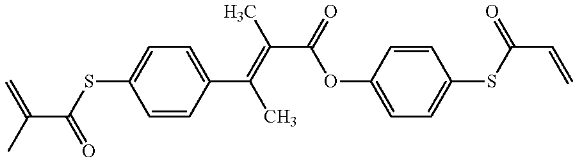
No. 165
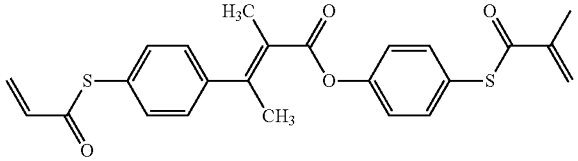
No. 166
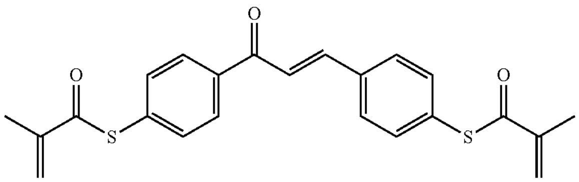
No. 167
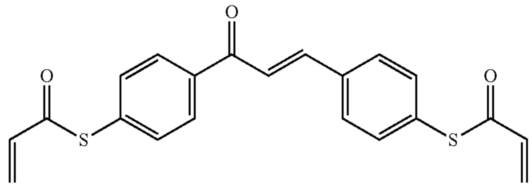
-continued
No. 168
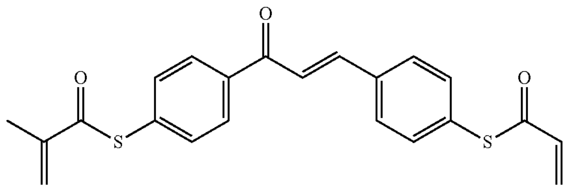
No. 169
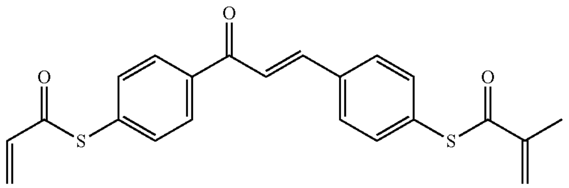
No. 170
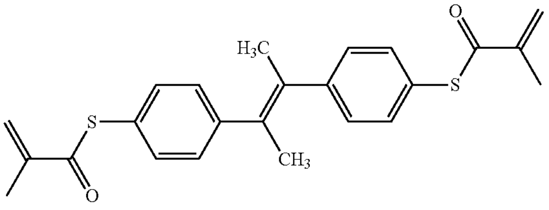
No. 171
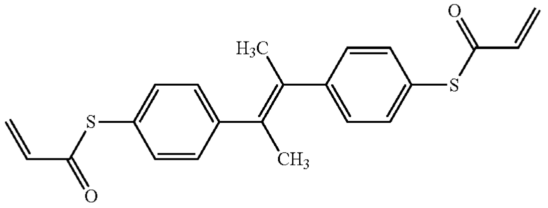
No. 172
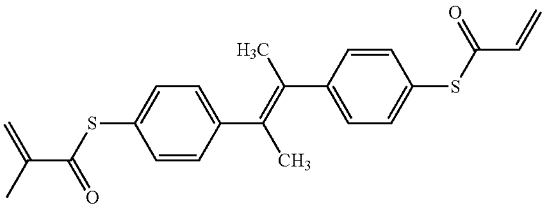
No. 173
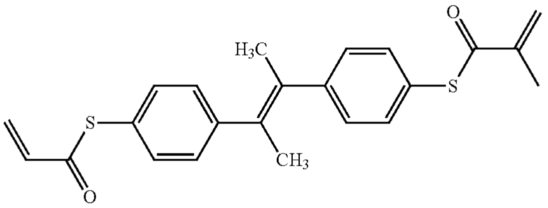
No. 174
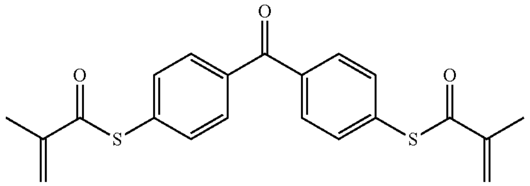

No. 175
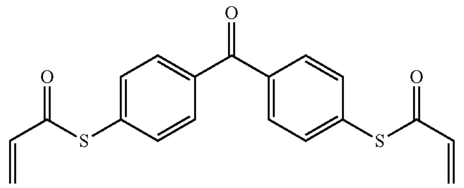
No. 176
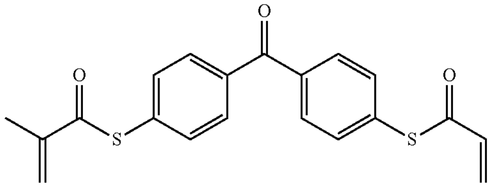
No. 177
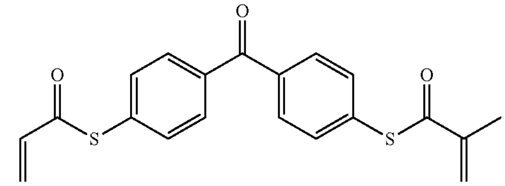
No. 178
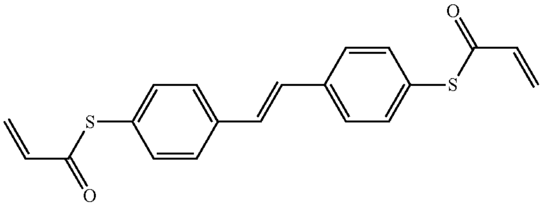
No. 179
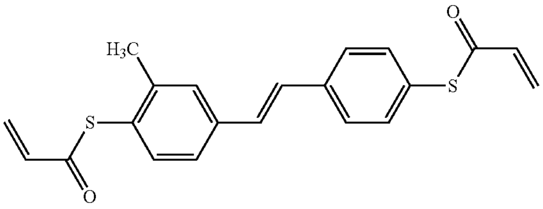
No. 180
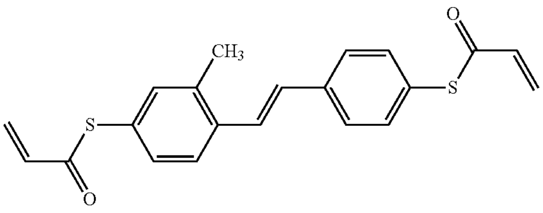
No. 181
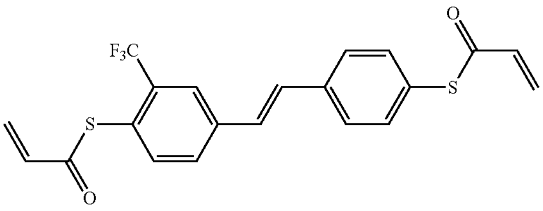
No. 182
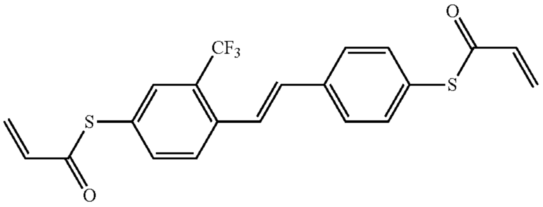
No. 183
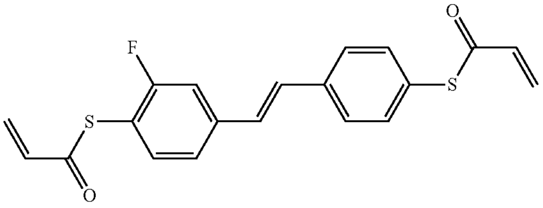
No. 184
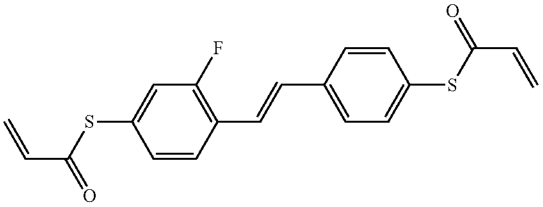
No. 185
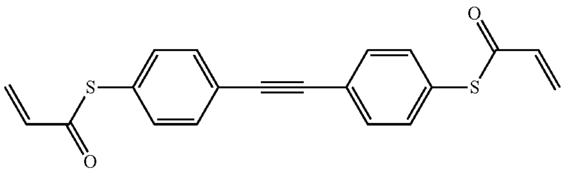
No. 186
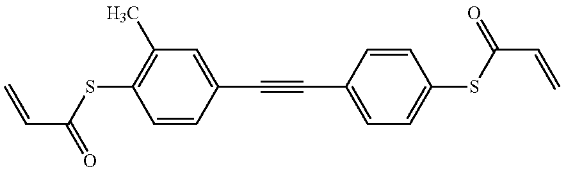
No. 187
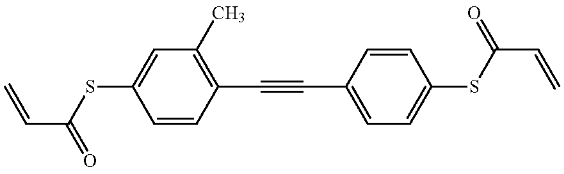
No. 188
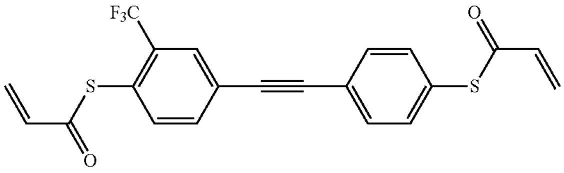

No. 189
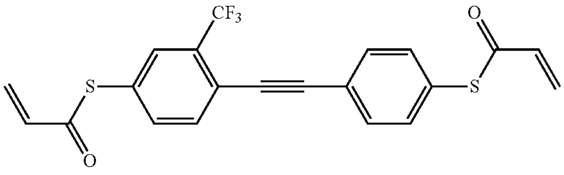
No. 190
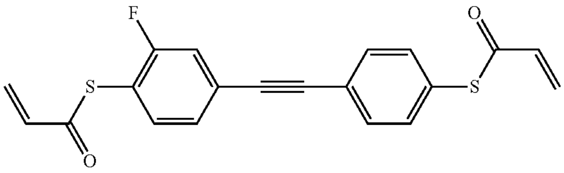
No. 191
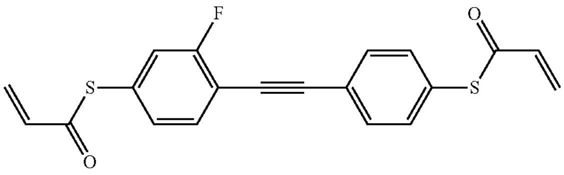
No. 192
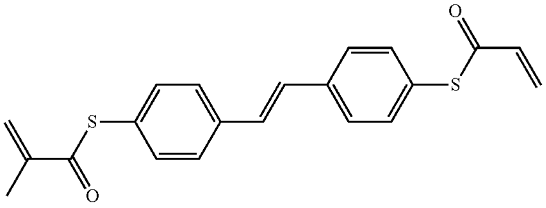
No. 193
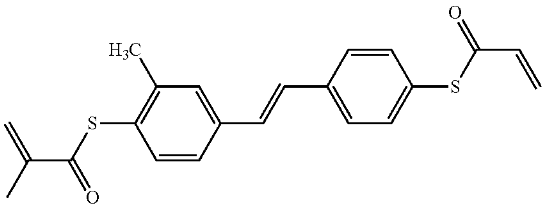
No. 194
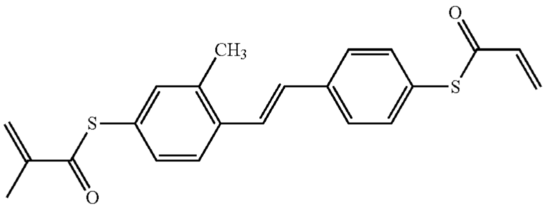
No. 195
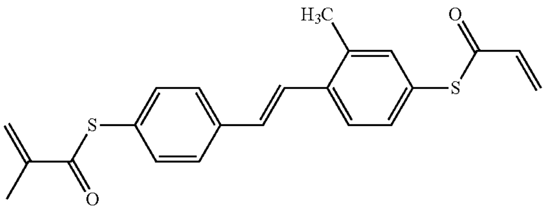
No. 196
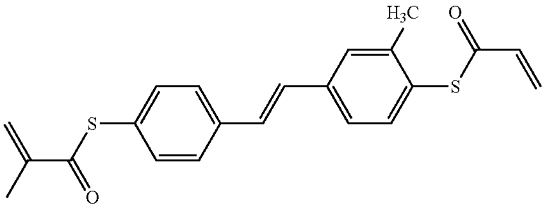
No. 197
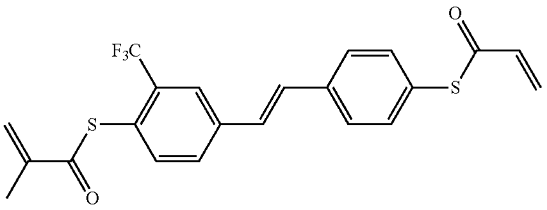
No. 198
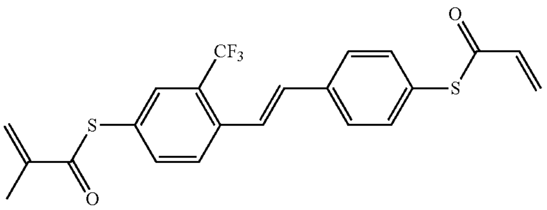
No. 199
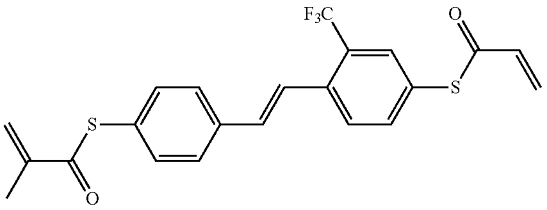
No. 200
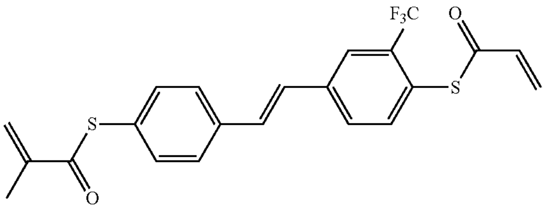
No. 201
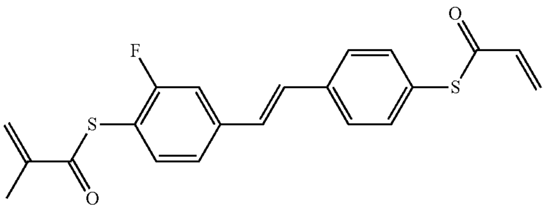

-continued
No. 202
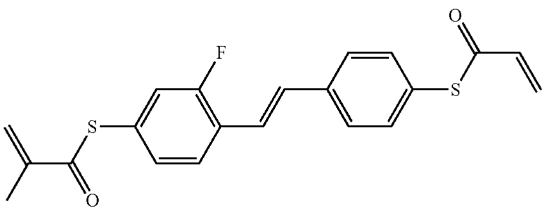
No. 203
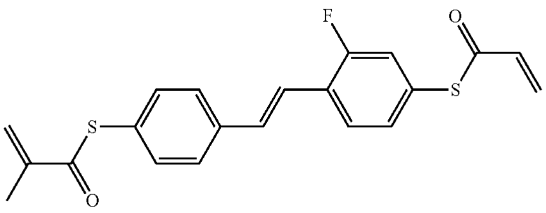
No. 204
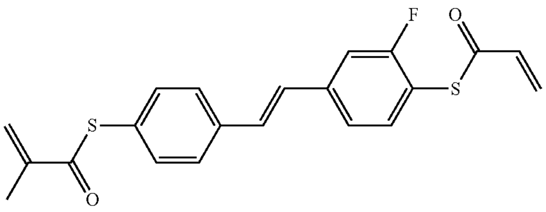
No. 205
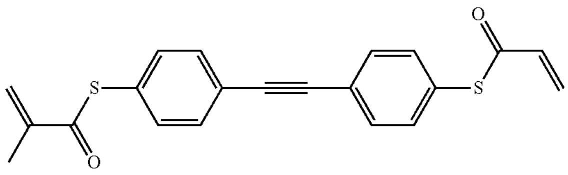
No. 206
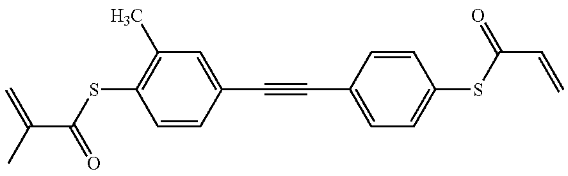
No. 207
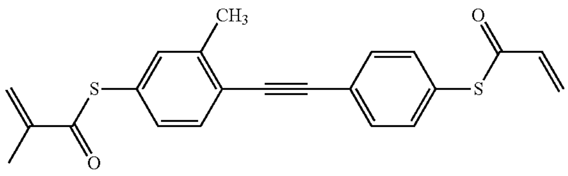
No. 208
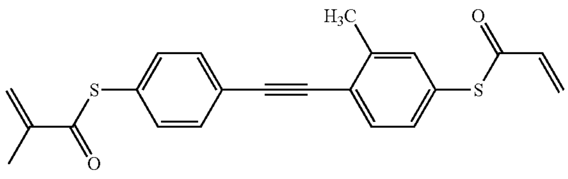
-continued
No. 209
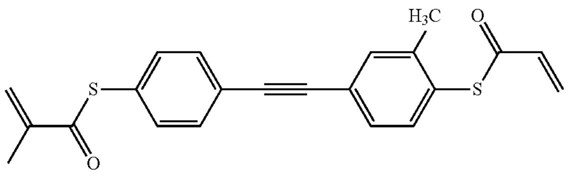
No. 210
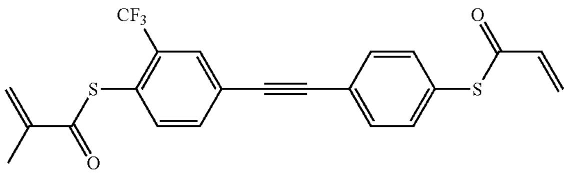
No. 211
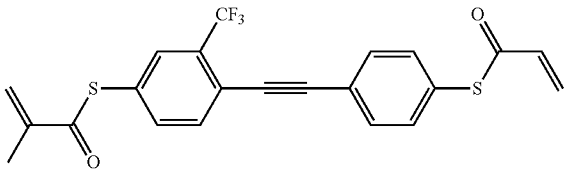
No. 212
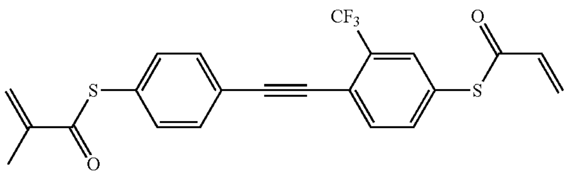
No. 213
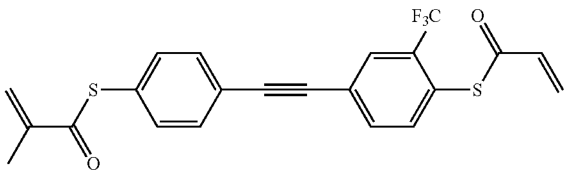
No. 214
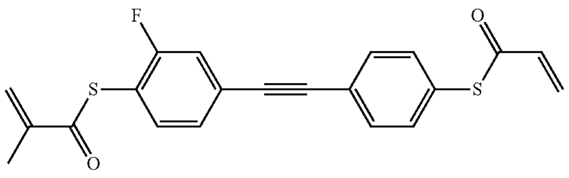
No. 215
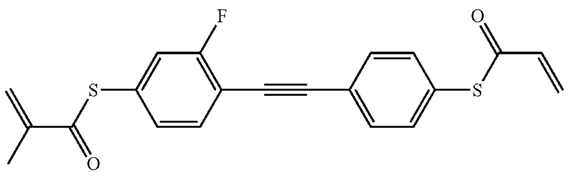
No. 216
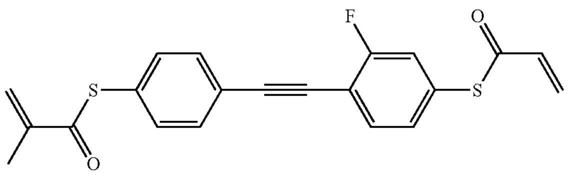

-continued
No. 217
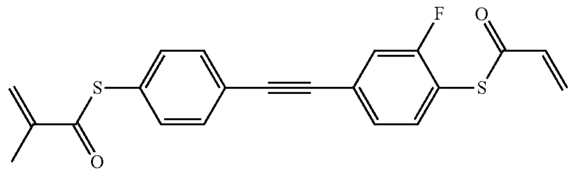
No. 218
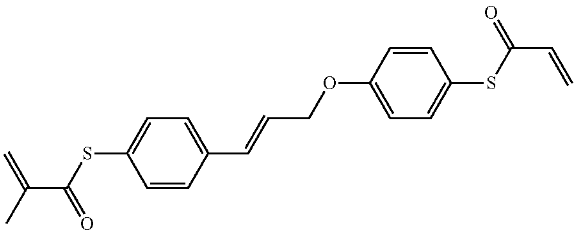
No. 209
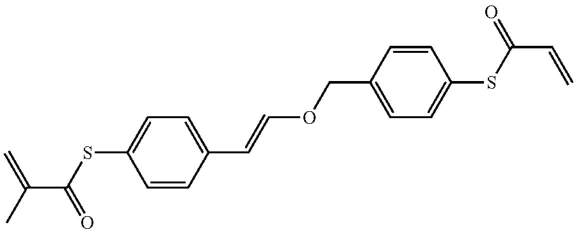
No. 220
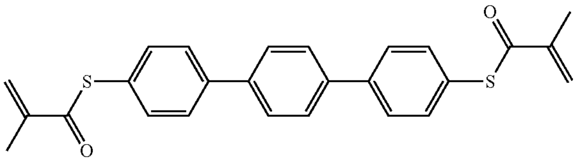
No. 221
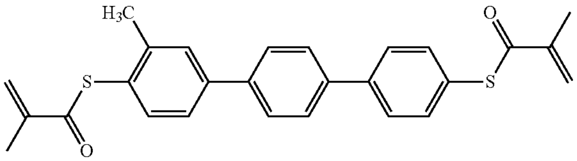
No. 222
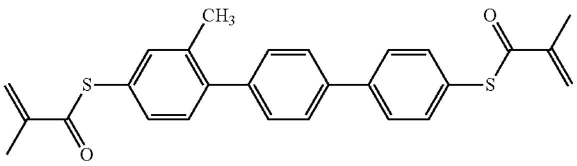
No. 223
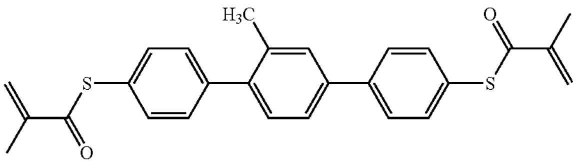
-continued
No. 224
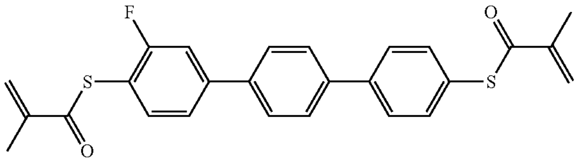
No. 225
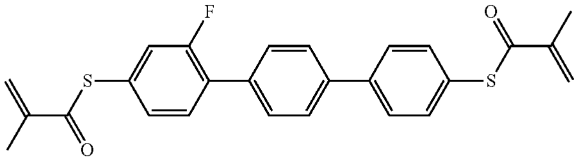
No. 226
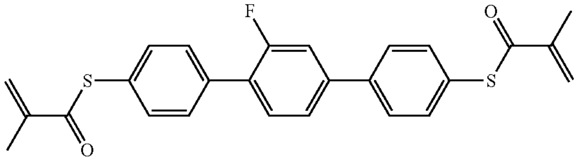
No. 227
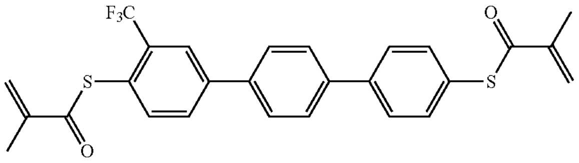
No. 228
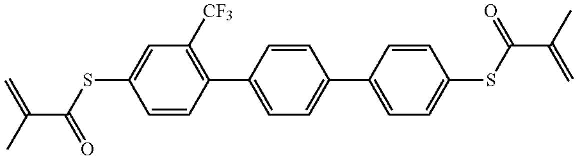
No. 229
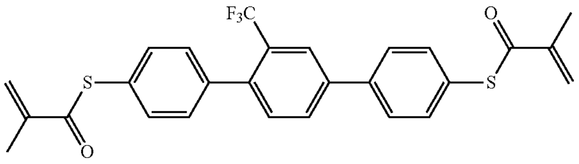
No. 230
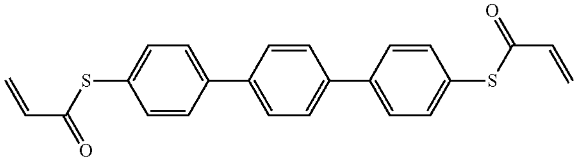
No. 231
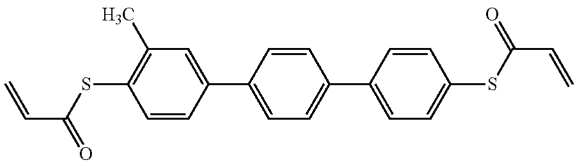

No. 232
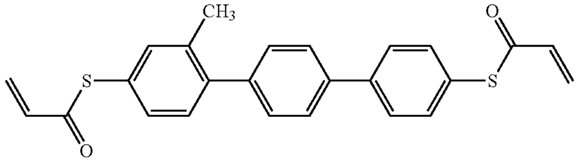
No. 233
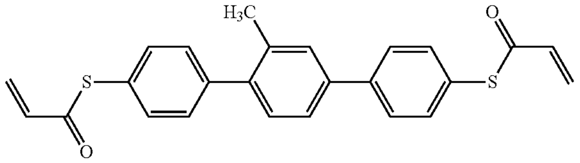
No. 234
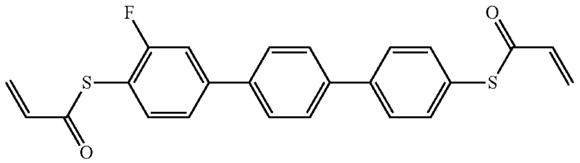
No. 235
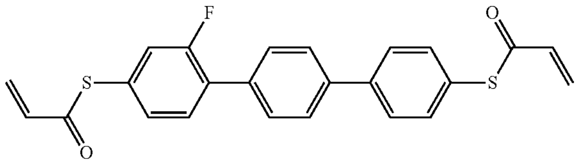
No. 236
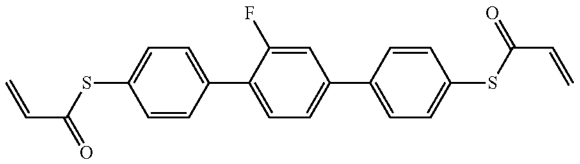
No. 237
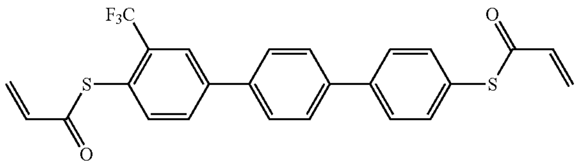
No. 238
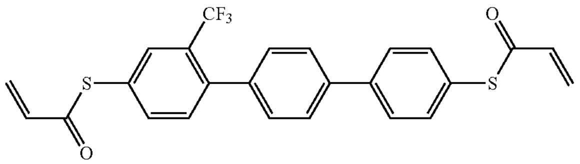
No. 239
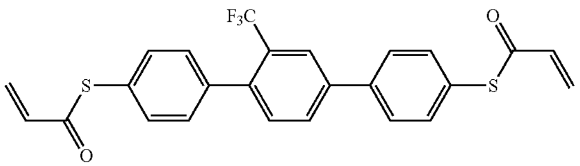
No. 240
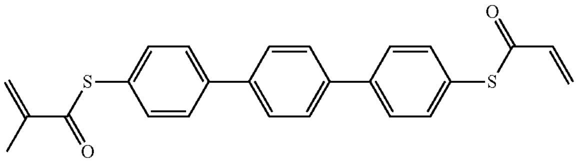
No. 241
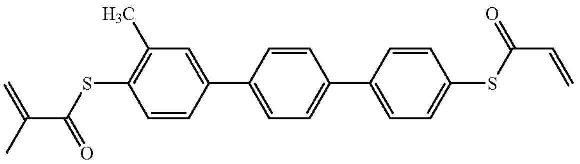
No. 242
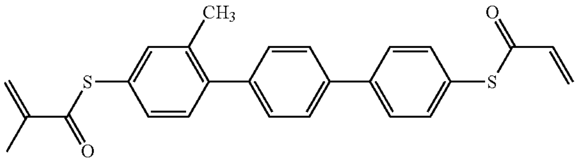
No. 243
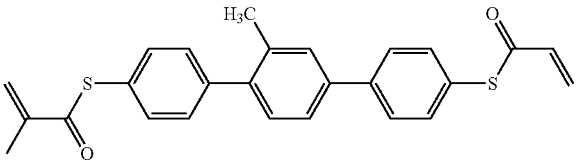
No. 244
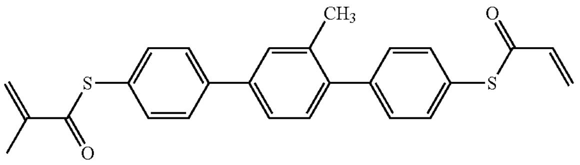
No. 245
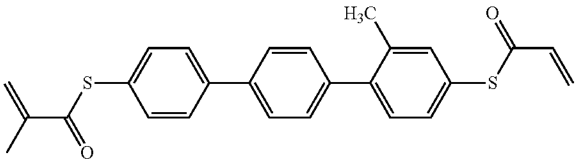
No. 246
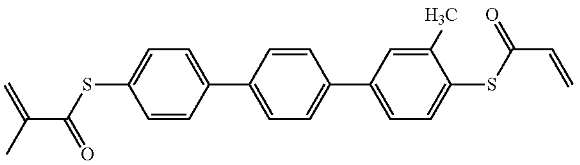
No. 247
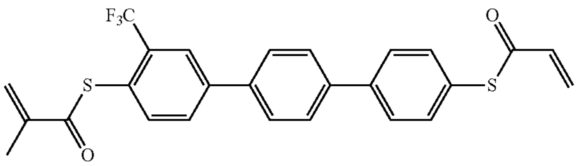

-continued
No. 248
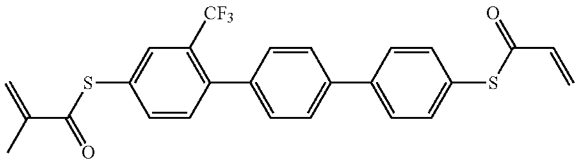
No. 249
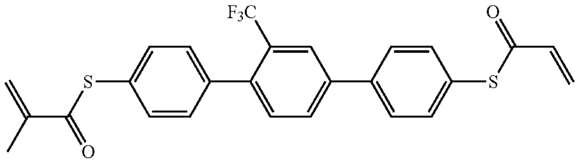
No. 250
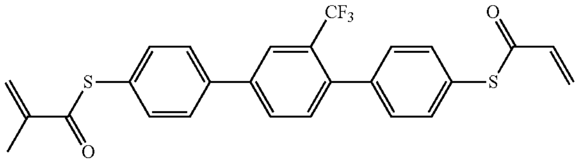
No. 251
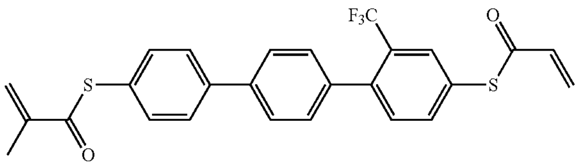
No. 252
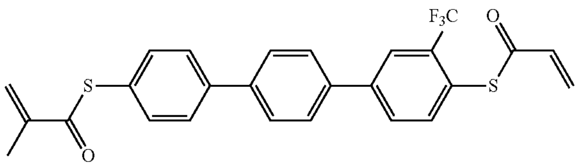
No. 253
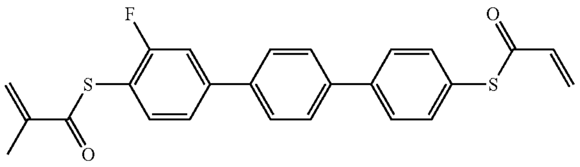
No. 254
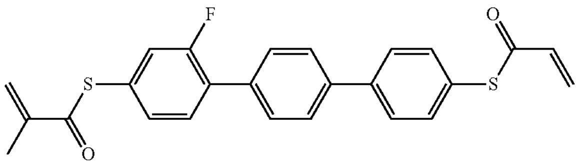
No. 255
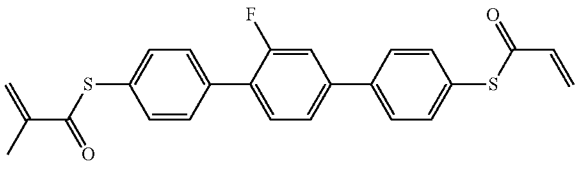
-continued
No. 256
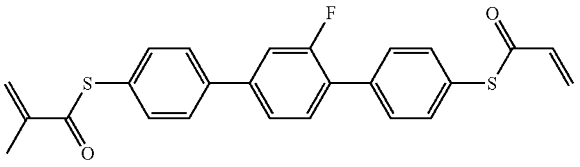
No. 257
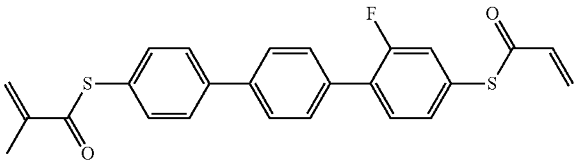
No. 258
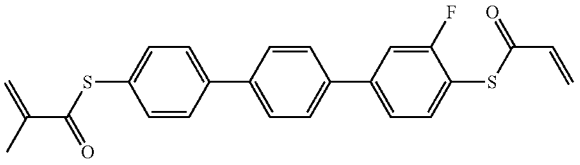
No. 259
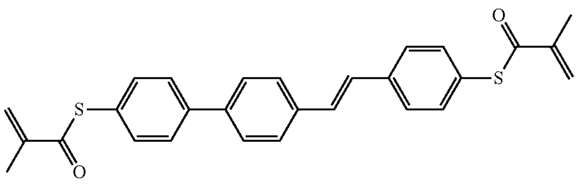
No. 260
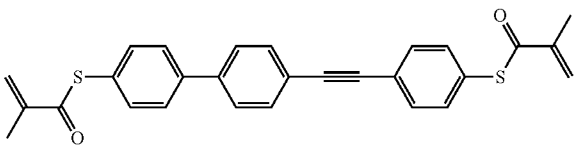
No. 261
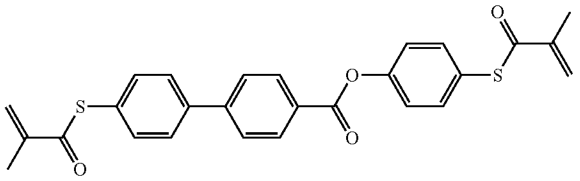
No. 262
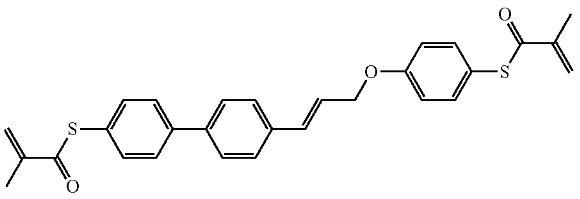
No. 263
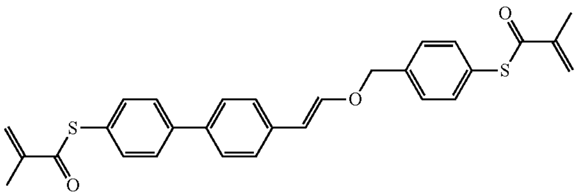

No. 264
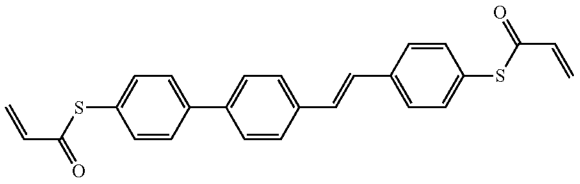
No. 265
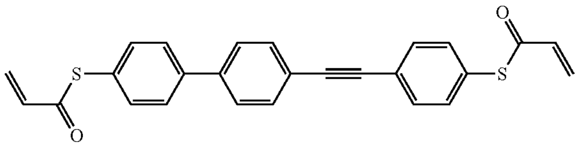
No. 266
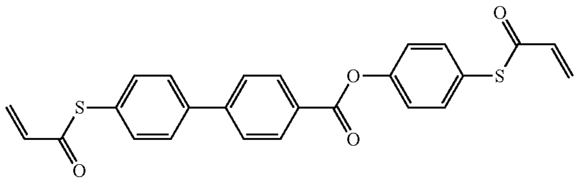
No. 267
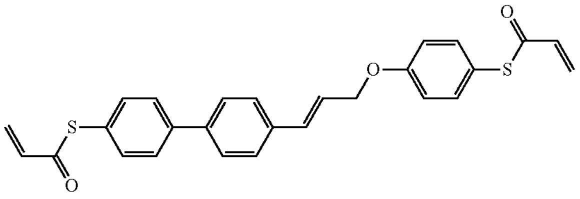
No. 268
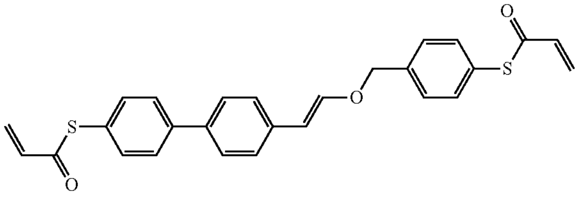
No. 269
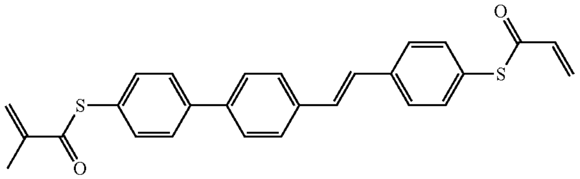
No. 270
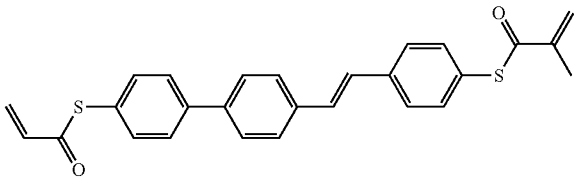
No. 271
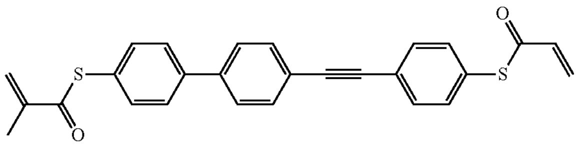
No. 272
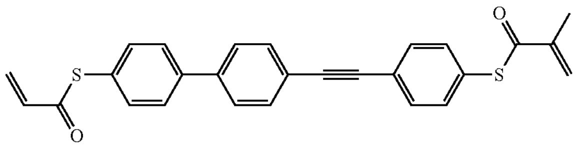
No. 273
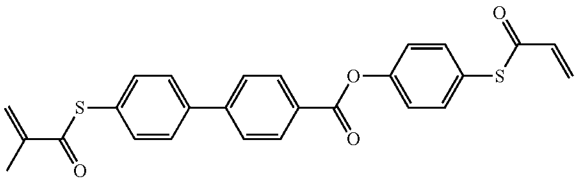
No. 274
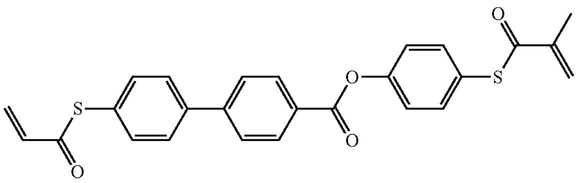
No. 275
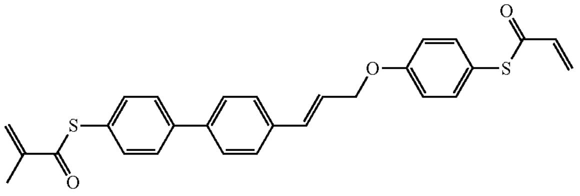
No. 276
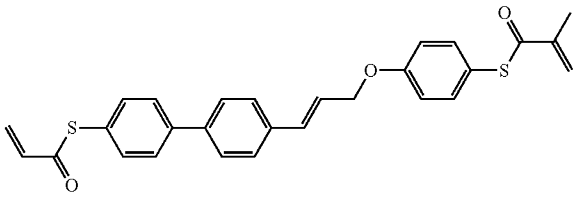
No. 277
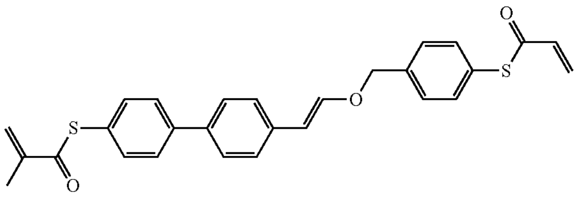
No. 278
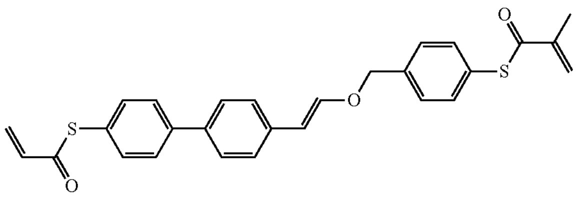

-continued
No. 279
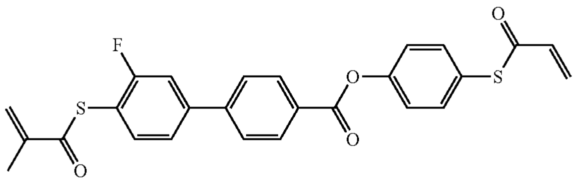
No. 280
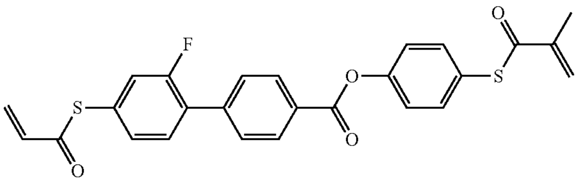
No. 281
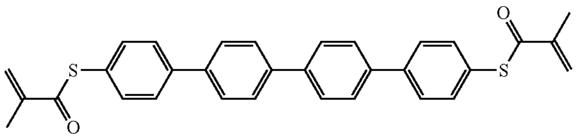
No. 282
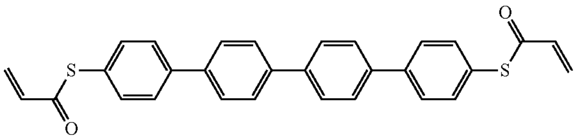
No. 283
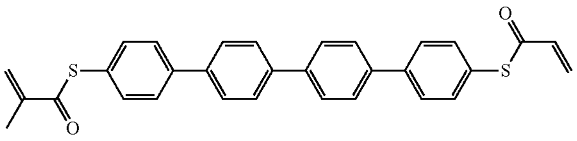
No. 284
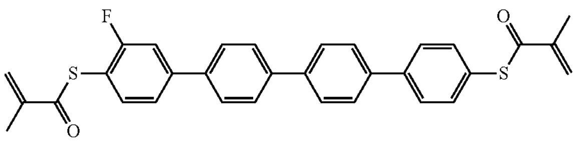
No. 285
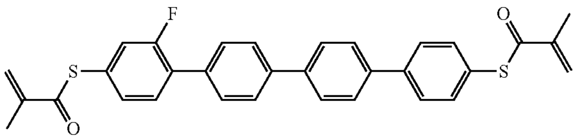
No. 286
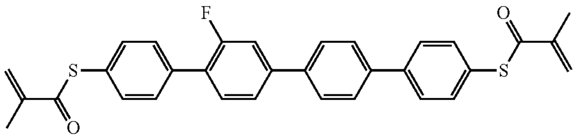
No. 287
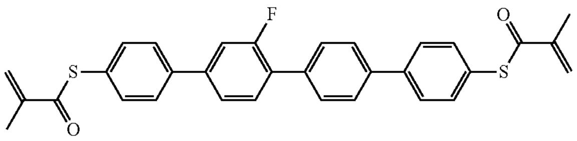
-continued
No. 288
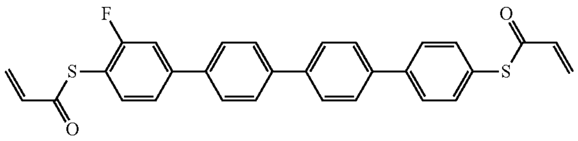
No. 289
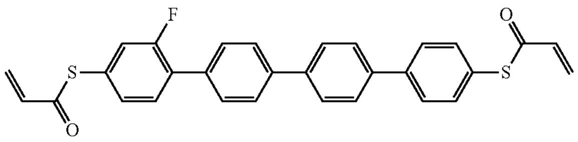
No. 290
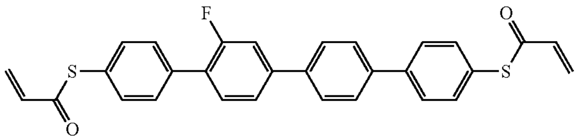
No. 291
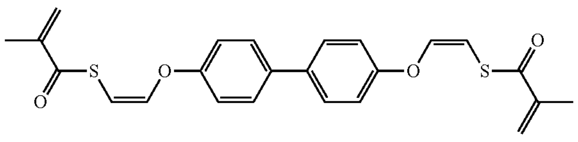
No. 292
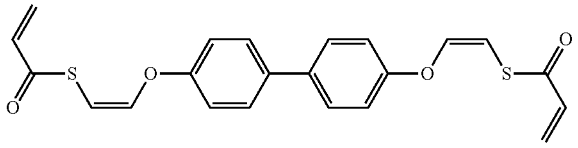
No. 293
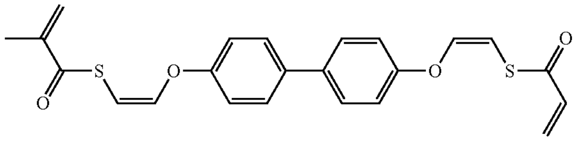
No. 294
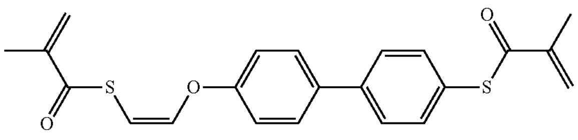
No. 295
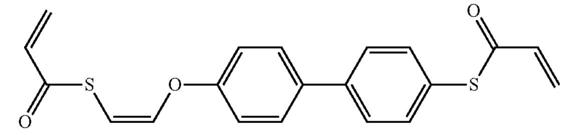
No. 296
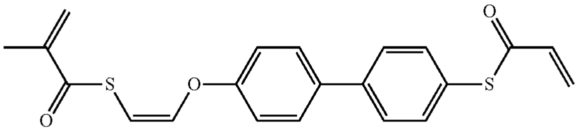

-continued
No. 297
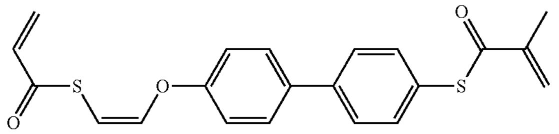
No. 298
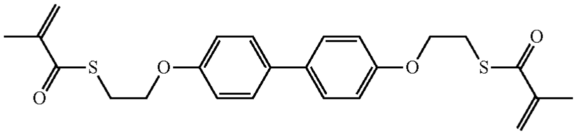
No. 299
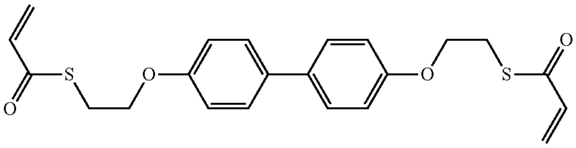
No. 300
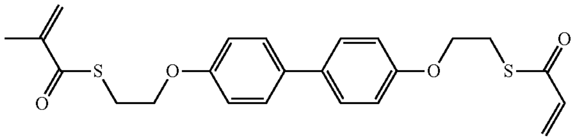
No. 301
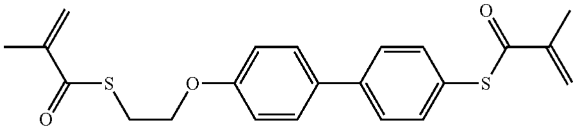
No. 302
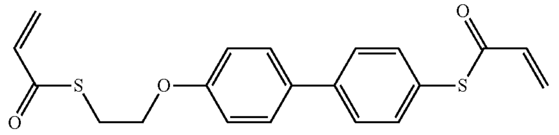
No. 303
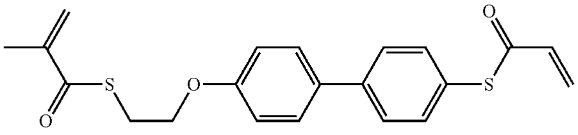
No. 304
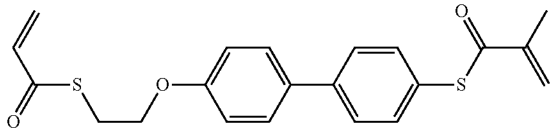
No. 305
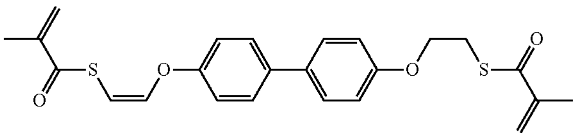
-continued
No. 306
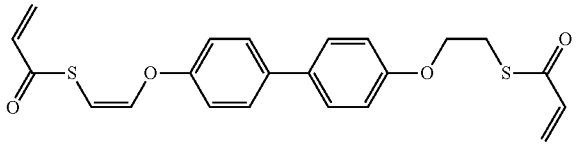
No. 307
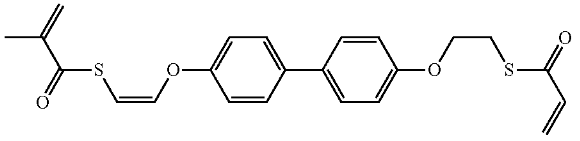
No. 308
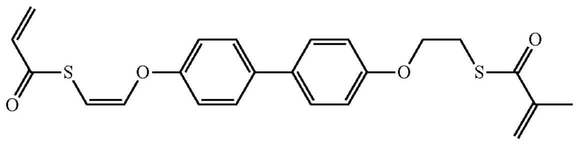
No. 309
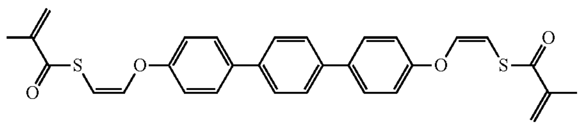
No. 310
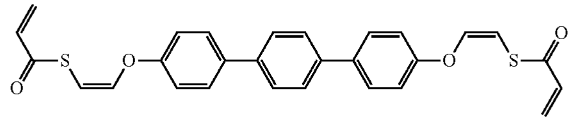
No. 311
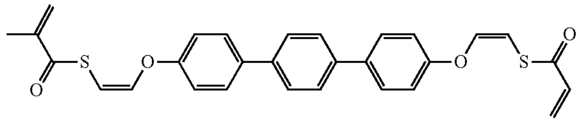
No. 312
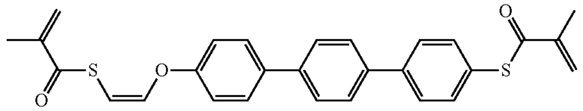
No. 313
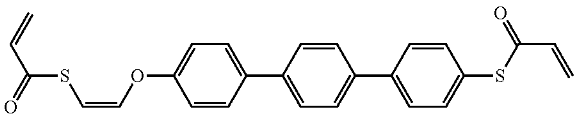
No. 314
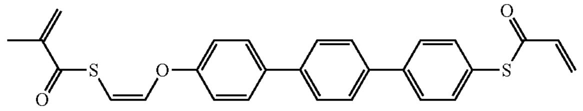
No. 315
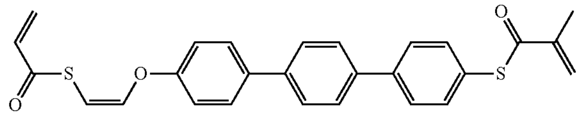

-continued
No. 316
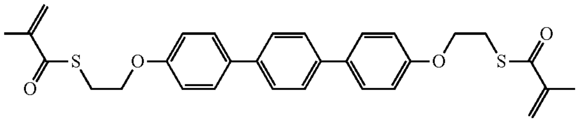
No. 317
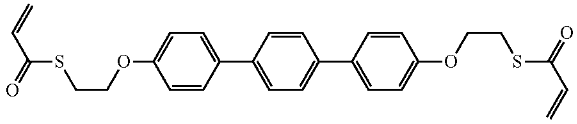
No. 318
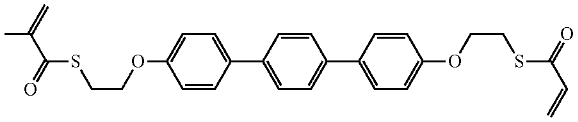
No. 319
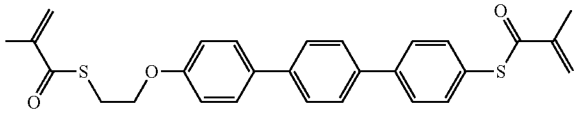
No. 320
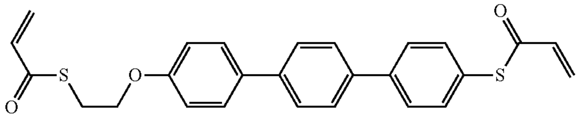
No. 321
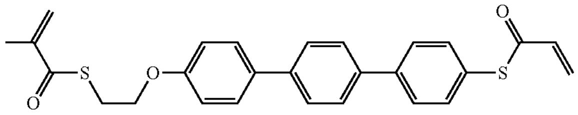
No. 322
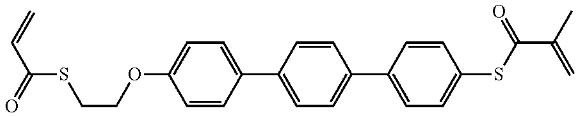
No. 323
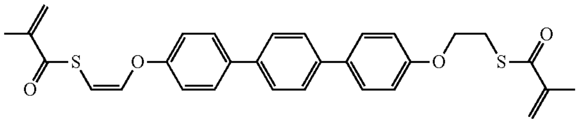
No. 324
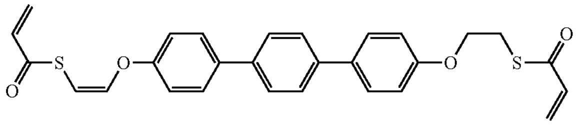
No. 325
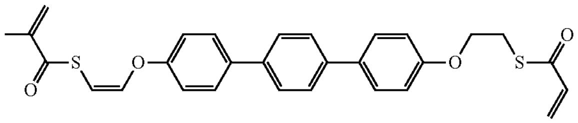
-continued
No. 326
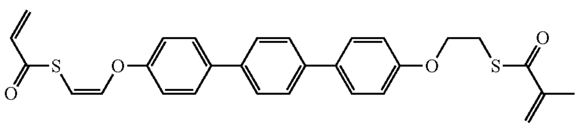
No. 327
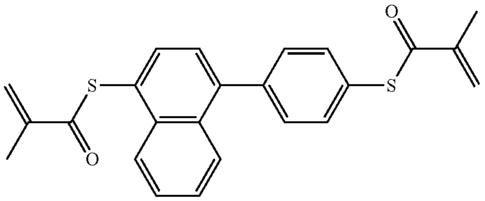
No. 328
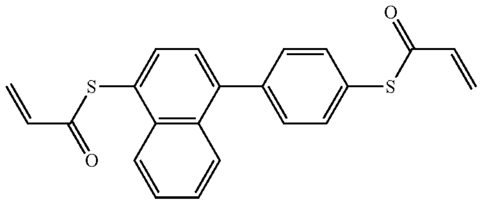
No. 329
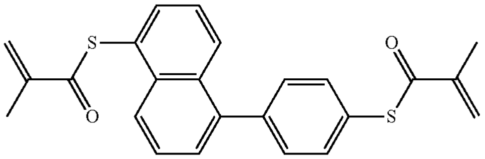
No. 330
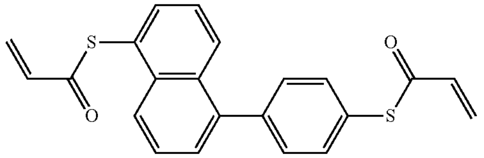
No. 331
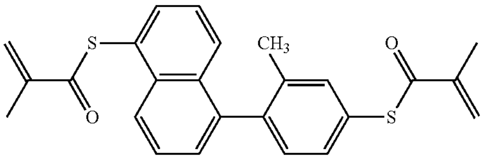
No. 332
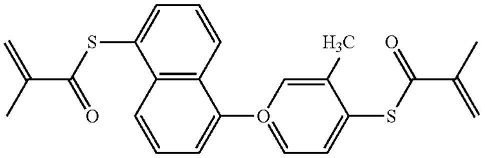
No. 333
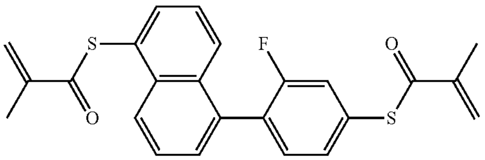
No. 334
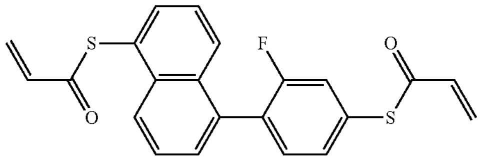

-continued
No. 335
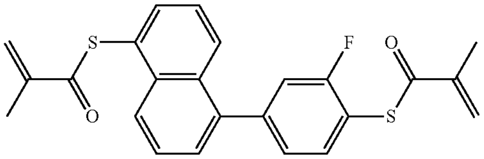
No. 336
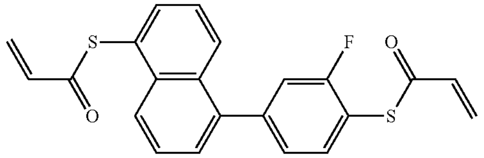
No. 337
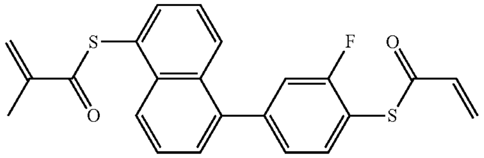
No. 338
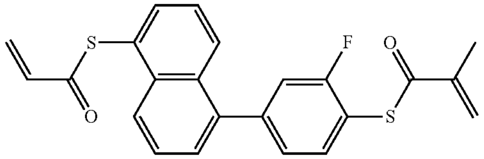
No. 339
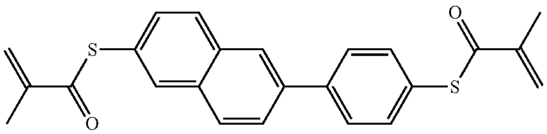
No. 340
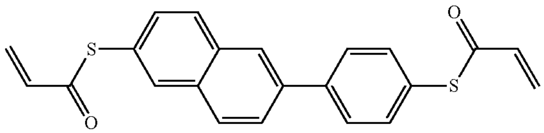
No. 341
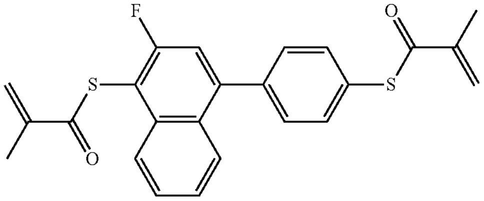
No. 342
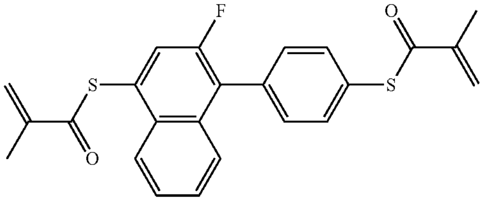
-continued
No. 343
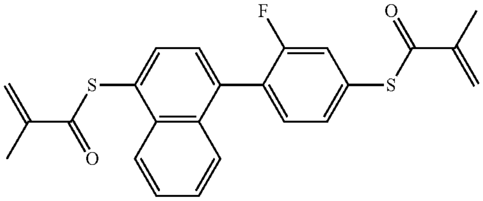
No. 344
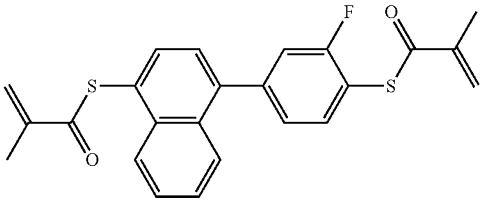
No. 345
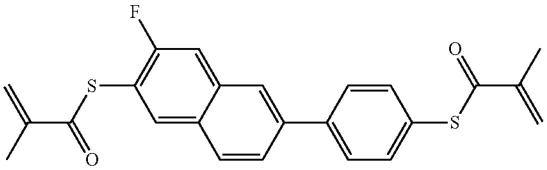
No. 346
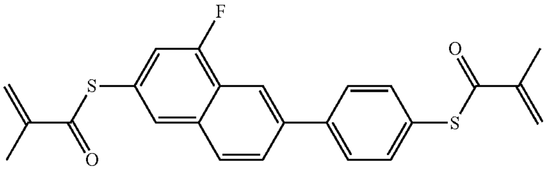
No. 347
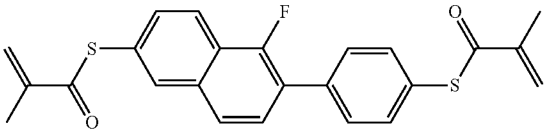
No. 348
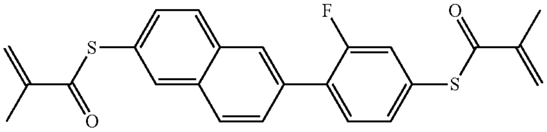
No. 349
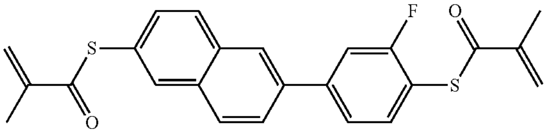
No. 350
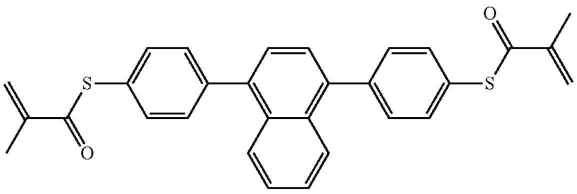

No. 351
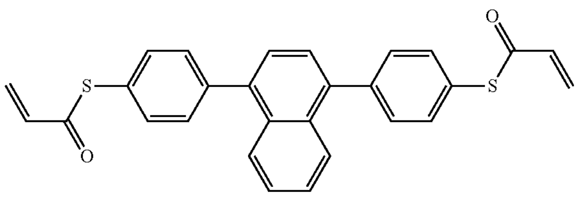
No. 352
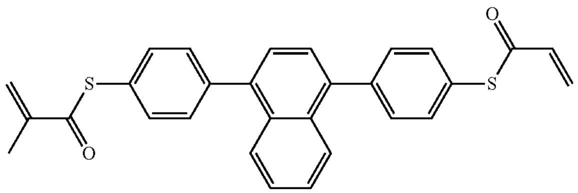
No. 353
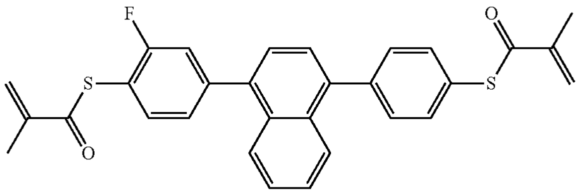
No. 354
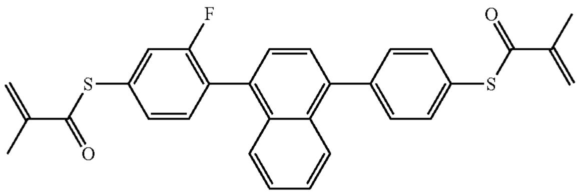
No. 355
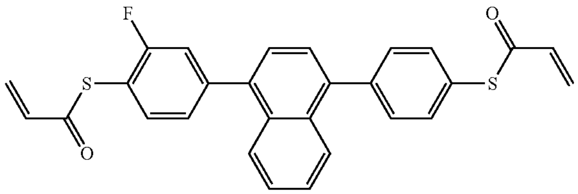
No. 356
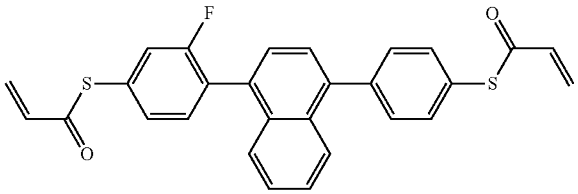
No. 357
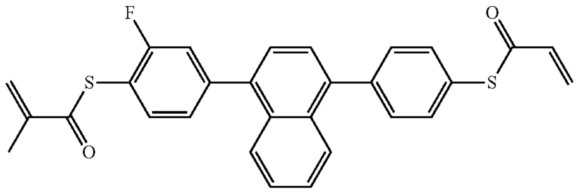
No. 358
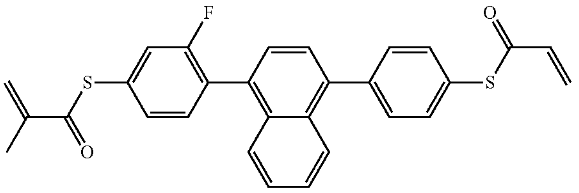
No. 359
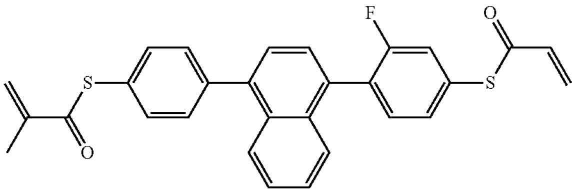
No. 360
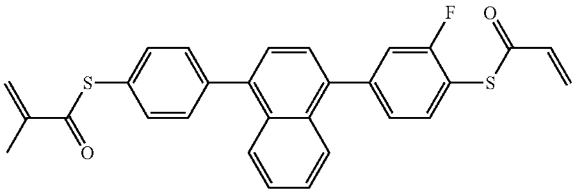
No. 361
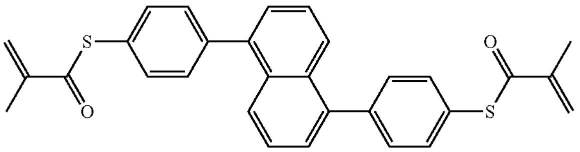
No. 362
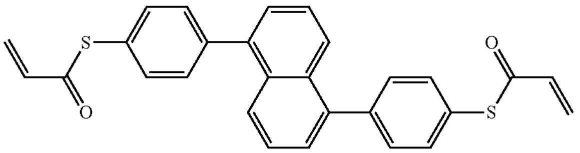
No. 363
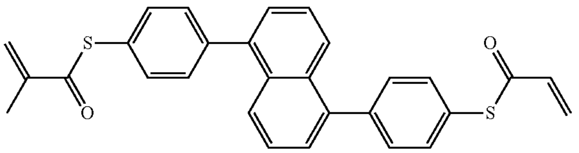
No. 364
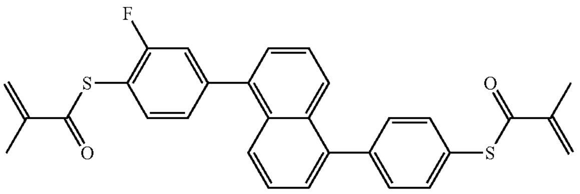
No. 365
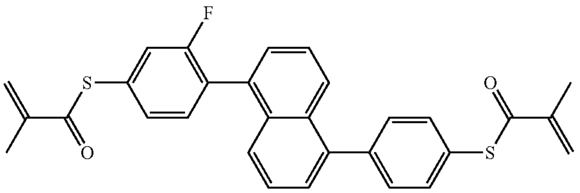

-continued
No. 366
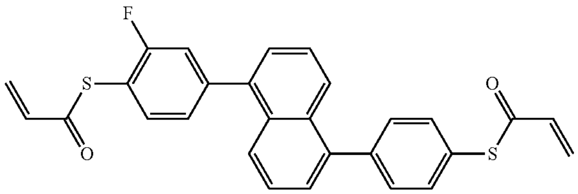
No. 367
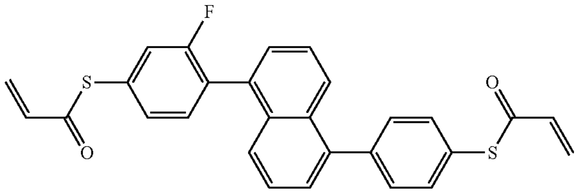
No. 368
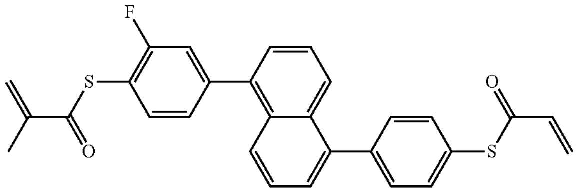
No. 369
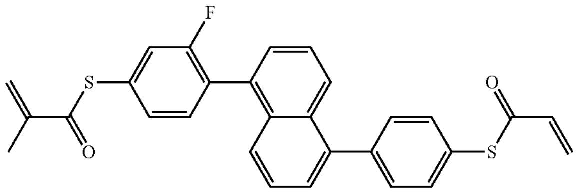
No. 370
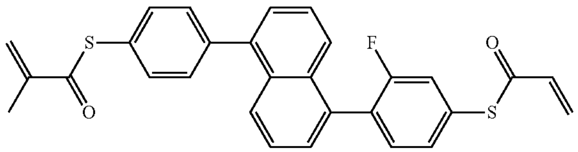
No. 371
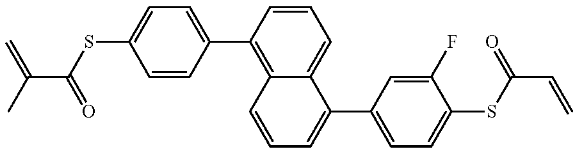
No. 372
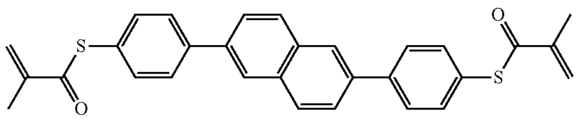
No. 373
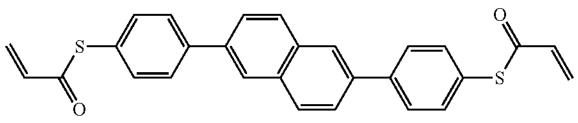
-continued
No. 374
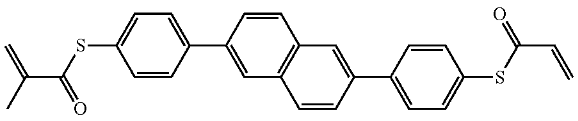
No. 375
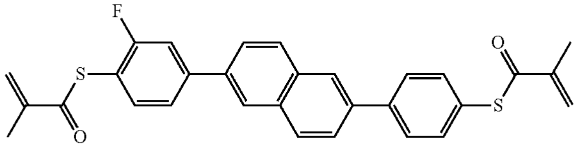
No. 376
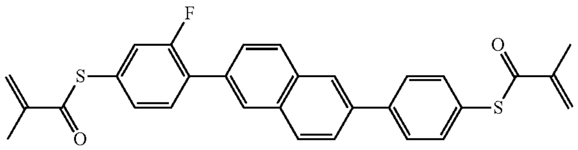
No. 377
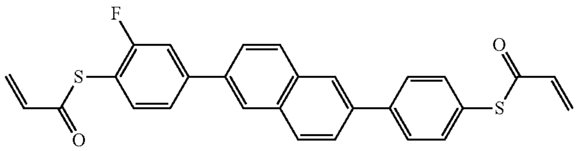
No. 378
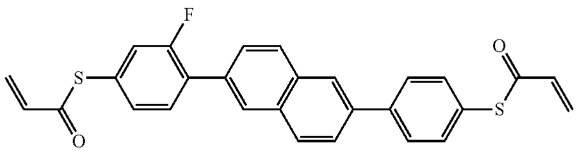
No. 379
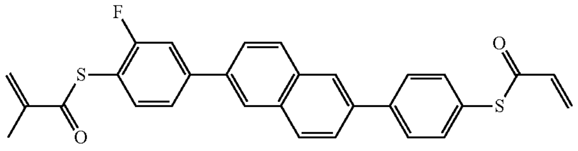
No. 380
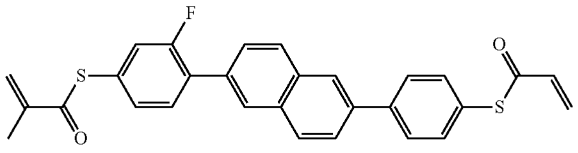
No. 381
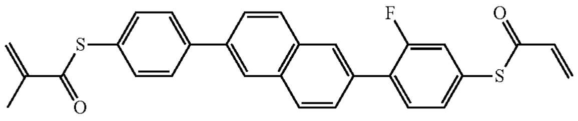
No. 382
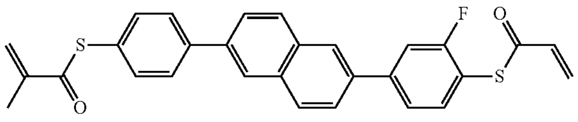

-continued

No. 383

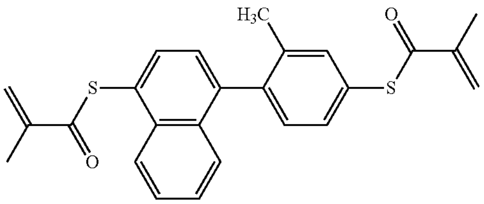

No. 384

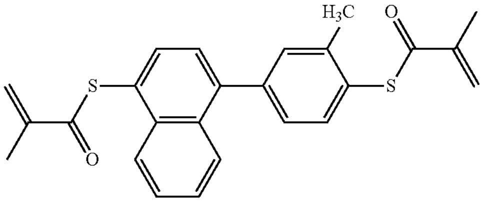

No. 385

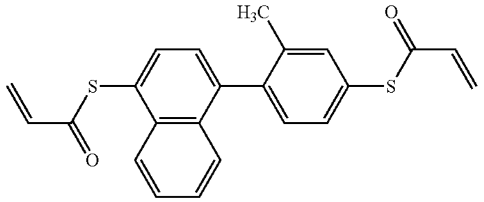

No. 386

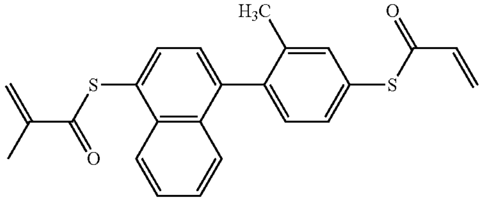

No. 387

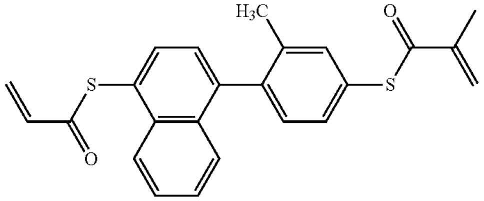

No. 388

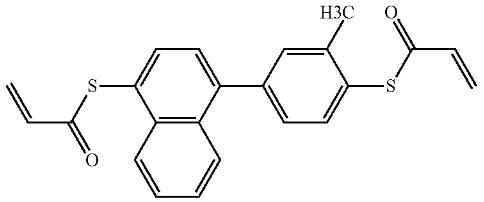

No. 389

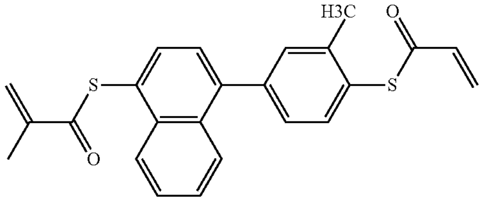

-continued

No. 390

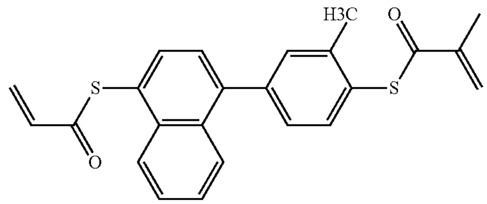

8. Examples for the Polymerizable Composition

The compounds described in Examples were expressed in terms of symbols according to the definition in Table 2 described below. In Table 2, the configuration of 1,4-cyclohexylene is trans. The parenthesized number next to a symbolized compound in Example indicates the number of the compound. The symbol (−) means any other liquid crystal compound. The content (percentage) of liquid crystal compounds means the percentages by weight (% by weight) based on the liquid crystal composition. Last, the values of physical properties of the composition were summarized. The physical properties were measured according to the method described above, and the measured values were reported without extrapolation.

TABLE 2

Method of Description of Compounds using Symbols
R—(A1)—Z1— . . . —Zn—(An)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2$═CH— | V— |
| $C_nH_{2n+1}$—CH═CH— | nV— |
| $CH_2$═CH—$C_nH_{2n}$— | Vn- |
| $C_mH_{2m+1}$—CH═CH—$C_nH_{2n}$— | mVn- |
| $CF_2$═CH— | VFF— |
| $CF_2$═CH—$C_nH_{2n}$— | VFFn- |
| **2) Right-terminal Group —R'** | **Symbol** |
| —$C_nH_{2n+1}$ | -n |
| —$OC_nH_{2n+1}$ | —On |
| —$COOCH_3$ | —EMe |
| —CH═$CH_2$ | —V |
| —CH═CH—$C_nH_{2n+1}$ | —Vn |
| —$C_nH_{2n}$—CH═$CH_2$ | -nV |
| —$C_mH_{2m}$—CH═CH—$C_nH_{2n+1}$ | -mVn |
| —CH═$CF_2$ | —VFF |
| —F | —F |
| —Cl | —CL |
| —$OCF_3$ | —OCF3 |
| —$OCF_2H$ | —OCF2H |
| —$CF_3$ | —CF3 |
| —CF═CH—$CF_3$ | —FVCF3 |
| —C≡N | —C |
| **3) Bonding Group —$Z_n$—** | **Symbol** |
| —$C_nH_{2n}$— | n |
| —COO— | E |
| —CH═CH— | V |
| —$CH_2O$— | 1O |
| —$OCH_2$— | O1 |
| —$CF_2O$— | X |
| —C≡C— | T |
| **4) Ring Structure —$A_n$—** | **Symbol** |
| 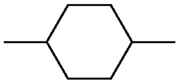 | H |

TABLE 2-continued

Method of Description of Compounds using Symbols
R—(A1)—Z1— . . . —Zn—(An)—R'

| Structure | Symbol |
|---|---|
| 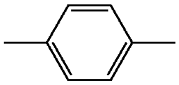 | B |
| 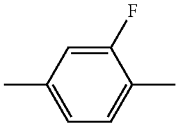 | B(F) |
| 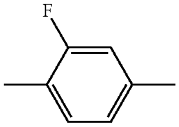 | B(2F) |
| 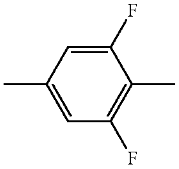 | B(F,F) |
| 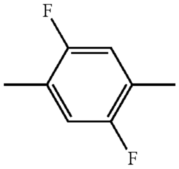 | B(2F,5F) |
| 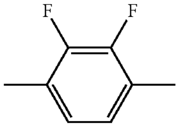 | B(2F,3F) |
| 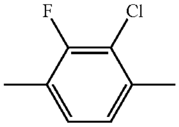 | B(2F,3CL) |
| 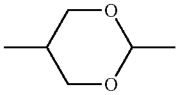 | G |
| 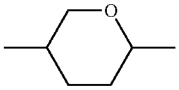 | dh |
| 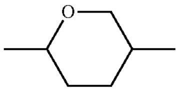 | Dh |
| 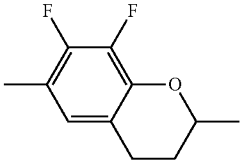 | Cro(7F,8F) |

TABLE 2-continued

Method of Description of Compounds using Symbols
R—(A1)—Z1— . . . —Zn—(An)—R'

5) Examples of Description

Example 1. 3-BB(F,F)XB(F,F)-F

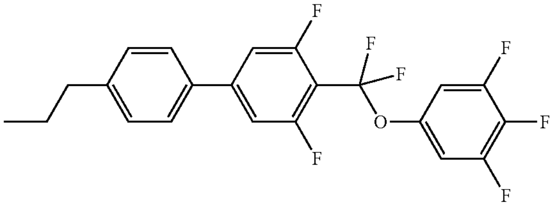

Example 2. 3-HBB(2F,3F)-O2

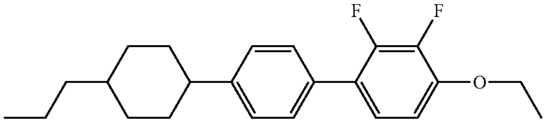

Example 3. 3-HH-4

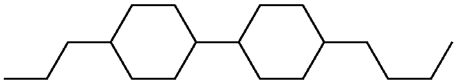

Example 4. 3-HBB(F)-F

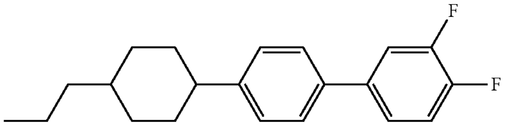

Example 2

| | | |
|---|---|---|
| 2-HB-C | (5-1) | 5% |
| 3-HB-C | (5-1) | 12% |
| 3-HB-O2 | (13-5) | 15% |
| 2-BTB-1 | (13-10) | 3% |
| 3-HHB-F | (3-1) | 4% |
| 3-HHB-1 | (14-1) | 6% |
| 3-HHB-O1 | (14-1) | 5% |
| 3-HHB-3 | (14-1) | 14% |
| 3-HHEB-F | (3-10) | 4% |
| 5-HHEB-F | (3-10) | 6% |
| 2-HHB(F)-F | (3-2) | 7% |
| 3-HHB(F)-F | (3-2) | 7% |
| 5-HHB(F)-F | (3-2) | 7% |
| 3-HHB(F,F)-F | (3-3) | 5% |

Compound (No. 259) was added to the preceding composition in the ratio of 0.2% by weight.

No. 259

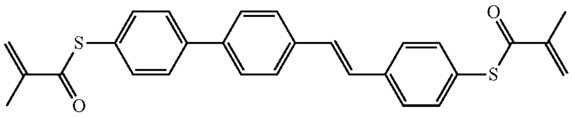

NI=102.1° C.; Δn=0.101; Δ∈=4.6; η=19.4 mPa·s.

Example 3

| | | |
|---|---|---|
| 5-HB-CL | (2-2) | 13% |
| 3-HH-4 | (13-1) | 12% |
| 3-HH-5 | (13-1) | 4% |
| 3-HHB-F | (3-1) | 4% |
| 3-HHB-CL | (3-1) | 6% |
| 4-HHB-CL | (3-1) | 4% |
| 3-HHB(F)-F | (3-2) | 10% |
| 4-HHB(F)-F | (3-2) | 9% |
| 5-HHB(F)-F | (3-2) | 9% |
| 7-HHB(F)-F | (3-2) | 8% |
| 5-HBB(F)-F | (3-23) | 4% |
| 1O1-HBBH-5 | (15-1) | 3% |
| 3-HHBB(F,F)-F | (4-6) | 2% |
| 4-HHBB(F,F)-F | (4-6) | 3% |
| 5-HHBB(F,F)-F | (4-6) | 3% |
| 3-HH2BB(F,F)-F | (4-15) | 3% |
| 4-HH2BB(F,F)-F | (4-15) | 3% |

Compound (No. 226) was added to the preceding composition in the ratio of 0.2% by weight.

No. 226

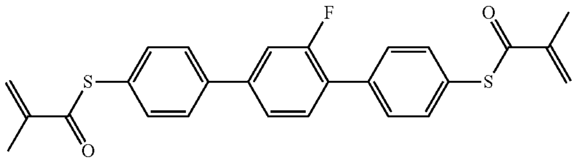

NI=119.9° C.; Δn=0.093; Δ∈=3.7; η=20.5 mPa·s.

Example 4

| | | |
|---|---|---|
| 2-HH-5 | (13-1) | 3% |
| 3-HH-4 | (13-1) | 13% |
| 3-HH-5 | (13-1) | 6% |
| 3-HB-O2 | (13-5) | 12% |
| 3-H2B(2F,3F)-O2 | (6-4) | 15% |
| 5-H2B(2F,3F)-O2 | (6-4) | 15% |
| 3-HHB(2F,3CL)-O2 | (7-12) | 5% |
| 2-HBB(2F,3F)-O2 | (7-7) | 3% |
| 3-HBB(2F,3F)-O2 | (7-7) | 9% |
| 5-HBB(2F,3F)-O2 | (7-7) | 9% |
| 3-HHB-1 | (14-1) | 3% |
| 3-HHB-3 | (14-1) | 4% |
| 3-HHB-O1 | (14-1) | 3% |

Compound (No. 80) was added to the preceding composition in the ratio of 0.15% by weight.

No. 80

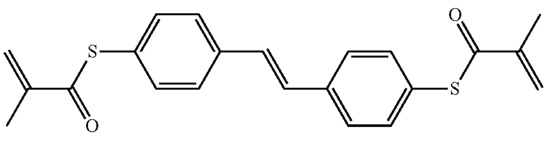

NI=76.0° C.; Δn=0.093; Δ∈=−4.1; η=19.2 mPa·s.

Example 5

| | | |
|---|---|---|
| 2-HH-3 | (13-1) | 21% |
| 3-HH-4 | (13-1) | 9% |
| 1-BB-3 | (13-8) | 9% |
| 3-HB-O2 | (13-5) | 2% |
| 3-BB(2F,3F)-O2 | (6-3) | 7% |
| 5-BB(2F,3F)-O2 | (6-3) | 6% |
| 2-HH1OB(2F,3F)-O2 | (7-5) | 15% |
| 3-HH1OB(2F,3F)-O2 | (7-5) | 21% |
| 3-HHB-1 | (14-1) | 5% |
| 3-HHB-O1 | (14-1) | 3% |
| 5-B(F)BB-2 | (14-8) | 2% |

Compound (No. 223) was added to the preceding composition in the ratio of 0.2% by weight.

No. 223

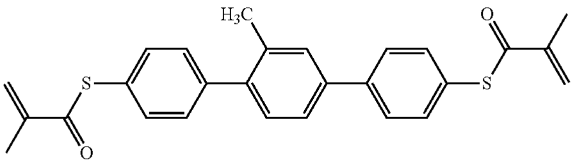

NI=76.6° C.; Δn=0.096; Δ∈=−3.2; η=15.9 mPa·s.

Example 6

| | | |
|---|---|---|
| 2-HH-3 | (13-1) | 2% |
| 1-BB-3 | (13-8) | 8% |
| 3-HH-V | (13-1) | 29% |
| 3-BB(2F,3F)-O2 | (6-3) | 13% |
| 2-HH1OB(2F,3F)-O2 | (7-5) | 14% |
| 3-HH1OB(2F,3F)-O2 | (7-5) | 20% |
| 3-HHB-1 | (14-1) | 8% |
| 5-B(F)BB-2 | (14-8) | 6% |

Compound (No. 1) was added to the preceding composition in the ratio of 0.3% by weight.

No. 1

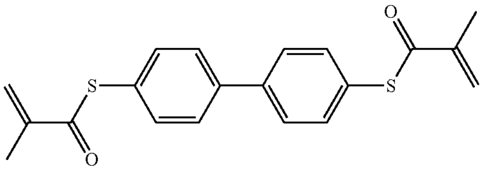

NI=76.7° C.; Δn=0.104; Δ∈=−3.0; η=14.1 mPa·s.

Example 7

| | | |
|---|---|---|
| 3-GB(F)B(F,F)XB(F,F)-F | (4-57) | 5% |
| 3-BB(F)B(F,F)XB(F,F)-F | (4-47) | 3% |
| 4-BB(F)B(F,F)XB(F,F)-F | (4-47) | 5% |
| 5-BB(F)B(F,F)XB(F,F)-F | (4-47) | 3% |
| 3-HH-V | (13-1) | 41% |
| 3-HH-V1 | (13-1) | 7% |

-continued

| | | |
|---|---|---|
| 3-HHEH-5 | (14-13) | 3% |
| 3-HHB-1 | (14-1) | 4% |
| V-HHB-1 | (14-1) | 5% |
| V2-BB(F)B-1 | (14-6) | 5% |
| 1V2-BB-F | (2-1) | 3% |
| 3-BB(F,F)XB(F,F)-F | (3-97) | 6% |
| 3-GB(F,F)XB(F,F)-F | (3-113) | 5% |
| 3-HHBB(F,F)-F | (4-6) | 5% |

Compound (No. 1) was added to the preceding composition in the ratio of 0.4% by weight.

No. 1

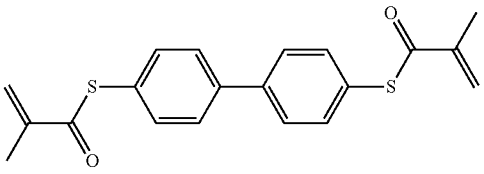

NI=83.3° C.; Δn=0.102; Δε=7.0; η=12.7 mPa·s.

INDUSTRIAL APPLICABILITY

A liquid crystal display device having a mode such as PSA can be produced by the polymerization of a polymerizable composition including compound (1) and a liquid crystal composition. This polymerizable compound can also be used as a starting material for an optically anisotropic material.

What is claimed is:

1. A compound represented by formula (1):

(1)

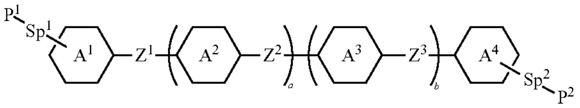

in formula (1), $P^1$ is —SCO-($M^1$)C═CH($M^2$), and $P^2$ is —SCO-($M^3$)C═CH($M^4$), where $M^1$, $M^2$, $M^3$ and $M^4$ are independently hydrogen, fluorine, methyl or trifluoromethyl;

$Sp^1$ and $Sp^2$ are a single bond;

ring $A^1$, ring $A^2$, ring $A^3$ and ring $A^4$ are independently a divalent group derived from benzene, naphthalene, pyrimidine or pyridine, and in these divalent groups at least one hydrogen may be replaced by halogen, alkyl having 1 to 12 carbons, alkyl having 1 to 12 carbons in which at least one hydrogen has been replaced by halogen or -$Sp^3$-$P^3$, where the definition of $P^3$ is the same as that of $P^1$ or $P^2$ and the definition of $Sp^3$ is the same as that of $Sp^1$ or $Sp^2$, and ring $A^2$ and ring $A^3$ may be independently 1,4-cyclohexylene, 1,4-cyclohexenylene, tetrahydropyran-2,5-diyl or 1,3-dioxane-2,5-diyl;

$Z^1$, $Z^2$ and $Z^3$ are independently a single bond or alkylene having 1 to 10 carbons, and in this alkylene at least one —$CH_2$— may be replaced by —O—, —CO—, —COO— or —OCO—, and at least one —$CH_2$—$CH_2$— may be replaced by —CH═CH—, —C($CH_3$)═CH—, —CH═C($CH_3$)—, —C($CH_3$)═C($CH_3$)— or —C≡C—, and in these groups at least one hydrogen may be replaced by fluorine or chlorine; and a and b are independently 0 or 1.

2. The compound according to claim 1, wherein in formula (1) according to claim 1, $P^1$ is —OCO-($M^1$)C═CH($M^2$), and $P^2$ is —SCO-($M^3$)C═CH($M^4$), where $M^1$, $M^2$, $M^3$ and $M^4$ are independently hydrogen, fluorine, methyl or trifluoromethyl;

$Sp^1$ and $Sp^2$ are a single bond;

ring $A^1$, ring $A^2$, ring $A^3$ and ring $A^4$ are independently 1,4-phenylene, 1,3-phenylene, 1,2-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, pyrimidine-2,5-diyl or pyridine-2,5-diyl, and in these rings at least one hydrogen may be replaced by halogen, alkyl having 1 to 6 carbons or alkyl having 1 to 6 carbons in which at least one hydrogen has been replaced by halogen, and ring $A^2$ and ring $A^3$ may be independently 1,4-cyclohexylene, 1,4-cyclohexenylene, tetrahydropyran-2,5-diyl or 1,3-dioxane-2,5-diyl;

$Z^1$, $Z^2$ and $Z^3$ are independently a single bond or alkylene having 1 to 6 carbons, and in this alkylene one —$CH_2$— may be replaced by —O—, —CO—, —COO— or —OCO—, and one —$CH_2$—$CH_2$— may be replaced by —CH═CH— or —C≡C—; and a and b are independently 0 or 1.

3. The compound according to claim 1, wherein the compound is represented by any one of formula (1-1) to formula (1-6):

(1-1)

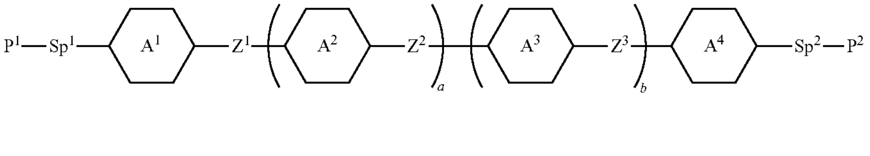

(1-2)

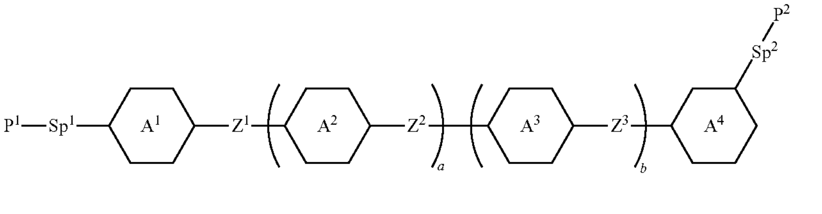

-continued (1-3)

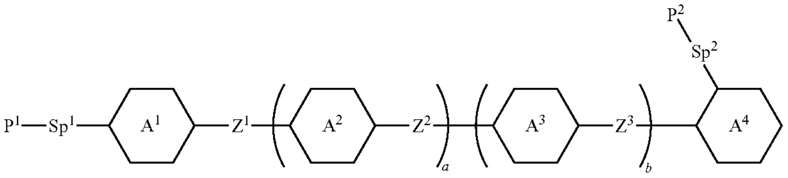

(1-4)

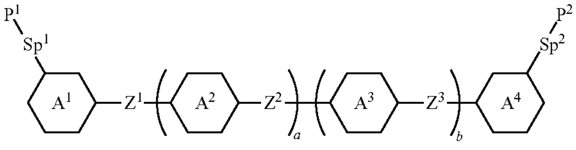

(1-5)

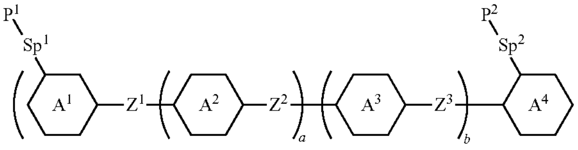

(1-6)

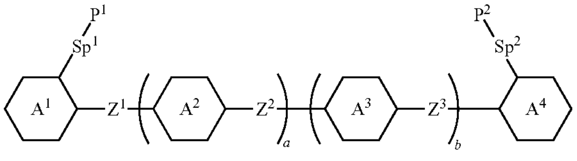

in formula (1-1) to formula (1-6), $P^1$ is —SCO-($M^1$)C═CH($M^2$), and $P^2$ is —SCO-($M^3$)C═CH($M^4$), where $M^1$, $M^2$, $M^3$ and $M^4$ are independently hydrogen, fluorine or methyl;

$Sp^1$ and $Sp^2$ are a single bond;

ring $A^1$ and ring $A^4$ are independently 1,4-phenylene, 1,3-phenylene or 1,2-phenylene, and ring $A^2$ and ring $A^3$ are independently 1,4-phenylene, and in these phenylene at least one hydrogen may be replaced by fluorine, alkyl having 1 to 3 carbons or alkyl having 1 to 3 carbons in which at least one hydrogen has been replaced by fluorine;

$Z^1$, $Z^2$ and $Z^3$ are independently a single bond or alkylene having 1 to 10 carbons, and in this alkylene one —$CH_2$— may be replaced by —O—, —CO—, —COO— or —OCO— and one —$CH_2$—$CH_2$— may be replaced by —CH═CH— or —C≡C—, and in these groups at least one hydrogen may be replaced by fluorine or chlorine; and a and b are independently 0 or 1.

4. The compound according to claim 3, wherein in formula (1-1) to formula (1-6) according to claim 3, $P^1$ and $P^2$ are independently —SCO—HC═$CH_2$ or —SCO—($CH_3$)C═$CH_2$.

5. The compound according to claim 1, wherein the compound is represented by formula (1-1-1) or formula (1-1-2):

(1-1-1)

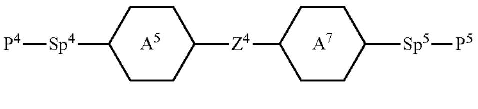

(1-1-2)

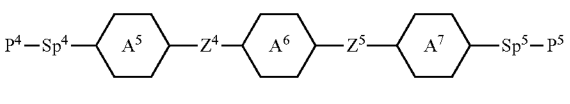

in formula (1-1-1) and formula (1-1-2), $P^4$ is —SCO-($M^5$)C═$CH_2$, and $P^5$ is —SCO-($M^6$)C═$CH_2$, where $M^5$ and $M^6$ are independently hydrogen, fluorine or methyl;

$Sp^4$ and $Sp^5$ are a single bond;

ring $A^5$ and ring $A^7$ are independently 1,4-phenylene, 2-fluoro-1,4-phenylene, 2-methyl-1,4-phenylene, 2-trifluoromethyl-1,4-phenylene, naphthalene-1,4-diyl, naphthalene-1,5-diyl or naphthalene-2,6-diyl, and ring $A^6$ is 1,4-phenylene, 2-difluoro-1,4-phenylene, 2-methyl-1,4-phenylene, 2-trifluoromethyl-1,4-phenylene, naphthalene-1,4-diyl, naphthalene-1,5-diyl, naphthalene-2,6-diyl, 1,4-cyclohexylene or tetrahydropyran-2,5-diyl; and $Z^4$ and $Z^5$ are independently a single bond, —CO—, —COO—, —OCO—, —CH═CH—, —C≡C—, —$CH_2CH_2$—, —$OCH_2CH_2$—, —CH═CHO—, —OCH═CH—, —CO—CH═CH—, —CH═CH—CO—, —CH═CH—$CH_2$O—, —$OCH_2$—CH═CH—, —CH═CH—$OCH_2$— or —$CH_2$O—CH═CH—.

6. The compound according to claim 5, wherein in formulas (1-1-1) and (1-1-2) according to claim 5, $P^4$ and $P^5$ are independently —SCO—HC═$CH_2$ or —SCO—($CH_3$)C═$CH_2$;

$Sp^4$ and $Sp^5$ are a single bond;

ring $A^5$ and ring $A^7$ are independently 1,4-phenylene, 2-fluoro-1,4-phenylene, 2-methyl-1,4-phenylene, naphthalene-1,5-diyl or naphthalene-2,6-diyl, and ring $A^6$ is 1,4-cyclohexylene, 1,4-phenylene, 2-fluoro-1,4-phenylene, 2-methyl-1,4-phenylene, naphthalene-1,5-diyl, naphthalene-2,6-diyl or tetrahydropyran-2,5-diyl; and $Z^4$ and $Z^5$ are independently a single bond, —CH═CH—O— or —O—CH═CH—.

7. The compound according to claim 1, wherein the compound is represented by formula (1-1-1-1) or formula (1-1-2-1):

(1-1-1-1)

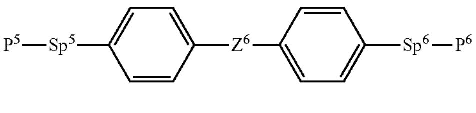

-continued (1-1-2-1)

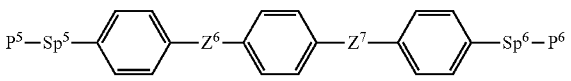

in formula (1-1-1-1) and formula (1-1-2-1), $P^5$ and $P^6$ are independently —SCO—HC═$CH_2$ or —SCO—$(CH_3)$C═$CH_2$;

$Sp^5$ and $Sp^6$ are a single bond.

8. The compound according to claim 7, wherein in formula (1-1-1-1) and formula (1-1-2-1) according to claim 7, $P^5$ and $P^6$ are independently —SCO—HC═$CH_2$ or —SCO—$(CH_3)$C═$CH_2$; $Sp^5$ and $Sp^6$ are a single bond; and $Z^6$ and $Z^7$ are a single bond.

9. A polymerizable composition including at least one of the compounds according to claim 1.

10. The polymerizable composition according to claim 9, further including at least one compound selected from the group of compounds represented by formulas (2) to (4):

(2)

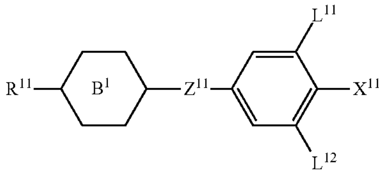

(3)

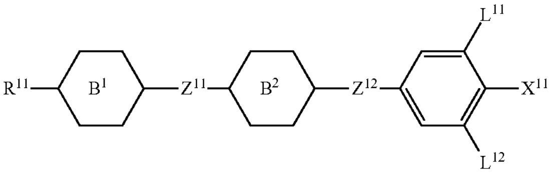

(4)

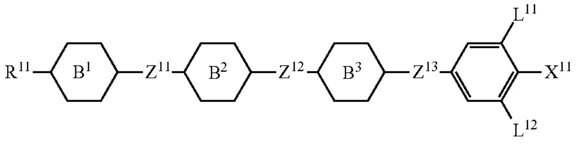

in formula (2) to formula (4), $R^{11}$ is alkyl having 1 to 10 carbons or alkenyl having 2 to 10 carbons, and in this alkyl and alkenyl at least one —$CH_2$— may be replaced by —O—, and at least one hydrogen may be replaced by fluorine;

$X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$;

ring $B^1$, ring $B^2$ and ring $B^3$ are independently 1,4-cyclohexylene, 1,4-phenylene in which at least one hydrogen may be replaced by fluorine, tetrahydropyran-2,5-diyl, 1,3-dioxane-2,5-diyl or pyrimidine-2,5-diyl;

$Z^{11}$, $Z^{12}$ and $Z^{13}$ are independently a single bond, —$CH_2CH_2$—, —CH═CH—, —C≡C—, —COO—, —$CF_2O$—, —$OCF_2$—, —$CH_2O$— or —$(CH_2)_4$—; and $L^{11}$ and $L^{12}$ are independently hydrogen or fluorine.

11. The polymerizable composition according to claim 9, further including at least one compound selected from the group of compounds represented by formula (5):

(5)

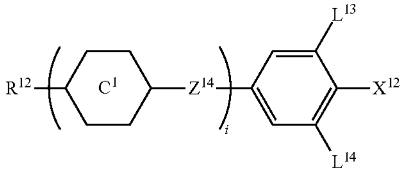

in formula (5), $R^{12}$ is alkyl having 1 to 10 carbons or alkenyl having 2 to 10 carbons, and in this alkyl and alkenyl at least one —$CH_2$— may be replaced by —O—, and at least one hydrogen may be replaced by fluorine;

$X^{12}$ is —C≡N or —C≡C—C≡N;

ring $C^1$ is 1,4-cyclohexylene, 1,4-phenylene in which at least one hydrogen may be replaced by fluorine, tetrahydropyran-2,5-diyl, 1,3-dioxane-2,5-diyl or pyrimidine-2,5-diyl;

$Z^{14}$ is ingle bond, —$CH_2CH_2$—, —C≡C—, —COO—, —$CF_2O$—, —$OCF_2$— or —$CH_2O$—;

$L^{13}$ and $L^{14}$ are independently hydrogen or fluorine; and i is 1, 2, 3 or 4.

12. The polymerizable composition according to claim 9, further including at least one compound selected from the group of compounds represented by formula (6) to formula (12):

(6)

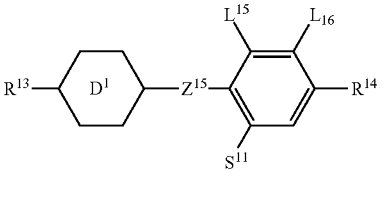

(7)

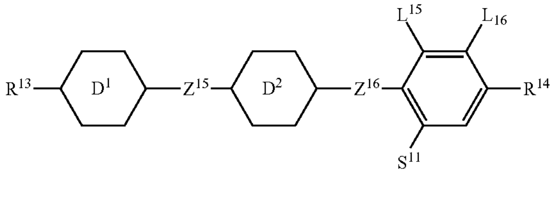

(8)

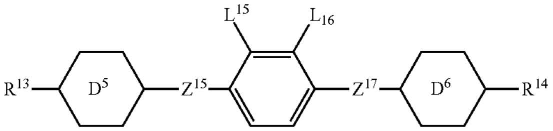

(9)

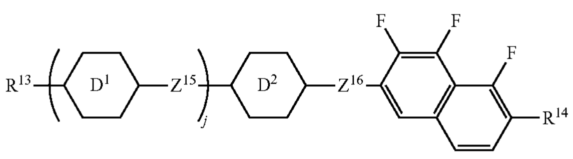

-continued (10)

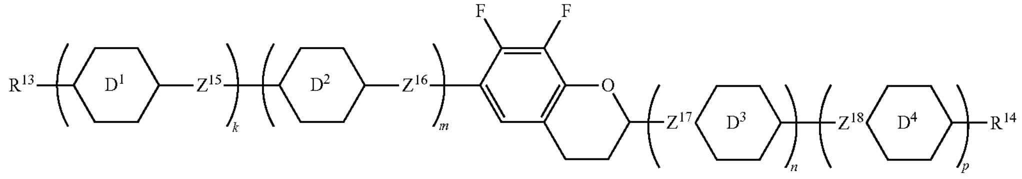

(11)

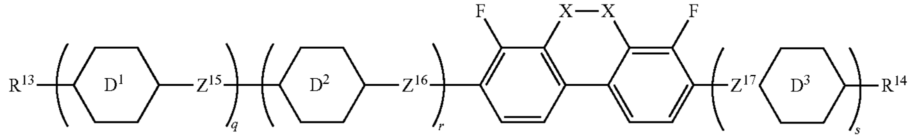

(12)

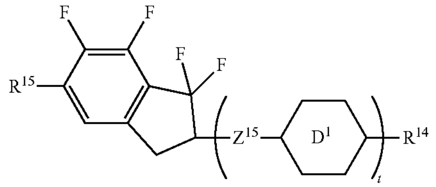

in formula (6) to formula (12), $R^{13}$ and $R^{14}$ are independently alkyl having 1 to 10 carbons or alkenyl having 2 to 10 carbons, and in this alkyl and alkenyl at least one —$CH_2$— may be replaced by —O—, and at least one hydrogen may be replaced by fluorine;

$R^{15}$ is hydrogen, fluorine, alkyl having 1 to 10 carbons or alkenyl having 2 to 10 carbons, and in this alkyl and alkenyl at least one —$CH_2$— may be replaced by —O—, and at least one hydrogen may be replaced by fluorine;

ring $D^1$, ring $D^2$, ring $D^3$ and ring $D^4$ are independently 1,4-cyclohexylene, 1,4-cyclohexenylene, 1,4-phenylene in which at least one hydrogen may be replaced by fluorine, tetrahydropyran-2,5-diyl or decahydronaphthalene-2,6-diyl;

ring $D^5$ and ring $D^6$ are independently 1,4-cyclohexylene, 1,4-cyclohexenylene, 1,4-phenylene, tetrahydropyran-2,5-diyl or decahydronaphthalene-2,6-diyl;

$Z^{15}$, $Z^{16}$, $Z^{17}$ and $Z^{18}$ are independently a single bond, —$CH_2CH_2$—, —COO—, —$CH_2O$—, —$OCF_2$— or —$OCF_2CH_2CH_2$—;

$L^{15}$ and $L^{16}$ are independently fluorine or chlorine;

$S^{11}$ is hydrogen or methyl;

X is —CHF— or —$CF_2$—; and j, k, m, n, p, q, r and s are independently 0 or 1, the sum of k, m, n and p is 1 or 2, the sum of q, r and s is 0, 1, 2 or 3, and t is 1, 2 or 3.

13. The polymerizable composition according to claim 9, further including at least one compound selected from the group of compounds represented by formula (13) to formula (15):

(13)

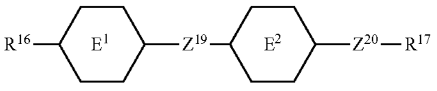

-continued (14)

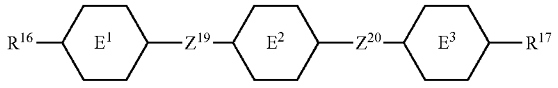

(15)

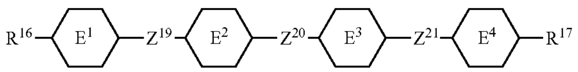

in formula (13) to formula (15), $R^{16}$ and $R^{17}$ are independently alkyl having 1 to 10 carbons or alkenyl having 2 to 10 carbons, and in this alkyl or alkenyl at least one —$CH_2$— may be replaced by —O—, and at least one hydrogen may be replaced by fluorine;

ring $E^1$, ring $E^2$, ring $E^3$ and ring $E^4$ are independently 1,4-cyclohexylene, 1,4-phenylene, 2-fluoro-1,4-phenylene, 2,5-difluoro-1,4-phenylene or pyrimidine-2,5-diyl; and $Z^{19}$, $Z^{20}$ and $Z^{21}$ are independently a single bond, —$CH_2CH_2$—, —CH═CH—, —C≡C— or —COO—.

14. A liquid crystal composite formed by the polymerization of the polymerizable composition according to claim 9.

15. An optically anisotropic material formed by the polymerization of the polymerizable composition according to claim 9.

16. A liquid crystal display device containing the polymerizable composition according to claim 9.

17. A liquid crystal display device containing at least one of the compounds according to claim 1.

18. A liquid crystal display device containing the polymerizable composition according the liquid crystal composite according to claim 14.

19. A liquid crystal display device containing at least one of the polymerizable composition according to claim 9.

20. A liquid crystal display device containing at least one liquid crystal composite according to claim 14.

* * * * *